(12) United States Patent
Parikh et al.

(10) Patent No.: US 12,472,230 B2
(45) Date of Patent: Nov. 18, 2025

(54) PEPTIDES AND METHODS OF USE THEREOF IN TREATING UVEITIS

(71) Applicant: Park Strategic Ventures LLC, Scottsdale, AZ (US)

(72) Inventors: Indu Parikh, Durham, NC (US); Ashish Bhatia, Durham, NC (US)

(73) Assignee: PARK STRATEGIC VENTURES LLC, Scottsdale, AZ (US)

( * ) Notice: Subject to any disclaimer, the term of this patent is extended or adjusted under 35 U.S.C. 154(b) by 842 days.

(21) Appl. No.: 17/619,168

(22) PCT Filed: Jun. 16, 2020

(86) PCT No.: PCT/US2020/037882
§ 371 (c)(1),
(2) Date: Dec. 14, 2021

(87) PCT Pub. No.: WO2020/257162
PCT Pub. Date: Dec. 24, 2020

(65) Prior Publication Data
US 2022/0305078 A1    Sep. 29, 2022

Related U.S. Application Data

(60) Provisional application No. 62/862,326, filed on Jun. 17, 2019.

(51) Int. Cl.
| A61K 38/17 | (2006.01) |
| A61K 9/00  | (2006.01) |
| A61K 38/08 | (2019.01) |
| A61K 45/06 | (2006.01) |
| A61P 27/02 | (2006.01) |

(52) U.S. Cl.
CPC ........ *A61K 38/1709* (2013.01); *A61K 9/0048* (2013.01); *A61K 38/08* (2013.01); *A61K 45/06* (2013.01); *A61P 27/02* (2018.01)

(58) Field of Classification Search
None
See application file for complete search history.

(56) References Cited

U.S. PATENT DOCUMENTS

| | | |
|---|---|---|
| 4,753,945 A | 6/1988 | Gilbard et al. |
| 4,873,346 A | 10/1989 | Anderson |
| 4,966,848 A | 10/1990 | Smith et al. |
| 5,223,421 A | 6/1993 | Smith et al. |
| 5,292,498 A | 3/1994 | Boucher, Jr. |
| 5,298,506 A | 3/1994 | Stamler et al. |
| 5,436,243 A | 7/1995 | Sachs et al. |
| 5,837,218 A | 11/1998 | Peers et al. |
| 5,849,706 A | 12/1998 | Molina et al. |
| 5,849,719 A | 12/1998 | Carson et al. |
| 5,858,784 A | 1/1999 | Debs et al. |
| 5,858,981 A | 1/1999 | Schreiber et al. |
| 5,861,502 A | 1/1999 | Prockop et al. |
| 6,245,320 B1 | 6/2001 | Kim |
| 6,407,058 B1 | 6/2002 | Staddon et al. |
| 6,506,779 B1 | 1/2003 | Cheng et al. |
| 6,653,442 B1 | 11/2003 | Chang et al. |
| 7,265,088 B1 | 9/2007 | Li et al. |
| 7,524,926 B2 | 4/2009 | Parikh |
| 7,544,772 B2 | 6/2009 | Takashi et al. |
| 7,919,469 B2 | 4/2011 | Li et al. |
| 8,293,870 B2 | 10/2012 | Parikh |
| 8,492,518 B2 | 7/2013 | Parikh |
| 8,501,911 B2 | 8/2013 | Li et al. |
| 8,563,689 B1 | 10/2013 | Takashi et al. |
| 8,907,056 B2 | 12/2014 | Parikh |
| 8,999,915 B2 | 4/2015 | Parikh |
| 9,598,463 B2 | 3/2017 | Parikh |
| 9,827,287 B2 | 11/2017 | Parikh |
| 2001/0033827 A1 | 10/2001 | Kim |
| 2003/0013652 A1 | 1/2003 | Martin et al. |
| 2003/0125249 A1 | 7/2003 | Blecha et al. |
| 2004/0180836 A1 | 9/2004 | Martin et al. |
| 2006/0040301 A1 | 2/2006 | Deirmengian |

(Continued)

FOREIGN PATENT DOCUMENTS

| AU | 766800 B2 | 10/2003 |
| CA | 2287501 A1 | 10/1998 |

(Continued)

OTHER PUBLICATIONS

Gaudana et al., AAPS J. 12:348-360 (2010) (Year: 2010).*
Harman et al., Am. Family Physician 90:711-716 (2014) (Year: 2014).*
Cleveland Clinic, "Uveitis", Cleveland Clinic, available online at https://my.clevelandclinic.org/health/diseases/14414-uveitis, 18 pages (2024) (Year: 2024).*

(Continued)

*Primary Examiner* — Thea D' Ambrosio
(74) *Attorney, Agent, or Firm* — Moore & Van Allen PLLC

(57) ABSTRACT

The present disclosure includes methods of treating ocular inflammation or inflammatory ocular conditions, such as uveitis. More specifically the present disclosure relates to inhibiting or reducing the release of inflammatory mediators from inflammatory cells by inhibiting the mechanism associated with the release of inflammatory mediators from granules in inflammatory cells. In this regard, the present disclosure includes an intracellular signaling mechanism that illustrates several novel intracellular targets for pharmacological intervention in disorders involving secretion of inflammatory mediators from vesicles in inflammatory cells. Peptide fragments and variants thereof as disclosed in the present disclosure are useful in such methods.

17 Claims, 6 Drawing Sheets
Specification includes a Sequence Listing.

(56) References Cited

U.S. PATENT DOCUMENTS

| | | |
|---|---|---|
| 2006/0153834 A1 | 7/2006 | Carbonell et al. |
| 2006/0205664 A1 | 9/2006 | Parikh |
| 2006/0217307 A1 | 9/2006 | Takashi et al. |
| 2008/0020031 A1 | 1/2008 | Li et al. |
| 2009/0203620 A1 | 8/2009 | Parikh |
| 2009/0220581 A1 | 9/2009 | Li et al. |
| 2009/0275520 A1 | 11/2009 | Parikh |
| 2010/0197607 A1 | 8/2010 | Parikh |
| 2013/0338085 A1 | 12/2013 | Parikh |
| 2015/0258040 A1 | 9/2015 | Lynch et al. |
| 2015/0274778 A1 | 10/2015 | Parikh |
| 2016/0030509 A1 | 2/2016 | Parikh |
| 2018/0036367 A1 | 2/2018 | Parikh |
| 2018/0311226 A1 | 11/2018 | Thalladi et al. |
| 2020/0138898 A1 | 5/2020 | Parikh |

FOREIGN PATENT DOCUMENTS

| | | |
|---|---|---|
| EP | 0551200 A1 | 7/1993 |
| EP | 1154786 A | 8/2000 |
| EP | 1538162 A2 | 6/2005 |
| EP | 1538162 A3 | 6/2005 |
| JP | H06502168 A | 3/1994 |
| JP | 2002538783 A | 11/2002 |
| JP | 2004049133 A | 2/2004 |
| JP | 2005519850 A | 7/2005 |
| RU | 2204388 C2 | 5/2003 |
| WO | WO-9005744 A1 | 5/1990 |
| WO | WO-9205784 A1 | 4/1992 |
| WO | WO-9300353 A1 | 1/1993 |
| WO | WO-9527496 A1 | 10/1995 |
| WO | WO-9618103 A1 | 6/1996 |
| WO | WO-0050062 A2 | 8/2000 |
| WO | WO-0055119 A1 | 9/2000 |
| WO | WO-0120998 A1 | 3/2001 |
| WO | WO-03000027 A2 | 1/2003 |
| WO | WO-03000027 A3 | 5/2003 |
| WO | WO-2006078899 A2 | 7/2006 |
| WO | WO-2006078899 A3 | 12/2006 |
| WO | WO-2007103368 A2 | 9/2007 |
| WO | WO-2017188818 A1 | 11/2017 |

OTHER PUBLICATIONS

Merriam-Webster, "Prevent", Merriam-Webster, available online at https://www.merriam-webster.com/dictionary/prevent, 10 pages (accessed on Feb. 21, 2025) (Year: 2025).*

Ang, Br., "Uveitis Prevention: Reducing the Risk of Developing Uveitis," Vision and Eye Health, available online at https://www.vision-and-eye-health.com/uveitis-prevention/, 8 pages (2024) (Year: 2024).*

Amador-Patarroyo et al., "Chapter 37: Autoimmune uveitis," in Autoimmunity: From Bench to Bedside, Anaya et al., eds., 26 pages (2013) (Year: 2013).*

National Eye Institute, "Uveitis", National Eye Institute, available online at https://www.nei.nih.gov/learn-about-eye-health/eye-conditions-and-diseases/uveitis, 5 pages (2024) (Year: 2024).*

Abbas et al., "Granulocytes," 3rd ed. Cellular and Molecular Immunology, pp. 26-27, WB Saunders Co., Philadelphia (1997).

Abdullah et al., "P2u purinoceptor regulation of mucin secretion in SPOC1 cells, a goblet cell line from the airways," Biochem. J. vol. 316, 1996, pp. 943-951.

Abdullah et al., "Protein kinase C and Ca2+ activation of mucin secretion in airway goblet cells," Am. Physiol. Soc. 273:L201-L210 (1997).

Abraham, Office Action, 6 pages, Canada patent appl. No. 2,658,949, Canadian Intellectual Property Office (Mar. 16, 2011).

Aderem, "The MARCKS family of protein kinase-C substrates," Biochem. Soc. Trans. 23:587-591 (1995).

Adler et al., "Effects of inflammatory mediators and drugs on mucus secretion and mucociliary function," Res. Immunol. 149(3):245-248 (1998).

Adler et al., "Hypersecretion of Mucin in Response to inflammatory Mediators by Guinea Piog Tracheal Epithelial Cells In Vitro Is Blocked by Inhibition of Nitric Oxide Synthase," Am. J. Respir. Cell Mol. Biol. 13:526-530 (1995).

Adler et al., "Myristoylated alanine-rich C-kinase substrate protein: A major intracellular regulatory molecule controlling secretion of mucin by human airway goblet cells," Chest 117(5 suppl. 1):266S-267S (2000).

Aigner et al., "Depletion of 43-kD growth associated protein in primary sensory neurons leads to diminished formation and spreading of growth cones," J. Cell Biol. 123(2):417-429 (1993).

Akbiyik et al., "In vitro and in vivo inhibition of myeloperoxidase with 5-fluorouracil," Eur. J. Clin. Pharmacol. 57:631-636 (2001).

Ali et al., "Vasopressin-induced activation of Protein kinase C in renal epithelial cells," Biochim. Biophys. Acta. 1402:188-196 (1998).

Ansfield, "A Less Toxic Fluorouracil Dosage Schedule," J. Am. Med. Assoc. 190:686-688 (1964).

Aragona et al., "Effects of a stable analogue pf PGE2 (11-deoxy-13, 14-didehydro-16 (S)-Methylester Methyl PGE2: FCE20700) on the secretory processes of conjunctival goblet cells of rabbit," Exp. Eye Res. 45(5):647-654 (1987).

Barnes, P.J., "Current and future therapies for airway mucus hypersecretion," Novartis Found Symp. 248:237-253, 277-282 (2002).

Battersby et al., "Toward Larger Chemical Libraries: Encoding with Fluorescent Colloids in Combinatorial Chemistry," J. Am. Chem. Soc. 122:2138-2139 (2000).

Biondi et al., The Adult Respiratory Distress Syndrome, The Yale Journal of Biology and Medicine, (1986) 59, 575-597.

Blackshear et al., "The MARCKS family of cellular protein kinase C substrates," J. Biol. Chem. 268(3):1501-1504 (1993).

Bouffard et al., National Center for Biotechnology Information Database, Accession No. G20124. Sep. 28, 1998.

Brinckerhoff et al., "Terminal Modifications Inhibit Proteolytic Degradation of an Immunogenic MART-127-35 Peptide: Implications for Peptide Vaccines," Int. J. Canc. 83(3):326-334 (1999).

Brooks et al., "MARCKS functions as a novel growth suppressor in cells of melanocyte origin," Carcinogenesis 17(4):683-689 (1996).

Brownlee, "Examiner's report No. 2 on patent application No. 2007223983," 2 pages, Australia patent appl. No. 2007223983, IP Australia (Feb. 4, 2011).

Calle et al., "Glucose-induced phosphorylation of myristoylated alanine-rich C kinase substrate (MARCKS) in isolated rat pancreatic islets," J. Biol. Chem. 267(26):18723-18727 (1992).

Case et al., "Lack of Efficacy of Acetaminophen in Treating Symptomatic Knee Osteoarthritis," Arch. Intern. Med. 163:169-178 (2003).

Chang, "Examiner's first report on patent application No. 2007279193," 2 pages, Australia patent appl. No. 2007279193, IP Australia (Feb. 17, 2010).

Coffey et al., "Glutamate exocytosis and MARCKS phosphorylation are enhanced by a metabotopic glutamate receptor coupled to a protein kinase C synergistically activated by diacylglycerol and arachidonic acid," J. Neurochem. 63(4):1303-1310 (1994).

Corbett, "Examination Report," 2 pages, New Zealand patent appl. No. 574290, Intellectual Property Office of New Zealand (Jun. 22, 2010).

Cross et al., "Antioxidant Protection: A Function of Tracheobronchial and Gastrointestinal Mucus," The Lancet, Jun. 16, 1984, pp. 1328-1329.

Daly, "Search Report," 3 pages, Singapore patent appl. No. 200705330-9, Australian Patent Office (mailed Jul. 31, 2008).

Daly, "Examination Report," 4 pages, Singapore patent appl. No. 200705330-9, Australian Patent Office (mailed Feb. 10, 2010).

Daly, "Examiner's first report on patent application No. 2006206331," 2 pages, Australia patent appl. No. 2006206331, Australia Patent Office (Dec. 14, 2010).

Daly, "Written Opinion," 4 pages, Singapore patent appl. No. 200705330-9, Australian Patent Office (mailed Jul. 31, 2008).

"Decision on Grant," 8 pages, from RU patent appl. No. 2008139414/14, Russian Patent Office (mailed May 11, 2011) with translation attached.

(56) References Cited

OTHER PUBLICATIONS

Deck, "Communication pursuant to Article 96(2) EPC," 5 pages, Europe patent appl. No. 00912034.6, European Patent Office (Apr. 25, 2002).
Deck, "International Preliminary Examination Report," 6 pages, PCT appl. No. PCT/US00/05050, European Patent Office (Nov. 27, 2000).
Desai, "Examiner's first report on patent application No. 2007223983," 3 pages, Australia patent appl. No. 2007223983, IP Australia (Aug. 24, 2009).
Dizier et al., "Genome screen for asthma and related phenotypes in the French EGEA study," American Journal Respiratory and Critical Care Medicine 162:1812-1818 (2000).
Dr. Shlomo Cohen & Co., Translation and Summary of Office Action issued in related Israel Patent Appl. No. 184731, 8 pages (emailed Mar. 5, 2010).
Dray-Charier et al., "Regulation of mucin secretion in human gallbladder epithelial cells: Predominant role of calcium and protein kinase C," Gastroenterology 112(3):978-990 (1997).
Driot et al., "Beneficial effects of a retinoic acid analog, CBS-211 A, on an experimental model of keratoconjunctivitis Sicca.," Invest. Opthalmol. Vis. Sci. 33(1):190-195 (1992).
Elzagallaai, A., et al. "Platelet Secretion Induced by Phorbol Esters Stimulation is Mediated Though Phosphorylation of MARCKS: a MARCKS-Derived Peptide Blocks MARCKS Phosphorylation and Serotonin Release without Affecting Pleckstrin Phosphorylation," Hemostatis, Thrombosis, and Vascular Biology. 95(3):894-902. (Feb. 1, 2000).
Epps, "Office Action Summary," 7 pages, U.S. Appl. No. 09/256,154, United States Patent and Trademark Office (mailed Feb. 3, 2000).
Epps-Ford, "Office Action Summary," 11 pages, U.S. Appl. No. 09/914,020, United States Patent and Trademark Office (mailed Jun. 6, 2005).
Epps-Ford, "Office Action Summary," 11 pages, U.S. Appl. No. 09/914,020, United States Patent and Trademark Office (mailed Mar. 22, 2007).
Epps-Ford, "Office Action Summary," 13 pages, United States U.S. Appl. No. 09/914,020, United States Patent and Trademark Office (mailed Feb. 23, 2004).
Epps-Ford, "Office Action Summary," 14 pages, U.S. Appl. No. 09/914,020, United States Patent and Trademark Office (mailed Dec. 7, 2005).
Epps-Ford, "Office Action Summary," 9 pages, U.S. Appl. No. 09/914,020, United States Patent and Trademark Office (mailed Aug. 28, 2006).
Epps-Smith, "Office Action Summary," 12 pages, U.S. Appl. No. 11/838,589, United States Patent and Trademark Office (mailed Jul. 19, 2010).
European Search Report, EP Appl. No. 11171749.2, 11 pages (Mar. 16, 2012).
European Search Report for application No. 02756467.3 dated Sep. 3, 2004.
Felix, "Site-Specific Poly(ethylene Glycol)ylation of Peptides," ACS Symposium Series 680:218-238 (1997).
Fischer et al., "Tumor Necrosis Factor-α Stimulates Mucin Secretion and Cyclic GMP Production by Guinea Pig Tracheal Epithelial Cells In Vitro," Am. J. Respir. Cell Mol. Biol . . . vol. 20. 1999, pp. 413-422.
Fujimoto, Official Action, 4 pages, Canada patent appl. No. 2,452,123, Canadian Intellectual Property Office (Sep. 22, 2009).
Garcher et al., "CA 19-9 ELISA test: A new method for studying mucus changes in tears," Br. J. Ophthalmol. 82(1):88-90 (1998).
Gipson et al., "Cellular origin of mucins of the ocular surface tear film," Adv. Exp. Med. Biol. 438:221-227 (1998).
Gleich, "Mechanisms of eosinophil-associated inflammation," J. Allergy Clin. Immunol. 105(4):651-663 (2000).
Graff et al., "Myristoylated and Nonmyristoylated Forms of a Protein Are Phosphorylated by Protein Kinase C," Science 246(4929):503-506 (1989).
Graff et al., "Protein Kinase C Substrate and Inhibitor Characteristics of Peptides Derived from the Myristoylated Alanine-rich C Kinase Substrate (MARCKS) Protein Phosphorylation Site Domain," J. Biol. Chem. 266(22):14390-14398 (1991).
Grosskopf, "Communication pursuant to Article 94(3) EPC," 2 pages, European patent appl. No. 02756467.3, European Patent Office (May 5, 2009).
Grosskopf, "Communication pursuant to Article 94(3) EPC," 2 pages, European patent appl. No. 02756467.3, European Patent Office (Nov. 24, 2009).
Grosskopf, "Communication pursuant to Article 94(3) EPC," 3 pages, European patent appl. No. 02756467.3, European Patent Office (Jul. 9, 2010).
Grosskopf, "Communication pursuant to Article 94(3) EPC," 3 pages, European patent appl. No. 02756467.3, European Patent Office (Jun. 1, 2010).
Grosskopf, "Communication pursuant to Article 96(2) EPC," 3 pages, European patent appl. No. 02756467.3, European Patent Office (Oct. 20, 2006).
Grosskopf, "Supplementary European Search Report," 4 pages, European patent appl. no. 02756467.3, European Patent Office (Nov. 2, 2004).
Grosskopf, "Supplementary Partial European Search Report," 4 pages, European patent appl. No. 02756467.3, European Patent Office (Sep. 3, 2004).
Grosskopf, "Supplementary Partial European Search Report," 5 pages, European patent appl. No. 02756467.3, European Patent Office (Jul. 30, 2004).
Haddad, "International Preliminary Examination Report," 4 pages, PCT appl. No. PCT/US02/22270, IPEA/US United States Patent and Trademark Office (Apr. 22, 2005).
Haddad, "Office Action Summary," 10 pages, U.S. Appl. No. 10/180,753, United States Patent and Trademark Office (mailed Nov. 19, 2003).
Haddad, "Office Action Summary," 12 pages, U.S. Appl. No. 10/802,644, United States Patent and Trademark Office (mailed Nov. 30, 2004).
Haddad, "Office Action Summary," 12 pages, U.S. Appl. No. 10/802,644, United States Patent and Trademark Office (mailed Oct. 21, 2004).
Haddad, "Office Action Summary," 12 pages, U.S. Appl. No. 10/802,644, United States Patent and Trademark Office (mailed Oct. 6, 2006).
Haddad, "Office Action Summary," 14 pages, U.S. Appl. No. 10/180,753, United States Patent and Trademark Office (mailed Jul. 1, 2003).
Haddad, "Office Action Summary," 15 pages, U.S. Appl. No. 10/802,644, United States Patent and Trademark Office (mailed Jan. 11, 2006).
Haddad, "Office Action Summary," 8 pages, U.S. Appl. No. 10/802,644, United States Patent and Trademark Office (mailed Jun. 29, 2005).
Haddad, "Written Opinion," 5 pages, PCT appl. No. PCT/US02/22270, IPEA/US United States Patent and Trademark Office (Jun. 16, 2004).
Harlan et al., "The human myristoylated alanine-rich C kinase substrate (MARCKS) gene (MACS)," J. Biol. Chem. 266(22):14399-14405 (1991).
Heard, "Written Opinion of the International Searching Authority," 3 pages, PCT appl. No. PCT/US07/74514, United States Patent and Trademark Office (mailed Jul. 14, 2008).
Hoff et al., "Effects of glucocorticoids on the TPA-induced monocytic differentiation," J. Leukoc. Biol. 52:173-182 (1992).
Huse, "Communication pursuant to Article 96(2) EPC," 4 pages, Europe patent appl. No. 04024019.4, European Patent Office (Mar. 22, 2006).
Huse, "Communication pursuant to Article 96(2) EPC," 5 pages, Europe patent appl. No. 04024019.4, European Patent Office (Mar. 15, 2007).
Huse, "Partial European Search Report," 4 pages, from European Patent application No. 04024019.4, European Patent Office, The Hague, The Netherlands (mailed May 3, 2005).

(56) References Cited

OTHER PUBLICATIONS

International Search Report and Written Opinion of the International Searching Authority for International Application No. PCT/US2020/037882, dated Oct. 2, 2020, 12 pages.
International Search Report corresponding to PCT/US02/22270 mailed on Jan. 22, 2003.
International Search Report corresponding to PCT/US07/05688 mailed on Feb. 24, 2009.
International Search Report for PCT/US03/21963; mailed Sep. 9, 2004.
International Search Report for PCT/US07/74514; mailed Jul. 14, 2008.
Ito, "Office Action," 6 pages, Japan patent appl. No. 2000-600672, Japan Patent Office (mailed Mar. 24, 2010).
Kessler et al., "Stimulation of goblet cell mucous secretion by activation of nerves in rat conjunctiva," Curr. Eye Res. 14(11):985-992 (1995).
Kim et al., "Airway goblet cell mucin: its structure and regulation of secretion," Eur. Resp. J. 10(11):2644-2649 (1997).
Kim et al., "Airway Mucus," Eur. Respir. J. Vol. 10, 1997, p. 1438.
King et al., "Alteration of Airway Reactivity by Mucus, Respiration Physiology," vol. 62, 1985, pp. 47-59.
Ko et al., "ATP-induced mucin release from cultured airway goblet cells involves, in part, activation of protein kinase C," Am. J. Resp. Cell Mol. Biol. 16:194-198 (1997).
Koelsch et al., "Acetaminophen (paracetamol) inhibits myeloperoxidase-catalyzed oxidant production and biological damage at therapeutically achievable concentrations," Biochem. Pharmacol. 79:1156-1164 (2010).
Krunkosky et al., "Effects of TNFα on Expression of ICAM-1 in Human Airway Epithelial Cells In Vitro," Am. J. Respir. Cell Mol. Biol., vol. 22, 2000, pp. 685-692.
Kuby, "Granulocytic Cells," 3rd ed. Immunology, p. 67, WH Freeman & Co., New York (1997).
Larivee et al., "Platelet-Activating Factor Induces Airway Mucin Release via Activation of Protein Kinase C: Evidence of Translocation of Protein Kinase C to Membranes," Am. J. Respir. Cell Mol. Biol., vol. 11 , 1994, pp. 194-205.
Lethem et al., "Nucleotide Regulation of Goblet Cells in Human Airway Epithelial Explants: Normal Exocytosis in Cystic Fibrosis," Am. J. Respir. Cell Mol. Biol., vol. 9, 1993, pp. 315-322.
Li, Y., et al., "MARCKS Protein is a Key Molecule Regulation Mucin Secretion by Human Airway Epithelial Cells in Vitro," The Journal of Biological Chemistry. 276(44):40982-40990. (Nov. 2, 2001).
Lindner, "International Preliminary Report on Patentability," 6 pages, PCT appl. No. PCT/US2007/005688, The International Bureau of WIPO (Mar. 10, 2009).
Linsen et al., "Physiology of the lacrimal system," Bull. Soc. Belge. Ophtalmol. 238:35-44 (1990).
Liu et al., "Arginine vasopressin (AVP) causes the reversible phosphorylation of the myristoylated alanine-rich C kinase substrate (MARCKS) protein in the ovine anterior pituitary: evidence that MARCKS phosphorylation is associated with adrenocorticotropin (ACTH) secretion," Mol. Cell. Endocrinol. 101:247-256 (1994).
Liu et al., "Arginine vasopressin (AVP) causes the reversible phosphorylation of the myristoylated alanine-rich C kinase substrate (MARCKS) protein in the ovine anterior pituitary: evidence that MARCKS phosphorylation is associated with adrenocorticotropin (ACTH) secretion," Mol. Cell. Endocrinol. 105:217-226 (1994).
Lu et al., "Regulation of angiotensin II-induced neuromodulation by MARCKS in brain neurons," J. Cell Biol. 142(1):217-227 (1998).
Lukton, Office Action, 3 pages, U.S. Appl. No. 12/430,624, United States Patent and Trademark Office (Jun. 2, 2011).
Lukton, Office Action, 4 pages, U.S. Appl. No. 12/430,662, United States Patent and Trademark Office (Apr. 28, 2011).
Lukton, "Office Action Summary," 4 pages, U.S. Appl. No. 11/367,449, United States Patent and Trademark Office (mailed Aug. 6, 2008).
Lukton, "Office Action Summary," 7 pages, U.S. Appl. No. 11/834,446, United States Patent and Trademark Office (mailed Dec. 2, 2010).
Lukton, "Office Action Summary," 7 pages, U.S. Appl. No. 11/834,446, United States Patent and Trademark Office (mailed May 26, 2010).
Mastropasqua et al., "Tear deficiency in Fuchs' intermediate uveitis," Can. J. Ophthalmol. 31(1):18-20 (1996).
Matsubara et al., "Direct Involvement of Protein Myristoylation in Myristoylated Alanine-rich C Kinase Substrate (MARCKS)-Calmodulin Interaction," J. Biol. Chem. 278:48898-48902 (2003).
Matsuura, "Office Action," 2 pages, Japan patent appl. No. 2003-506483, Japan Patent Office (Apr. 3, 2009) with translation attached.
Matsuura, "Office Action," 3 pages, Japan patent appl. No. 2003-506483, Japan Patent Office (Aug. 19, 2008) with translation attached.
McCool et al., "The T84 human colonic adenocarcinoma cell line produces mucin in culture and releases it in response to various secretagogues," Biochem J. 267:491-500 (1990).
Millecamps and Coderre, "Rats with chronic post-ischemia pain exhibit an analgesic sensitivity profile similar to human patients with complex regional pain syndrome—type I," Eur. J. Pharmacol. 583:97-102 (2008).
Murray et al., National Center for Biotechnology Information Database, Accession No. G08525. Feb. 5, 1997.
Murray et al., National Center for Biotechnology Information Database, Accession No. G08539. Feb. 5, 1997.
Myat et al., "Identification of the basolateral targeting determinant of a peripheral membrane protein, MacMarcks, in polarized cells," Current Biology 8(12):677-683 (1998).
Nakamura et al., "Mucin-like glycoprotein secretion is mediated by cyclic-AMP and protein kinase C signal transduction pathways in rat corneal epithelium," Exp. Eye Res. 66(5):513-519 (1998).
Nichols et al., "Demonstration of the mucous layer of the tear film by electron microscopy," Invest. Ophthalmol. Vis. Sci. 26(4):464-473 (1985).
Office Action, CA appl. No. 2,595,406, 3 pages (Jan. 21, 2013).
Office Action, CA appl. No. 2,595,406, 3 pages (Jan. 7, 2014).
Office Action, CN 200680009056.7, 3 pages (Dec. 23, 2011).
Office Action, CN 200680009056.7, 4 pages (Dec. 14, 2010).
Office Action, CN 200680009056.7, 6 pages (Jan. 8, 2010).
Office Action, EP appl. No. 06719011.6, 2 pages (Jun. 29, 2009).
Office Action for Norway Application No. NO20090304, mailed on May 23, 2022, 5 pages.
Office Action, IN appl. No. 2989/KOLNP/2007, 2 pages (Nov. 21, 2013).
Office Action, JP appl. No. 2007-552286, 4 pages (Jun. 9, 2011).
Office Action, KR appl. No. 10-2007-7018950, 4 pages (Aug. 30, 2013).
Office Action, KR appl. No. 10-2007-7018950, 5 pages (Jan. 16, 2013).
Office Action, NZ appl. No. 560412, 2 pages (Feb. 21, 2008).
Office Action, NZ appl. No. 577196, 2 pages (May 26, 2011).
Office Action, NZ appl. No. 577196, 2 pages (Sep. 10, 2010).
Office Action, RU appl. No. 2007131424/13, 2 pages (Dec. 7, 2009).
Office Action, RU appl. No. 2007131424/13, 2 pages (Jul. 21, 2010).
Office Action, U.S. Appl. No. 11/335,564, 6 pages (Jul. 10, 2008).
Office Action, U.S. Appl. No. 11/834,446, 3 pages (Apr. 11, 2012).
Office Action, U.S. Appl. No. 12/359,892, 11 pages (Jun. 26, 2012).
Office Action, U.S. Appl. No. 12/359,892, 12 pages (Jan. 2, 2013).
Office Action, U.S. Appl. No. 12/430,624, 4 pages (Nov. 21, 2011).
Office Action, U.S. Appl. No. 12/430,662, 4 pages (Jul. 10, 2012).
Office Action, U.S. Appl. No. 12/430,662, 4 pages (Nov. 15, 2012).
Office Action, U.S. Appl. No. 12/430,662, 4 pages (Nov. 16, 2011).
Office Action, U.S. Appl. No. 12/478,491, 6 pages (Dec. 13, 2012).
Office Action, U.S. Appl. No. 12/478,491, 6 pages (Oct. 4, 2011).
Office Action, U.S. Appl. No. 12/478,491, 7 pages (Apr. 10, 2012).
"Official Action," 4 pages, Russia patent appl. No. 2009106673/04, Russian Patent Office (Jun. 4, 2010) with translation.
"Official Action," 9 pages, from RU patent appl. No. 2008139414/14, Russian Patent Office (mailed Jun. 3, 2010) with translation attached.
Partial European Search Report, EP Appl. No. 11171749.2, 6 pages (Nov. 25, 2011).

(56) References Cited

OTHER PUBLICATIONS

Pellegrini, "Supplementary European Search Report," 5 pages, European patent appl. No. 07752392.6, European Patent Office (Jun. 6, 2012).
Predel et al., "Isolation and structural elucidation of eight kinins from the retrocerebral complex of the American Cockroach, *Periplaneta americana*," Regulatory Peptides: 71(3):199-205 (1997).
Prescott et al, "Chronic Mucus Hypersecretion in COPD and Death From Pulmonary Infection," Eur. Respir. J., vol. 8, 1995, pp. 1333-1338.
Pubmed MeSH Tree for Granulocyte:(http://www.ncbi.nlm.nih.gov/mesh/68006098?ordinalpos=1&itool=EntrezSystem2.PEntrez.Mesh.Mesh_ResultsPanel.Mesh_RVDocSum) 3 pages.
Ralph, "Conjunctival goblet cell density in normal subjects and in dry eye syndromes," Invest. Ophthalmol. Vis. Sci. 14(4):299-302 (1975).
Raufman et al., "Expression and phosphorylation of a MARCKS-Like Protein in Gastric Chief Cells: Further evidence for modulation of pepsinogen secretion by interaction of CA2+/Calmodulin with protein kinase C," J. Cell. Biochem. 64:514-523 (1997).
Reuhman, "Examination Report," 2 pages, New Zealand patent appl. No. 570938, Intellectual Property Office of New Zealand (May 17, 2010).
Rodriguez, "International Search Report," 7 pages, PCT appl. No. PCT/US2006/002032, European Patent Office (mailed Sep. 27, 2006).
Rodriguez, "Written Opinion of the International Searching Authority," 11 pages, PCT appl. No. PCT/US2006/002032, European Patent Office (mailed Sep. 27, 2006).
Rogers, D.F. "Airway Goblet Cell Hyperplasia in Asthma: Hypersecretory and Anti-Inflammatory?" Clinical and Experimental Allergy. Editorial 32: 1124-1127 (2002).
Rogers, D.F., "Pulmonary mucus: Pediatric Perspective," Pediatric Pulmonology 36:178-188 (2003).
Rogers, "Mucus hypersecretion in chronic obstructive pulmonary disease. Chronic Obstructive Pulmonary Disease: Pathogenesis to Treatment," Novartis Foundation. Symposium 234. vol. 234. (2001).
Salvino, Official Action, 4 pages, Canada patent appl. No. 2,366,951, Canadian Intellectual Property Office (Apr. 7, 2009).
Seki et al., "Binding of Myristoylated Alanine-Rich Protein Kinase C Substrate to Phosphoinositides Attenuates the Phosphorylation by Protein Kinase C," Arch. Biochem. Biophys. 326(2):193-201 (1996).
Shellans et al., "Conjunctival goblet cell response to vasoconstrictor use," J. Ocul. Pharmacol. 5(3):217-220 (1989).
Singer et al., "A MARCKS-related peptide blocks mucus hypersecretion in a moue model of asthma," Nat. Med. 10:193-196 (2004).
Sitzia and Huggins, "Side Effects of Cyclophosphamide, Methotrexate, and 5-Fluorouracil (CMF) Chemotherapy for Breast Cancer," Cancer Practice 6:13-21 (1998).
Steel and Hanrahan, "Muscarinic-induced mucin secretin and intracellular signaling by hamster tracheal goblet cells," Am. J. Physiol. Lung Cell Mol. Physiol. 272:230-237 (1997).
Steiger et al., "Concurrent Increases in the Storage and Release of Mucin-like Molecules by Rat Airway Epithelial Cells in Response to Bacterial Endotoxin," Am. J. Respir. Cell Mol. Biol., vol. 12, 1995, pp. 307-314.

Stein, "International Search Report," 5 pages, from international patent application PCT/US00/05050, European Patent Office, Rijswijk, The Netherlands (mailed Sep. 9, 2000).
Stormshak et al., "Dynamics of molecular mechanisms underlying ovarian oxytocin secretion," J. Reprod. Fertil. Suppl. 49:379-390 (1995).
Stumpo et al., "Molecular cloning, characterization, and expression of a cDNA encoding the '80-87-kDA' myristoylated alanine-rich C kinase substrate: A major cellular substrate for protein kinase C," Proc. Natl. Acad. Sci. USA 86:4012-4016 (1989).
Sutherland, "Examiner's first report on patent application No. 2008200379," 2 pages, Australia patent appl. No. 2008200379, IP Australia (Jul. 31, 2009).
Takashi et al., "A Peptide Against the N-Terminus of Myristoylated Alanine-Rich C Kinase Substrate Inhibits Degranulation of Human Leukocytes In Vitro," Am. J. Respir. Cell. Mol. Biol. 34:647-652 (2006).
Thelen et al., "Regulation by phosphorylation of the reversible association of a myristoylated protein kinase C substrate with the plasma membrane," Nature 351:320-322 (1991).
Thelen et al., "Tumor necrosis factor alpha modifies agonist-dependent responses in human neutrophils by inducing the synthesis and myristoylation of a specific protein kinase C substrate," Proc. Natl. Acad. Sci. USA 87(15):5603-5607 (1990).
Theron et al., "Inhibitory Effects of Non-steroidal Anti-inflammatory Drugs on Human Myeloperoxidase," S. Afr. Med. J. 56:670-675 (1979).
Thornton et al., "Identification of Two Glycoforms of the MUC5B Mucin in Human Respiratory Mucus," The Journal of Biological Chemistry, vol. 272, No. 14, Apr. 4, 1997, pp. 9561-9566.
Tseng "Topical tretinoin treatment for severe dry-eye disorders," J. Am. Acad. Dermatol. 15(4 part 2):860-866 (1986).
Vandenbogaerde, "Communication," and "Supplementary European Search Report," 7 pages, Europe patent appl. No. 07840538.8, European Patent Office (May 6, 2011).
Vergeres et al., "The myristoyl moiety of myristoylated alanine-rich C kinase substrate (MARCKS) and MARCKS-related protein is embedded in the membrane," J. Biol. Chem. 270(34):19879-19887 (1995).
Vishwanath et al., "Adherence of Pseudomonas aeruginosa to Human Tracheobronchial Mucin," Infection and Immunity, vol. 45, No. 1, Jul. 1984, pp. 197-202.
Ward, P.A. and Mulligan M.S., "Blocking of adhesion molecules in vivo as anti-inflammatory therapy." Ther. Immunol. 1(3):165-171 (1994).
Wjst et al., "A genome-wide search for linkage to asthma," Genomics 58:1-8, 1999.
Wright et al., "Oxidant stress stimulates mucin secretion and PLC in airway epithelium via a nitric oxide-dependent mechanism," American J. Physiol., vol. 271, pp. L854-L861, (1996).
Xu et al., "Genome wide screen and identification of gene-gene interactions for asthma-susceptibility in three U.S. populations: Collaborative study on the genetics of asthma," American Journal of Human Genetics. 68:1437-1446 (2001).
Zhao, Y., et al. "Role of MARCKS in regulating endothelial cell proliferation." Am J Physiol Cell Physiol. 279:C1611-C1620. (2000).

\* cited by examiner

SEQUENCE LISTING

<160> NUMBER OF SEQ ID NOS: 252

<210> SEQ ID NO 1
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 1

Gly Ala Gln Phe Ser Lys Thr Ala Ala Lys Gly Glu Ala Ala Ala Glu
1               5                   10                  15

Arg Pro Gly Glu Ala Ala Val Ala
            20

<210> SEQ ID NO 2
<211> LENGTH: 23
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 2

Gly Ala Gln Phe Ser Lys Thr Ala Ala Lys Gly Glu Ala Ala Ala Glu
1               5                   10                  15

Arg Pro Gly Glu Ala Ala Val
            20

<210> SEQ ID NO 3
<211> LENGTH: 23
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 3

Ala Gln Phe Ser Lys Thr Ala Ala Lys Gly Glu Ala Ala Ala Glu Arg
1               5                   10                  15

Pro Gly Glu Ala Ala Val Ala
            20

<210> SEQ ID NO 4
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 4

Gly Ala Gln Phe Ser Lys Thr Ala Ala Lys Gly Glu Ala Ala Ala Glu
1               5                   10                  15

```
Arg Pro Gly Glu Ala Ala
            20

<210> SEQ ID NO 5
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 5

Ala Gln Phe Ser Lys Thr Ala Ala Lys Gly Glu Ala Ala Ala Glu Arg
1               5                   10                  15

Pro Gly Glu Ala Ala Val
            20

<210> SEQ ID NO 6
<211> LENGTH: 22
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 6

Gln Phe Ser Lys Thr Ala Ala Lys Gly Glu Ala Ala Ala Glu Arg Pro
1               5                   10                  15

Gly Glu Ala Ala Val Ala
            20

<210> SEQ ID NO 7
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 7

Gly Ala Gln Phe Ser Lys Thr Ala Ala Lys Gly Glu Ala Ala Ala Glu
1               5                   10                  15

Arg Pro Gly Glu Ala
            20

<210> SEQ ID NO 8
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 8

Ala Gln Phe Ser Lys Thr Ala Ala Lys Gly Glu Ala Ala Ala Glu Arg
1               5                   10                  15
```

Pro Gly Glu Ala Ala
            20

<210> SEQ ID NO 9
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 9

Gln Phe Ser Lys Thr Ala Ala Lys Gly Glu Ala Ala Ala Glu Arg Pro
1               5                   10                  15

Gly Glu Ala Ala Val
            20

<210> SEQ ID NO 10
<211> LENGTH: 21
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 10

Phe Ser Lys Thr Ala Ala Lys Gly Glu Ala Ala Ala Glu Arg Pro Gly
1               5                   10                  15

Glu Ala Ala Val Ala
            20

<210> SEQ ID NO 11
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 11

Gly Ala Gln Phe Ser Lys Thr Ala Ala Lys Gly Glu Ala Ala Ala Glu
1               5                   10                  15

Arg Pro Gly Glu
            20

<210> SEQ ID NO 12
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 12

Ala Gln Phe Ser Lys Thr Ala Ala Lys Gly Glu Ala Ala Ala Glu Arg

```
Pro Gly Glu Ala
            20

<210> SEQ ID NO 13
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 13

Gln Phe Ser Lys Thr Ala Ala Lys Gly Glu Ala Ala Ala Glu Arg Pro
1               5                   10                  15

Gly Glu Ala Ala
            20

<210> SEQ ID NO 14
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 14

Phe Ser Lys Thr Ala Ala Lys Gly Glu Ala Ala Ala Glu Arg Pro Gly
1               5                   10                  15

Glu Ala Ala Val
            20

<210> SEQ ID NO 15
<211> LENGTH: 20
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 15

Ser Lys Thr Ala Ala Lys Gly Glu Ala Ala Ala Glu Arg Pro Gly Glu
1               5                   10                  15

Ala Ala Val Ala
            20

<210> SEQ ID NO 16
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 16
```

```
Gly Ala Gln Phe Ser Lys Thr Ala Ala Lys Gly Glu Ala Ala Ala Glu
1               5                   10                  15

Arg Pro Gly

<210> SEQ ID NO 17
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 17

Ala Gln Phe Ser Lys Thr Ala Ala Lys Gly Glu Ala Ala Ala Glu Arg
1               5                   10                  15

Pro Gly Glu

<210> SEQ ID NO 18
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 18

Gln Phe Ser Lys Thr Ala Ala Lys Gly Glu Ala Ala Ala Glu Arg Pro
1               5                   10                  15

Gly Glu Ala

<210> SEQ ID NO 19
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 19

Phe Ser Lys Thr Ala Ala Lys Gly Glu Ala Ala Ala Glu Arg Pro Gly
1               5                   10                  15

Glu Ala Ala

<210> SEQ ID NO 20
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 20

Ser Lys Thr Ala Ala Lys Gly Glu Ala Ala Ala Glu Arg Pro Gly Glu
1               5                   10                  15
```

Ala Ala Val

<210> SEQ ID NO 21
<211> LENGTH: 19
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 21

Lys Thr Ala Ala Lys Gly Glu Ala Ala Ala Glu Arg Pro Gly Glu Ala
1               5                   10                  15

Ala Val Ala

<210> SEQ ID NO 22
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 22

Gly Ala Gln Phe Ser Lys Thr Ala Ala Lys Gly Glu Ala Ala Ala Glu
1               5                   10                  15

Arg Pro

<210> SEQ ID NO 23
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 23

Ala Gln Phe Ser Lys Thr Ala Ala Lys Gly Glu Ala Ala Ala Glu Arg
1               5                   10                  15

Pro Gly

<210> SEQ ID NO 24
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 24

Gln Phe Ser Lys Thr Ala Ala Lys Gly Glu Ala Ala Ala Glu Arg Pro
1               5                   10                  15

Gly Glu

```
<210> SEQ ID NO 25
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 25

Phe Ser Lys Thr Ala Ala Lys Gly Glu Ala Ala Ala Glu Arg Pro Gly
1               5                   10                  15

Glu Ala

<210> SEQ ID NO 26
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 26

Ser Lys Thr Ala Ala Lys Gly Glu Ala Ala Ala Glu Arg Pro Gly Glu
1               5                   10                  15

Ala Ala

<210> SEQ ID NO 27
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 27

Lys Thr Ala Ala Lys Gly Glu Ala Ala Ala Glu Arg Pro Gly Glu Ala
1               5                   10                  15

Ala Val

<210> SEQ ID NO 28
<211> LENGTH: 18
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 28

Thr Ala Ala Lys Gly Glu Ala Ala Ala Glu Arg Pro Gly Glu Ala Ala
1               5                   10                  15

Val Ala

<210> SEQ ID NO 29
<211> LENGTH: 17
<212> TYPE: PRT
```

```
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 29

Gly Ala Gln Phe Ser Lys Thr Ala Ala Lys Gly Glu Ala Ala Ala Glu
1               5                   10                  15
Arg

<210> SEQ ID NO 30
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 30

Ala Gln Phe Ser Lys Thr Ala Ala Lys Gly Glu Ala Ala Ala Glu Arg
1               5                   10                  15
Pro

<210> SEQ ID NO 31
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 31

Gln Phe Ser Lys Thr Ala Ala Lys Gly Glu Ala Ala Ala Glu Arg Pro
1               5                   10                  15
Gly

<210> SEQ ID NO 32
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 32

Phe Ser Lys Thr Ala Ala Lys Gly Glu Ala Ala Ala Glu Arg Pro Gly
1               5                   10                  15
Glu

<210> SEQ ID NO 33
<211> LENGTH: 17
<212> TYPE: PRT
<213> ORGANISM: Artificial Sequence
<220> FEATURE:
<223> OTHER INFORMATION: Description of Artificial Sequence: Synthetic
```

```
        peptide
<220> FEATURE:
<223> OTHER INFORMATION: Peptide may or may not be C-term and/or N-term
      modified

<400> SEQUENCE: 33

Ser Lys Thr Ala Ala Lys Gly Glu Ala Ala Ala Glu Arg Pro Gly Glu
1               5                   10                  15

Ala

<210> SEQ ID NO 34
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 34

Lys Thr Ala Ala Lys Gly Glu Ala Ala Ala Glu Arg Pro Gly Glu Ala
1               5                   10                  15

Ala

<210> SEQ ID NO 35
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 35

Thr Ala Ala Lys Gly Glu Ala Ala Ala Glu Arg Pro Gly Glu Ala Ala
1               5                   10                  15

Val

<210> SEQ ID NO 36
<211> LENGTH: 17
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 36

Ala Ala Lys Gly Glu Ala Ala Ala Glu Arg Pro Gly Glu Ala Ala Val
1               5                   10                  15

Ala

<210> SEQ ID NO 37
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
```

-continued modified

<400> SEQUENCE: 37

Gly Ala Gln Phe Ser Lys Thr Ala Ala Lys Gly Glu Ala Ala Ala Glu
1               5                   10                  15

<210> SEQ ID NO 38
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 38

Ala Gln Phe Ser Lys Thr Ala Ala Lys Gly Glu Ala Ala Ala Glu Arg
1               5                   10                  15

<210> SEQ ID NO 39
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 39

Gln Phe Ser Lys Thr Ala Ala Lys Gly Glu Ala Ala Ala Glu Arg Pro
1               5                   10                  15

<210> SEQ ID NO 40
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 40

Phe Ser Lys Thr Ala Ala Lys Gly Glu Ala Ala Ala Glu Arg Pro Gly
1               5                   10                  15

<210> SEQ ID NO 41
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 41

Ser Lys Thr Ala Ala Lys Gly Glu Ala Ala Ala Glu Arg Pro Gly Glu
1               5                   10                  15

<210> SEQ ID NO 42
<211> LENGTH: 16
<212> TYPE: PRT

<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 42

Lys Thr Ala Ala Lys Gly Glu Ala Ala Ala Glu Arg Pro Gly Glu Ala
1               5                   10                  15

<210> SEQ ID NO 43
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 43

Thr Ala Ala Lys Gly Glu Ala Ala Ala Glu Arg Pro Gly Glu Ala Ala
1               5                   10                  15

<210> SEQ ID NO 44
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 44

Ala Ala Lys Gly Glu Ala Ala Ala Glu Arg Pro Gly Glu Ala Ala Val
1               5                   10                  15

<210> SEQ ID NO 45
<211> LENGTH: 16
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 45

Ala Lys Gly Glu Ala Ala Ala Glu Arg Pro Gly Glu Ala Ala Val Ala
1               5                   10                  15

<210> SEQ ID NO 46
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 46

Gly Ala Gln Phe Ser Lys Thr Ala Ala Lys Gly Glu Ala Ala Ala

<210> SEQ ID NO 47
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 47

Ala Gln Phe Ser Lys Thr Ala Ala Lys Gly Glu Ala Ala Ala Glu
1               5                   10                  15

<210> SEQ ID NO 48
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 48

Gln Phe Ser Lys Thr Ala Ala Lys Gly Glu Ala Ala Ala Glu Arg
1               5                   10                  15

<210> SEQ ID NO 49
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 49

Phe Ser Lys Thr Ala Ala Lys Gly Glu Ala Ala Ala Glu Arg Pro
1               5                   10                  15

<210> SEQ ID NO 50
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 50

Ser Lys Thr Ala Ala Lys Gly Glu Ala Ala Ala Glu Arg Pro Gly
1               5                   10                  15

<210> SEQ ID NO 51
<211> LENGTH: 15
<212> TYPE: PRT
<213> ORGANISM: Artificial Sequence
<220> FEATURE:
<223> OTHER INFORMATION: Description of Artificial Sequence: Synthetic
      peptide
<220> FEATURE:

<223> OTHER INFORMATION: Peptide may or may not be C-term and/or N-term
     modified

<400> SEQUENCE: 51

Lys Thr Ala Ala Lys Gly Glu Ala Ala Ala Glu Arg Pro Gly Glu
1               5                   10                  15

<210> SEQ ID NO 52
<211> LENGTH: 15
<212> TYPE: PRT
<213> ORGANISM: Artificial Sequence
<220> FEATURE:
<223> OTHER INFORMATION: Description of Artificial Sequence: Synthetic
     peptide
<220> FEATURE:
<223> OTHER INFORMATION: Peptide may or may not be C-term and/or N-term
     modified

<400> SEQUENCE: 52

Thr Ala Ala Lys Gly Glu Ala Ala Ala Glu Arg Pro Gly Glu Ala
1               5                   10                  15

<210> SEQ ID NO 53
<211> LENGTH: 15
<212> TYPE: PRT
<213> ORGANISM: Artificial Sequence
<220> FEATURE:
<223> OTHER INFORMATION: Description of Artificial Sequence: Synthetic
     peptide
<220> FEATURE:
<223> OTHER INFORMATION: Peptide may or may not be C-term and/or N-term
     modified

<400> SEQUENCE: 53

Ala Ala Lys Gly Glu Ala Ala Ala Glu Arg Pro Gly Glu Ala Ala
1               5                   10                  15

<210> SEQ ID NO 54
<211> LENGTH: 15
<212> TYPE: PRT
<213> ORGANISM: Artificial Sequence
<220> FEATURE:
<223> OTHER INFORMATION: Description of Artificial Sequence: Synthetic
     peptide
<220> FEATURE:
<223> OTHER INFORMATION: Peptide may or may not be C-term and/or N-term
     modified

<400> SEQUENCE: 54

Ala Lys Gly Glu Ala Ala Ala Glu Arg Pro Gly Glu Ala Ala Val
1               5                   10                  15

<210> SEQ ID NO 55
<211> LENGTH: 15
<212> TYPE: PRT
<213> ORGANISM: Artificial Sequence
<220> FEATURE:
<223> OTHER INFORMATION: Description of Artificial Sequence: Synthetic
     peptide
<220> FEATURE:
<223> OTHER INFORMATION: Peptide may or may not be C-term and/or N-term
     modified

<400> SEQUENCE: 55

Lys Gly Glu Ala Ala Ala Glu Arg Pro Gly Glu Ala Ala Val Ala
1               5                   10                  15

<210> SEQ ID NO 56
<211> LENGTH: 14

```
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 56

Gly Ala Gln Phe Ser Lys Thr Ala Ala Lys Gly Glu Ala Ala
1               5                   10

<210> SEQ ID NO 57
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 57

Ala Gln Phe Ser Lys Thr Ala Ala Lys Gly Glu Ala Ala Ala
1               5                   10

<210> SEQ ID NO 58
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 58

Gln Phe Ser Lys Thr Ala Ala Lys Gly Glu Ala Ala Ala Glu
1               5                   10

<210> SEQ ID NO 59
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 59

Phe Ser Lys Thr Ala Ala Lys Gly Glu Ala Ala Ala Glu Arg
1               5                   10

<210> SEQ ID NO 60
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 60
```

Ser Lys Thr Ala Ala Lys Gly Glu Ala Ala Ala Glu Arg Pro
1               5                   10

<210> SEQ ID NO 61
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 61

Lys Thr Ala Ala Lys Gly Glu Ala Ala Ala Glu Arg Pro Gly
1               5                   10

<210> SEQ ID NO 62
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 62

Thr Ala Ala Lys Gly Glu Ala Ala Ala Glu Arg Pro Gly Glu
1               5                   10

<210> SEQ ID NO 63
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 63

Ala Ala Lys Gly Glu Ala Ala Ala Glu Arg Pro Gly Glu Ala
1               5                   10

<210> SEQ ID NO 64
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 64

Ala Lys Gly Glu Ala Ala Ala Glu Arg Pro Gly Glu Ala Ala
1               5                   10

<210> SEQ ID NO 65
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide

```
<220> FEATURE:
<223> OTHER INFORMATION: Peptide may or may not be C-term and/or N-term
      modified

<400> SEQUENCE: 65

Lys Gly Glu Ala Ala Ala Glu Arg Pro Gly Glu Ala Ala Val
1               5                   10

<210> SEQ ID NO 66
<211> LENGTH: 14
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 66

Gly Glu Ala Ala Ala Glu Arg Pro Gly Glu Ala Ala Val Ala
1               5                   10

<210> SEQ ID NO 67
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 67

Gly Ala Gln Phe Ser Lys Thr Ala Ala Lys Gly Glu Ala
1               5                   10

<210> SEQ ID NO 68
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 68

Ala Gln Phe Ser Lys Thr Ala Ala Lys Gly Glu Ala Ala
1               5                   10

<210> SEQ ID NO 69
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 69

Gln Phe Ser Lys Thr Ala Ala Lys Gly Glu Ala Ala Ala
1               5                   10

<210> SEQ ID NO 70
```

```
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 70

Phe Ser Lys Thr Ala Ala Lys Gly Glu Ala Ala Ala Glu
1               5                   10

<210> SEQ ID NO 71
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 71

Ser Lys Thr Ala Ala Lys Gly Glu Ala Ala Ala Glu Arg
1               5                   10

<210> SEQ ID NO 72
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 72

Lys Thr Ala Ala Lys Gly Glu Ala Ala Ala Glu Arg Pro
1               5                   10

<210> SEQ ID NO 73
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 73

Thr Ala Ala Lys Gly Glu Ala Ala Ala Glu Arg Pro Gly
1               5                   10

<210> SEQ ID NO 74
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 74
```

```
Ala Ala Lys Gly Glu Ala Ala Ala Glu Arg Pro Gly Glu
1               5                   10
```

<210> SEQ ID NO 75
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 75

```
Ala Lys Gly Glu Ala Ala Ala Glu Arg Pro Gly Glu Ala
1               5                   10
```

<210> SEQ ID NO 76
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 76

```
Lys Gly Glu Ala Ala Ala Glu Arg Pro Gly Glu Ala Ala
1               5                   10
```

<210> SEQ ID NO 77
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 77

```
Gly Glu Ala Ala Ala Glu Arg Pro Gly Glu Ala Ala Val
1               5                   10
```

<210> SEQ ID NO 78
<211> LENGTH: 13
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 78

```
Glu Ala Ala Ala Glu Arg Pro Gly Glu Ala Ala Val Ala
1               5                   10
```

<210> SEQ ID NO 79
<211> LENGTH: 12
<212> TYPE: PRT
<213> ORGANISM: Artificial Sequence
<220> FEATURE:
<223> OTHER INFORMATION: Description of Artificial Sequence: Synthetic peptide
<220> FEATURE:
<223> OTHER INFORMATION: Peptide may or may not be C-term and/or N-term
      modified

<400> SEQUENCE: 79

Gly Ala Gln Phe Ser Lys Thr Ala Ala Lys Gly Glu
1               5                   10

<210> SEQ ID NO 80
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 80

Ala Gln Phe Ser Lys Thr Ala Ala Lys Gly Glu Ala
1               5                   10

<210> SEQ ID NO 81
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 81

Gln Phe Ser Lys Thr Ala Ala Lys Gly Glu Ala Ala
1               5                   10

<210> SEQ ID NO 82
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 82

Phe Ser Lys Thr Ala Ala Lys Gly Glu Ala Ala Ala
1               5                   10

<210> SEQ ID NO 83
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 83

Ser Lys Thr Ala Ala Lys Gly Glu Ala Ala Ala Glu
1               5                   10

```
<210> SEQ ID NO 84
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 84

Lys Thr Ala Ala Lys Gly Glu Ala Ala Ala Glu Arg
1               5                   10

<210> SEQ ID NO 85
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 85

Thr Ala Ala Lys Gly Glu Ala Ala Ala Glu Arg Pro
1               5                   10

<210> SEQ ID NO 86
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 86

Ala Ala Lys Gly Glu Ala Ala Ala Glu Arg Pro Gly
1               5                   10

<210> SEQ ID NO 87
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 87

Ala Lys Gly Glu Ala Ala Ala Glu Arg Pro Gly Glu
1               5                   10

<210> SEQ ID NO 88
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified
```

```
<400> SEQUENCE: 88

Lys Gly Glu Ala Ala Ala Glu Arg Pro Gly Glu Ala
1               5                   10

<210> SEQ ID NO 89
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 89

Gly Glu Ala Ala Ala Glu Arg Pro Gly Glu Ala Ala
1               5                   10

<210> SEQ ID NO 90
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 90

Glu Ala Ala Ala Glu Arg Pro Gly Glu Ala Ala Val
1               5                   10

<210> SEQ ID NO 91
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 91

Ala Ala Ala Glu Arg Pro Gly Glu Ala Ala Val Ala
1               5                   10

<210> SEQ ID NO 92
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 92

Gly Ala Gln Phe Ser Lys Thr Ala Ala Lys Gly
1               5                   10

<210> SEQ ID NO 93
<211> LENGTH: 11
<212> TYPE: PRT
<213> ORGANISM: Artificial Sequence
<220> FEATURE:
```

<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 93

Ala Gln Phe Ser Lys Thr Ala Ala Lys Gly Glu
1               5                   10

<210> SEQ ID NO 94
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 94

Gln Phe Ser Lys Thr Ala Ala Lys Gly Glu Ala
1               5                   10

<210> SEQ ID NO 95
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 95

Phe Ser Lys Thr Ala Ala Lys Gly Glu Ala Ala
1               5                   10

<210> SEQ ID NO 96
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 96

Ser Lys Thr Ala Ala Lys Gly Glu Ala Ala Ala
1               5                   10

<210> SEQ ID NO 97
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 97

Lys Thr Ala Ala Lys Gly Glu Ala Ala Ala Glu
1               5                   10

```
<210> SEQ ID NO 98
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 98

Thr Ala Ala Lys Gly Glu Ala Ala Ala Glu Arg
1               5                   10

<210> SEQ ID NO 99
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 99

Ala Ala Lys Gly Glu Ala Ala Ala Glu Arg Pro
1               5                   10

<210> SEQ ID NO 100
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 100

Ala Lys Gly Glu Ala Ala Ala Glu Arg Pro Gly
1               5                   10

<210> SEQ ID NO 101
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 101

Lys Gly Glu Ala Ala Ala Glu Arg Pro Gly Glu
1               5                   10

<210> SEQ ID NO 102
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified
```

```
<400> SEQUENCE: 102

Gly Glu Ala Ala Ala Glu Arg Pro Gly Glu Ala
1               5                   10

<210> SEQ ID NO 103
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 103

Glu Ala Ala Ala Glu Arg Pro Gly Glu Ala Ala
1               5                   10

<210> SEQ ID NO 104
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 104

Ala Ala Ala Glu Arg Pro Gly Glu Ala Ala Val
1               5                   10

<210> SEQ ID NO 105
<211> LENGTH: 11
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 105

Ala Ala Glu Arg Pro Gly Glu Ala Ala Val Ala
1               5                   10

<210> SEQ ID NO 106
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 106

Gly Ala Gln Phe Ser Lys Thr Ala Ala Lys
1               5                   10

<210> SEQ ID NO 107
<211> LENGTH: 10
<212> TYPE: PRT
<213> ORGANISM: Artificial Sequence
```

```
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 107

Ala Gln Phe Ser Lys Thr Ala Ala Lys Gly
1               5                   10

<210> SEQ ID NO 108
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 108

Gln Phe Ser Lys Thr Ala Ala Lys Gly Glu
1               5                   10

<210> SEQ ID NO 109
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 109

Phe Ser Lys Thr Ala Ala Lys Gly Glu Ala
1               5                   10

<210> SEQ ID NO 110
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 110

Ser Lys Thr Ala Ala Lys Gly Glu Ala Ala
1               5                   10

<210> SEQ ID NO 111
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 111

Lys Thr Ala Ala Lys Gly Glu Ala Ala Ala
1               5                   10
```

```
<210> SEQ ID NO 112
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 112

Thr Ala Ala Lys Gly Glu Ala Ala Ala Glu
1               5                   10

<210> SEQ ID NO 113
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 113

Ala Ala Lys Gly Glu Ala Ala Ala Glu Arg
1               5                   10

<210> SEQ ID NO 114
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 114

Ala Lys Gly Glu Ala Ala Ala Glu Arg Pro
1               5                   10

<210> SEQ ID NO 115
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 115

Lys Gly Glu Ala Ala Ala Glu Arg Pro Gly
1               5                   10

<210> SEQ ID NO 116
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
``` modified

<400> SEQUENCE: 116

Gly Glu Ala Ala Ala Glu Arg Pro Gly Glu
1               5                   10

<210> SEQ ID NO 117
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 117

Glu Ala Ala Ala Glu Arg Pro Gly Glu Ala
1               5                   10

<210> SEQ ID NO 118
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 118

Ala Ala Ala Glu Arg Pro Gly Glu Ala Ala
1               5                   10

<210> SEQ ID NO 119
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 119

Ala Ala Glu Arg Pro Gly Glu Ala Ala Val
1               5                   10

<210> SEQ ID NO 120
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 120

Ala Glu Arg Pro Gly Glu Ala Ala Val Ala
1               5                   10

<210> SEQ ID NO 121
<211> LENGTH: 9
<212> TYPE: PRT

```
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 121

Gly Ala Gln Phe Ser Lys Thr Ala Ala
1               5

<210> SEQ ID NO 122
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 122

Ala Gln Phe Ser Lys Thr Ala Ala Lys
1               5

<210> SEQ ID NO 123
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 123

Gln Phe Ser Lys Thr Ala Ala Lys Gly
1               5

<210> SEQ ID NO 124
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 124

Phe Ser Lys Thr Ala Ala Lys Gly Glu
1               5

<210> SEQ ID NO 125
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 125

Ser Lys Thr Ala Ala Lys Gly Glu Ala
```

```
<210> SEQ ID NO 126
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 126

Lys Thr Ala Ala Lys Gly Glu Ala Ala
1               5

<210> SEQ ID NO 127
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 127

Thr Ala Ala Lys Gly Glu Ala Ala Ala
1               5

<210> SEQ ID NO 128
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 128

Ala Ala Lys Gly Glu Ala Ala Ala Glu
1               5

<210> SEQ ID NO 129
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 129

Ala Lys Gly Glu Ala Ala Ala Glu Arg
1               5

<210> SEQ ID NO 130
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
```

```
<223> OTHER INFORMATION: Peptide may or may not be C-term and/or N-term
     modified

<400> SEQUENCE: 130

Lys Gly Glu Ala Ala Ala Glu Arg Pro
1               5

<210> SEQ ID NO 131
<211> LENGTH: 9
<212> TYPE: PRT
<213> ORGANISM: Artificial Sequence
<220> FEATURE:
<223> OTHER INFORMATION: Description of Artificial Sequence: Synthetic
     peptide
<220> FEATURE:
<223> OTHER INFORMATION: Peptide may or may not be C-term and/or N-term
     modified

<400> SEQUENCE: 131

Gly Glu Ala Ala Ala Glu Arg Pro Gly
1               5

<210> SEQ ID NO 132
<211> LENGTH: 9
<212> TYPE: PRT
<213> ORGANISM: Artificial Sequence
<220> FEATURE:
<223> OTHER INFORMATION: Description of Artificial Sequence: Synthetic
     peptide
<220> FEATURE:
<223> OTHER INFORMATION: Peptide may or may not be C-term and/or N-term
     modified

<400> SEQUENCE: 132

Glu Ala Ala Ala Glu Arg Pro Gly Glu
1               5

<210> SEQ ID NO 133
<211> LENGTH: 9
<212> TYPE: PRT
<213> ORGANISM: Artificial Sequence
<220> FEATURE:
<223> OTHER INFORMATION: Description of Artificial Sequence: Synthetic
     peptide
<220> FEATURE:
<223> OTHER INFORMATION: Peptide may or may not be C-term and/or N-term
     modified

<400> SEQUENCE: 133

Ala Ala Ala Glu Arg Pro Gly Glu Ala
1               5

<210> SEQ ID NO 134
<211> LENGTH: 9
<212> TYPE: PRT
<213> ORGANISM: Artificial Sequence
<220> FEATURE:
<223> OTHER INFORMATION: Description of Artificial Sequence: Synthetic
     peptide
<220> FEATURE:
<223> OTHER INFORMATION: Peptide may or may not be C-term and/or N-term
     modified

<400> SEQUENCE: 134

Ala Ala Glu Arg Pro Gly Glu Ala Ala
1               5

<210> SEQ ID NO 135
<211> LENGTH: 9
```

```
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 135

Ala Glu Arg Pro Gly Glu Ala Ala Val
1               5

<210> SEQ ID NO 136
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 136

Glu Arg Pro Gly Glu Ala Ala Val Ala
1               5

<210> SEQ ID NO 137
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 137

Gly Ala Gln Phe Ser Lys Thr Ala
1               5

<210> SEQ ID NO 138
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 138

Ala Gln Phe Ser Lys Thr Ala Ala
1               5

<210> SEQ ID NO 139
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 139
```

```
Gln Phe Ser Lys Thr Ala Ala Lys
1               5
```

<210> SEQ ID NO 140
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 140

```
Phe Ser Lys Thr Ala Ala Lys Gly
1               5
```

<210> SEQ ID NO 141
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 141

```
Ser Lys Thr Ala Ala Lys Gly Glu
1               5
```

<210> SEQ ID NO 142
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 142

```
Lys Thr Ala Ala Lys Gly Glu Ala
1               5
```

<210> SEQ ID NO 143
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 143

```
Thr Ala Ala Lys Gly Glu Ala Ala
1               5
```

<210> SEQ ID NO 144
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide

```
<220> FEATURE:
<223> OTHER INFORMATION: Peptide may or may not be C-term and/or N-term
      modified

<400> SEQUENCE: 144

Ala Ala Lys Gly Glu Ala Ala Ala
1               5

<210> SEQ ID NO 145
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 145

Ala Lys Gly Glu Ala Ala Ala Glu
1               5

<210> SEQ ID NO 146
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 146

Lys Gly Glu Ala Ala Ala Glu Arg
1               5

<210> SEQ ID NO 147
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 147

Gly Glu Ala Ala Ala Glu Arg Pro
1               5

<210> SEQ ID NO 148
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 148

Glu Ala Ala Ala Glu Arg Pro Gly
1               5

<210> SEQ ID NO 149
```

```
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 149

Ala Ala Ala Glu Arg Pro Gly Glu
1               5

<210> SEQ ID NO 150
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 150

Ala Ala Glu Arg Pro Gly Glu Ala
1               5

<210> SEQ ID NO 151
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 151

Ala Glu Arg Pro Gly Glu Ala Ala
1               5

<210> SEQ ID NO 152
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 152

Glu Arg Pro Gly Glu Ala Ala Val
1               5

<210> SEQ ID NO 153
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 153
```

Arg Pro Gly Glu Ala Ala Val Ala
1               5

<210> SEQ ID NO 154
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 154

Gly Ala Gln Phe Ser Lys Thr
1               5

<210> SEQ ID NO 155
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 155

Ala Gln Phe Ser Lys Thr Ala
1               5

<210> SEQ ID NO 156
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 156

Gln Phe Ser Lys Thr Ala Ala
1               5

<210> SEQ ID NO 157
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 157

Phe Ser Lys Thr Ala Ala Lys
1               5

<210> SEQ ID NO 158
<211> LENGTH: 7
<212> TYPE: PRT
<213> ORGANISM: Artificial Sequence
<220> FEATURE:
<223> OTHER INFORMATION: Description of Artificial Sequence: Synthetic peptide
<220> FEATURE:
<223> OTHER INFORMATION: Peptide may or may not be C-term and/or N-term
      modified

<400> SEQUENCE: 158

Ser Lys Thr Ala Ala Lys Gly
1               5

<210> SEQ ID NO 159
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 159

Lys Thr Ala Ala Lys Gly Glu
1               5

<210> SEQ ID NO 160
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 160

Thr Ala Ala Lys Gly Glu Ala
1               5

<210> SEQ ID NO 161
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 161

Ala Ala Lys Gly Glu Ala Ala
1               5

<210> SEQ ID NO 162
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 162

Ala Lys Gly Glu Ala Ala Ala
1               5

```
<210> SEQ ID NO 163
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 163

Lys Gly Glu Ala Ala Ala Glu
1               5

<210> SEQ ID NO 164
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 164

Gly Glu Ala Ala Ala Glu Arg
1               5

<210> SEQ ID NO 165
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 165

Glu Ala Ala Ala Glu Arg Pro
1               5

<210> SEQ ID NO 166
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 166

Ala Ala Ala Glu Arg Pro Gly
1               5

<210> SEQ ID NO 167
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified
```

```
<400> SEQUENCE: 167

Ala Ala Glu Arg Pro Gly Glu
1               5

<210> SEQ ID NO 168
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 168

Ala Glu Arg Pro Gly Glu Ala
1               5

<210> SEQ ID NO 169
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 169

Glu Arg Pro Gly Glu Ala Ala
1               5

<210> SEQ ID NO 170
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 170

Arg Pro Gly Glu Ala Ala Val
1               5

<210> SEQ ID NO 171
<211> LENGTH: 7
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 171

Pro Gly Glu Ala Ala Val Ala
1               5

<210> SEQ ID NO 172
<211> LENGTH: 6
<212> TYPE: PRT
<213> ORGANISM: Artificial Sequence
<220> FEATURE:
```

```
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 172

Gly Ala Gln Phe Ser Lys
1               5

<210> SEQ ID NO 173
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 173

Ala Gln Phe Ser Lys Thr
1               5

<210> SEQ ID NO 174
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 174

Gln Phe Ser Lys Thr Ala
1               5

<210> SEQ ID NO 175
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 175

Phe Ser Lys Thr Ala Ala
1               5

<210> SEQ ID NO 176
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 176

Ser Lys Thr Ala Ala Lys
1               5
```

<210> SEQ ID NO 177
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 177

Lys Thr Ala Ala Lys Gly
1               5

<210> SEQ ID NO 178
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 178

Thr Ala Ala Lys Gly Glu
1               5

<210> SEQ ID NO 179
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 179

Ala Ala Lys Gly Glu Ala
1               5

<210> SEQ ID NO 180
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 180

Ala Lys Gly Glu Ala Ala
1               5

<210> SEQ ID NO 181
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

```
<400> SEQUENCE: 181

Lys Gly Glu Ala Ala Ala
1               5

<210> SEQ ID NO 182
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 182

Gly Glu Ala Ala Ala Glu
1               5

<210> SEQ ID NO 183
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 183

Glu Ala Ala Ala Glu Arg
1               5

<210> SEQ ID NO 184
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 184

Ala Ala Ala Glu Arg Pro
1               5

<210> SEQ ID NO 185
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 185

Ala Ala Glu Arg Pro Gly
1               5

<210> SEQ ID NO 186
<211> LENGTH: 6
<212> TYPE: PRT
<213> ORGANISM: Artificial Sequence
```

```
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 186

Ala Glu Arg Pro Gly Glu
1               5

<210> SEQ ID NO 187
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 187

Glu Arg Pro Gly Glu Ala
1               5

<210> SEQ ID NO 188
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 188

Arg Pro Gly Glu Ala Ala
1               5

<210> SEQ ID NO 189
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 189

Pro Gly Glu Ala Ala Val
1               5

<210> SEQ ID NO 190
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 190

Gly Glu Ala Ala Val Ala
1               5
```

<210> SEQ ID NO 191
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 191

Gly Ala Gln Phe Ser
1               5

<210> SEQ ID NO 192
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 192

Ala Gln Phe Ser Lys
1               5

<210> SEQ ID NO 193
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 193

Gln Phe Ser Lys Thr
1               5

<210> SEQ ID NO 194
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 194

Phe Ser Lys Thr Ala
1               5

<210> SEQ ID NO 195
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term

```
                              modified

<400> SEQUENCE: 195

Ser Lys Thr Ala Ala
1               5

<210> SEQ ID NO 196
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 196

Lys Thr Ala Ala Lys
1               5

<210> SEQ ID NO 197
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 197

Thr Ala Ala Lys Gly
1               5

<210> SEQ ID NO 198
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 198

Ala Ala Lys Gly Glu
1               5

<210> SEQ ID NO 199
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 199

Ala Lys Gly Glu Ala
1               5

<210> SEQ ID NO 200
<211> LENGTH: 5
<212> TYPE: PRT
```

```
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 200

Lys Gly Glu Ala Ala
1               5

<210> SEQ ID NO 201
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 201

Gly Glu Ala Ala Ala
1               5

<210> SEQ ID NO 202
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 202

Glu Ala Ala Ala Glu
1               5

<210> SEQ ID NO 203
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 203

Ala Ala Ala Glu Arg
1               5

<210> SEQ ID NO 204
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 204

Ala Ala Glu Arg Pro
```

1               5

<210> SEQ ID NO 205
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 205

Ala Glu Arg Pro Gly
1               5

<210> SEQ ID NO 206
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 206

Glu Arg Pro Gly Glu
1               5

<210> SEQ ID NO 207
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 207

Arg Pro Gly Glu Ala
1               5

<210> SEQ ID NO 208
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 208

Pro Gly Glu Ala Ala
1               5

<210> SEQ ID NO 209
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:

```
<223> OTHER INFORMATION: Peptide may or may not be C-term and/or N-term
      modified

<400> SEQUENCE: 209

Gly Glu Ala Ala Val
1               5

<210> SEQ ID NO 210
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 210

Glu Ala Ala Val Ala
1               5

<210> SEQ ID NO 211
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 211

Gly Ala Gln Phe
1

<210> SEQ ID NO 212
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 212

Ala Gln Phe Ser
1

<210> SEQ ID NO 213
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 213

Gln Phe Ser Lys
1

<210> SEQ ID NO 214
<211> LENGTH: 4
```

```
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 214

Phe Ser Lys Thr
1

<210> SEQ ID NO 215
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 215

Ser Lys Thr Ala
1

<210> SEQ ID NO 216
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 216

Lys Thr Ala Ala
1

<210> SEQ ID NO 217
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 217

Thr Ala Ala Lys
1

<210> SEQ ID NO 218
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 218
```

Ala Ala Lys Gly
1

<210> SEQ ID NO 219
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 219

Ala Lys Gly Glu
1

<210> SEQ ID NO 220
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 220

Lys Gly Glu Ala
1

<210> SEQ ID NO 221
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 221

Gly Glu Ala Ala
1

<210> SEQ ID NO 222
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 222

Glu Ala Ala Ala
1

<210> SEQ ID NO 223
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

```
<220> FEATURE:
<223> OTHER INFORMATION: Peptide may or may not be C-term and/or N-term
      modified

<400> SEQUENCE: 223

Ala Ala Ala Glu
1

<210> SEQ ID NO 224
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 224

Ala Ala Glu Arg
1

<210> SEQ ID NO 225
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 225

Ala Glu Arg Pro
1

<210> SEQ ID NO 226
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 226

Glu Arg Pro Gly
1

<210> SEQ ID NO 227
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 227

Arg Pro Gly Glu
1

<210> SEQ ID NO 228
```

```
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 228

Pro Gly Glu Ala
1

<210> SEQ ID NO 229
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 229

Gly Glu Ala Ala
1

<210> SEQ ID NO 230
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 230

Glu Ala Ala Val
1

<210> SEQ ID NO 231
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 231

Ala Ala Val Ala
1

<210> SEQ ID NO 232
<211> LENGTH: 24
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 232
```

Gly Thr Ala Pro Ala Glu Gly Ala Gly Ala Glu Val Lys Arg Ala
1               5                   10                  15

Ser Ala Glu Ala Lys Gln Ala Phe
                20

<210> SEQ ID NO 233
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 233

Gly Lys Gln Phe Ser Lys Thr Ala Ala Lys Gly Glu
1               5                   10

<210> SEQ ID NO 234
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 234

Gly Ala Gln Phe Ser Lys Thr Lys Ala Lys Gly Glu
1               5                   10

<210> SEQ ID NO 235
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 235

Gly Lys Gln Phe Ser Lys Thr Lys Ala Lys Gly Glu
1               5                   10

<210> SEQ ID NO 236
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 236

Gly Ala Gln Ala Ser Lys Thr Ala Ala Lys
1               5                   10

<210> SEQ ID NO 237
<211> LENGTH: 12
<212> TYPE: PRT

```
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 237

Gly Ala Gln Ala Ser Lys Thr Ala Ala Lys Gly Glu
1               5                   10

<210> SEQ ID NO 238
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 238

Gly Ala Glu Phe Ser Lys Thr Ala Ala Lys Gly Glu
1               5                   10

<210> SEQ ID NO 239
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 239

Gly Ala Gln Phe Ser Lys Thr Ala Ala Ala Gly Glu
1               5                   10

<210> SEQ ID NO 240
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 240

Gly Ala Gln Phe Ser Lys Thr Ala Ala Lys Ala Glu
1               5                   10

<210> SEQ ID NO 241
<211> LENGTH: 12
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 241

Gly Ala Gln Phe Ser Lys Thr Ala Ala Lys Gly Ala
```

```
1               5                   10
```

<210> SEQ ID NO 242
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 242

```
Ala Ala Gln Phe Ser Lys Thr Ala Ala Lys
1               5                   10
```

<210> SEQ ID NO 243
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 243

```
Gly Ala Ala Phe Ser Lys Thr Ala Ala Lys
1               5                   10
```

<210> SEQ ID NO 244
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 244

```
Gly Ala Gln Phe Ala Lys Thr Ala Ala Lys
1               5                   10
```

<210> SEQ ID NO 245
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 245

```
Gly Ala Gln Phe Ser Ala Thr Ala Ala Lys
1               5                   10
```

<210> SEQ ID NO 246
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:

<223> OTHER INFORMATION: Peptide may or may not be C-term and/or N-term
      modified

<400> SEQUENCE: 246

Lys Ala Ala Thr Lys Ser Phe Gln Ala Gly
1               5                   10

<210> SEQ ID NO 247
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 247

Gly Ala Gln Phe Ser Lys Ala Ala Ala Lys
1               5                   10

<210> SEQ ID NO 248
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 248

Gly Ala Gln Phe Ser Lys Thr Ala Ala Ala
1               5                   10

<210> SEQ ID NO 249
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 249

Gly Ala Gln Phe Ser Ala Thr Ala Ala Ala
1               5                   10

<210> SEQ ID NO 250
<211> LENGTH: 8
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 250

Gly Ala Gln Ala Ser Lys Thr Ala
1               5

<210> SEQ ID NO 251
<211> LENGTH: 4

```
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 251

Ala Ala Gly Glu
1

<210> SEQ ID NO 252
<211> LENGTH: 10
<212> TYPE: PRT
<213> ORGANISM: Artificial Sequence
<220> FEATURE:
<223> OTHER INFORMATION: Description of Artificial Sequence: Synthetic
      peptide
<220> FEATURE:
<223> OTHER INFORMATION: Peptide may or may not be C-term and/or N-term
      modified

<400> SEQUENCE: 252

Gly Lys Ala Ser Gln Phe Ala Lys Thr Ala
1               5                   10
```

PEPTIDES AND METHODS OF USE THEREOF IN TREATING UVEITIS

CROSS REFERENCE TO RELATED APPLICATIONS

This application is a U.S. National Stage application under 35 U.S.C. § 371 of International Application No. PCT/US2020/037882, filed Jun. 16, 2020, which claims the benefit of priority to U.S. Provisional Application No. 62/862,326, filed Jun. 17, 2019, the contents of each of which is herein incorporated by reference in its entirety for all purposes.

TECHNICAL FIELD

The present disclosure relates to peptides or peptide compositions and methods of their use to treat ocular inflammation and ocular disorders associated with inflammation, such as uveitis. The present disclosure also relates to use of these peptides or peptide compositions to modulate an intracellular signaling mechanism regulating the migration of inflammatory cells and secretion of inflammatory mediators from these cells.

DESCRIPTION OF THE TEXT FILE SUBMITTED ELECTRONICALLY

The contents of the text file submitted electronically herewith are incorporated by reference in their entirety: a computer readable format copy of the Sequence Listing (filename: BMRK_007_01WO_SeqList.txt, date recorded: Jun. 16, 2020; file size: 80 kb).

BACKGROUND

Uveitis is an ophthalmic disease, which has both infectious and non-infectious causes. Uveitis may be caused by a chronic inflammatory condition affecting one or both eyes. Uveitis, the most common form of intra-ocular inflammation, accounts for 10-15% of preventable blindness in the US. Approximately 100,000 individuals in the US suffer from uveitis and thus, uveitis may be considered as an orphan disease. There are five types of non-infectious uveitis: (1) anterior uveitis, which affects the front of the eye; (2) intermediate uveitis, which affects the middle of the eye; (3) posterior uveitis, which affects the back of the eye, including the choroid, retina, and optic nerve; (4) panuveitis, which affects all parts of the eye; and (5) autoimmune uveitis.

Non-infectious uveitis is caused by inflammation, which may be treated with corticosteroids, in form of eye drops and supplemented by oral, or intravenous injection of steroids. Atropine may be used topically to relieve pain and spasm of the iris caused by corneal ulcers, and to treat uveitis in dogs and cats. Atropine is an anticholinergic or parasympatholytic agent. Also, scopolamine and isopropamide belong to this class of drugs. Atropine acts on the parasympathetic nervous system, blocking the transmission of acetylcholine.

In certain cases, immunosuppresive agents or biologics such as Humira® (adalimumab) are prescribed. Treatment with corticosteroids may have severe side effects including development of posterior subcapsular cataracts, secondary open-angle cataract, secondary infection, bone loss, and HPA axis suppression. Treatment with biologics such as adalimumab also have a series of potential severe side effects including weakening immune system thus making the body prone to upper respiratory infections, bacterial, viral infections including hepatitis B, allergic reactions, nervous system problems, and psoriasis. Therefore, there is an acute medical need for an effective therapeutic agent for uveitis which does not result in one or more of the side effects described above.

SUMMARY

The disclosure provides a method of treating uveitis in a subject comprising, administering to said subject a therapeutically effective amount of a composition comprising at least one peptide having an amino acid sequence selected from the group consisting of: (a) an amino acid sequence having from 4 to 24 contiguous amino acids of a reference sequence, GAQFSKTAAKGEAAAERPGEAAVA (SEQ ID NO: 1); (b) an amino acid sequence having the sequence, GAQFSKTAAKGEAAAERPGEAAVA (SEQ ID NO: 1); and (c) an amino acid sequence with at least about 75% identity to the amino acid sequence defined in (a) or (b).

In some aspects, the peptide comprises at least nine contiguous amino acid residues of SEQ ID NO: 1. In some aspects, the peptide comprises an amino acid sequence of SEQ ID NO: 106. In some aspects, the peptide comprises an amino acid sequence of SEQ ID NO: 121. In some aspects, the peptide is myristoylated or acetylated at the N-terminal amino acid. In some aspects, the peptide is acetylated at the N-terminal amino acid, and consists of an amino acid sequence of SEQ ID NO: 106. In some aspects, the peptide is acetylated at the N-terminal amino acid, and consists of an amino acid sequence of SEQ ID NO: 121. In some aspects, the peptide comprises at least four contiguous amino acid residues of SEQ ID NO: 1. In some aspects, the peptide comprises at least ten contiguous amino acid residues of SEQ ID NO: 1. In some aspects, the peptide is amidated with ammonia at the C-terminal amino acid.

In some aspects, the peptide comprises an amino acid sequence of at least about 75% identity to the amino acid sequence set forth in SEQ ID NOS: 79, 106, 121, 137, 219, 233, 234, 235, 236, 237, 238, 239, 240, 241, 242, 243, 244, 245, 247, 248, 249, 250, 251 or 252. In some aspects, the peptide is acetylated at the N-terminal amino acid. In some aspects, the peptide is myristoylated at the N-terminal amino acid. In some aspects, the peptide is amidated with ammonia at the C-terminal amino acid. In some embodiments, the peptides are straight chain peptides. In some embodiments, the peptide are cyclic peptides. In some embodiments, the peptides are pegylated.

In some aspects, the administering step causes a reduction in the rate of release of at least one inflammatory mediator from an inflammatory cell in the eye of the subject, and/or the amount of at least one inflammatory mediator released from an inflammatory cell in the eye of the subject. In some aspects, the composition comprises a pharmaceutically acceptable carrier. In some aspects, the subject is a mammal. In some aspects, the mammal is selected from the group consisting of humans, canines, equines and felines.

In some aspects, the administering is done by topical administration, intravitreal injection (IVT), subconjuctival injection, subtenon injection (SBT), retrobulbar injection, periocular injection, subretinal injection, intrascleral, transscleral, intrastromal, intravenous injection, intra-ocular administration, or any combination thereof. In some aspects, the composition comprises a topical formulation, intra-ocular formulation, an eye implant, an eye drop, eye gel, ointment, microspheres, microemulsion, liposomal formulation or any combination thereof. In some aspects, the composition is administered by intravitreal injection, in one or more dosing sessions. For example, in some embodiments, the composition is administered by daily intravitreal injections. In some aspects, the composition is administered by topical administration. For example, in some embodiments, the composition is administered by daily topical administrations. In some embodiments, each daily topical administration comprises one, two, or three topical administrations on each day, for example, approximately one administration every 8 hours. In some embodiments, the composition is administered both by intravitreal injection and by topical administration. In some embodiments, the composition is administered by intravitreal injection in a first dosing session, and administered by topical administration in one or more subsequent dosing sessions. For example, in some embodiments, the composition is administered by intravitreal injection and subsequently administered via topical administrations for 1, 2, 3, 4, 5, or more days. In further embodiments, on each day that the composition is administered topically, the composition is administered once, twice, or three times.

In some aspects, the method further comprises administration to the subject a second molecule, wherein the second molecule is an antibiotic, an antiviral compound, an antiparasitic compound, an anti-inflammatory compound, an immunomodulatory compound, or any combination thereof.

In some aspects, the uveitis is selected from the group consisting of anterior uveitis, intermediate uveitis, posterior uveitis, and panuveitis. In some aspects, the uveitis is inflammatory or autoimmune. In some aspects, the peptide is administered at a concentration from about 1 μM to about 10 mM. In some aspects, the peptide is administered in an amount of about 1 μg to about 5 mg. In some aspects, the peptide is administered in a volume of about 0.01 mL to about 5 mL.

The disclosure further provides a composition comprising at least one peptide having an amino acid sequence selected from the group consisting of: (a) an amino acid sequence having from 4 to 24 contiguous amino acids of a reference sequence, GAQFSKTAAKGEAAAERPGEAAVA (SEQ ID NO. 1); (b) an amino acid sequence having the sequence, GAQFSKTAAKGEAAAERPGEAAVA (SEQ ID NO. 1); and (c) an amino acid sequence with at least about 75% identity to the amino acid sequence defined in (a) or (b), for use in a method of treating uveitis in a subject, the method comprising administering the composition to the subject.

BRIEF DESCRIPTION OF THE DRAWINGS

FIG. 5 is based on the blinded ocular evaluation in conjunction with Ocular Inflammation/Irritation Scoring as given in Table 3. N=4 rats per group. Means±SD.

DETAILED DESCRIPTION

Definitions

Figure 1:
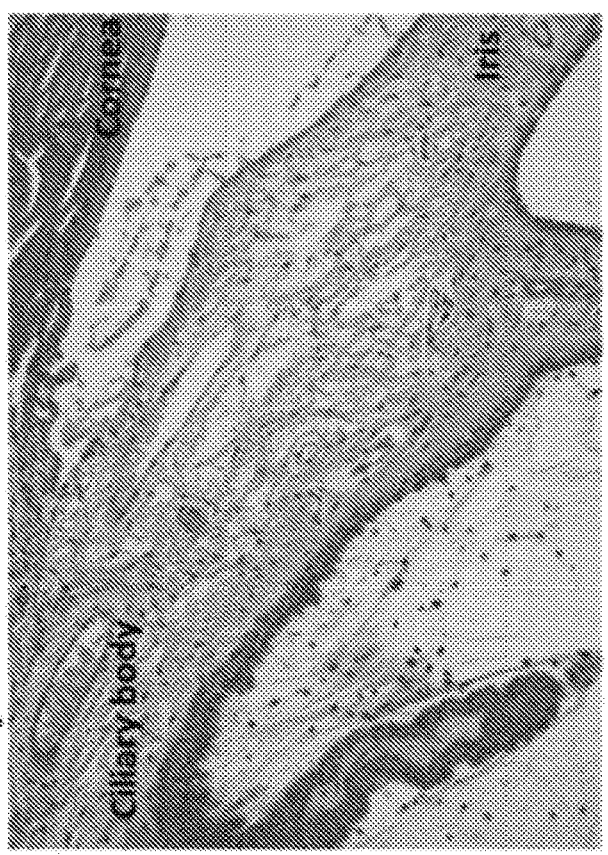
FIG. 1 shows representative images of histologic sections of rabbit eyes 24 hrs after intravitreal injection of PBS (left panel) or 10 ng LPS in 50 μl PBS (right panel), stained with H&E. Tissue swelling and inflammatory cell influx are apparent in the LPS injected eye (right). Original magnification 40×.
Figure 1:
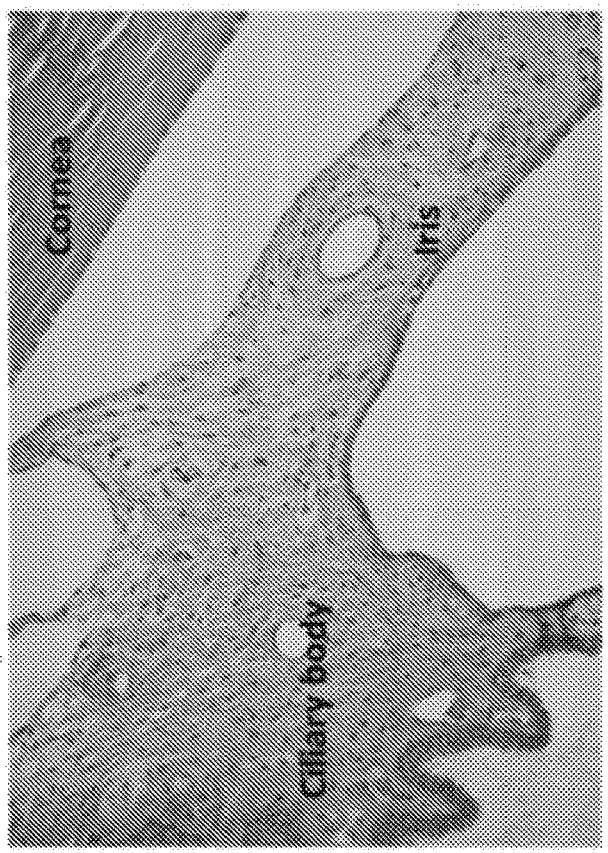

It is to be understood that the terminology used herein is for the purpose of describing particular embodiments only and is not intended to be limiting.

Unless defined otherwise, all technical and scientific terms used herein have the same meaning as commonly understood to one of ordinary skill in the art to which the present application belongs. Although any methods and materials similar or equivalent to those described herein can be used in the practice or testing of the present application, representative methods and materials are herein described.

Following long-standing patent law convention, the terms "a", "an", and "the" refer to "one or more" when used in this application, including the claims. Thus, for example, reference to "a carrier" includes mixtures of one or more carriers, two or more carriers, and the like and reference to "the method" includes reference to equivalent steps and/or methods known to those skilled in the art, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in the present specification and attached claims are approximations that can vary depending upon the desired properties sought to be obtained by the present application. Generally the term "about", as used herein in references to a measurable value such as an amount of weight, time, dose, etc. is meant to encompass values within an acceptable degree of variability in the art. In some embodiments, degree of variability is based on FDA guidelines.

As used herein, "treatment" is an approach for obtaining beneficial or desired clinical results. For purposes of this disclosure, beneficial or desired clinical results include, but are not limited to, one or more of the following: alleviation of one or more symptoms of ocular inflammation or ocular conditions (e.g., uveitis) including lessening severity of eye inflammation, shortening duration of eye inflammation, reducing the incidence of, managing, ameliorating, preventing, and/or delaying the development or progression of eye inflammation, improving vision or stopping or slowing the progression of vision loss, reducing eye pain, redness, and/or sensitivity to light, or reducing the progression or severity of any one or more of macular edema, glaucoma, cataracts, or other conditions associated with ocular inflammation and/or uveitis.

The term "effective amount" or "therapeutically effective amount" refers to the amount of an agent that is sufficient to achieve an outcome, for example, to affect beneficial or desired results. The therapeutically effective amount may vary depending upon one or more of: the subject and disease condition being treated, the weight and age of the subject, the severity of the disease condition, the manner of administration and the like.MARCKS protein MARCKS protein is an actin-binding protein and contributes to cytoskeleton orientation and function, and cell migration. In some embodiments, the N-terminal MARCKS peptides disclosed herein inhibit directed migration of various cell types including inflammatory cells such as leukocytes, Leukocytes synthesize a number of inflammatory mediators that are stored in cytoplasmic membrane-bound granules. Examples of such mediators include, but are not limited to, myeloperoxidase [MPO] in neutrophils, eosinophil peroxidase [EPO] and major basic protein [MBP] in eosinophils, lysozyme in monocytes/macrophages, and granzyme in natural killer (NK) cells and cytotoxic lymphocytes. Such mediators are released at sites of injury and contribute to inflammation and tissue repair via an exocytotic mechanism. However, regulatory molecules and specific pathways involved in the exocytotic process have not been fully described.

Several exogenous stimuli can provoke degranulation of leukocytes via a pathway that involves activation of protein kinase C and subsequent phosphorylation and dephosphorylation events. MARCKS protein (where MARCKS as used herein means "Myristoylated Alanine-Rich C Kinase Substrate"), is a ubiquitous phosphorylation target of protein kinase C (PKC), and is highly expressed in leukocytes. MARCKS protein is mechanistically involved in a process of exocytotic secretion of mucin by goblet cells that line respiratory airways. MARCKS, a protein of approximately 82 kD, has three evolutionarily-conserved regions, an N-terminus, a phosphorylation site domain (or PSD), and a multiple homology 2 (MH2) domain. MARCKS is myristoylated via an amide bond at the N-terminal amino acid in the MARCKS protein's amino acid sequence at the alpha-amine position of the glycine which resides at the N-terminus (i.e., at position 1) of amino acid sequence via a reaction catalyzed by myristoyl CoA:protein N-myristoyl transferase (NMT). The mechanism appears to involve binding of MARCKS, a myristoylated protein, to membranes of intracellular granules.

The myristoylated N-terminal region of MARCKS appears to be integral to the secretory process because it has been shown to block both mucin secretion and binding of MARCKS to mucin granule membranes in goblet cells. This peptide contains 24 L-amino acids of the MARCKS protein beginning with the N-terminal glycine of the MARCKS protein which is myristoylated via an amide bond and is known as myristoylated alpha-N-terminal sequence (or "MANS", also interchangeably referred to as the "MARCKS N-terminus"); i.e., Myristoyl-GAQFSK-TAAKGEAAAERPGEAAVA (SEQ ID NO: 1). The peptide fragments of the MANS peptide disclosed herein, also preferably are composed of L-amino acids. As MARCKS is an actin-binding protein, it is critical for cytoskeleton orientation and function and cell migration. In some embodiments, the N-terminal MARCKS peptides disclosed herein inhibit directed migration of human neutrophils, fibroblasts, and airway epithelial cells.

In inflammatory diseases, such as uveitis, asthma, COPD and chronic bronchitis; in genetic diseases such as cystic fibrosis; in allergic conditions (atopy, allergic inflammation); in bronchiectasis; and in a number of acute, infectious respiratory illnesses such as pneumonia, rhinitis, influenza or the common cold, arthritis or auto-immune diseases, inflammatory cells are usually found in or migrate to areas of injury or infection associated with inflammatory disease states in patients suffering from such diseases. These inflammatory cells can contribute greatly to the pathology of diseases via tissue damage done by inflammatory mediators released from these cells. One example of such tissue damage or destruction via this chronic inflammation occurs in uveitis.

Involvement of MARCKS protein in release of inflammatory mediators from the granules of infiltrating leukocytes is relevant to inflammation in diseases in all tissues and organs, including ophthalmic diseases, such as uveitis, lung diseases characterized by airway inflammation, such as asthma, COPD and cystic fibrosis.

Peptides Derived from N-Terminus of MARCKS

The disclosure provides peptides fragments (interchangeably referred to as just "fragments" or just "peptides") derived from the MARCKS N-terminus. In some aspects, these peptide fragments play a role in the reducing the rate and/or amount of release of inflammatory mediators granules or vesicles in inflammatory leukocytes.

In some aspects, the peptides disclosed herein are derived from the MARCKS N-terminus, i.e., contiguous peptide fragments derived from within the N-terminal 1-to-24 amino acid sequence of MARCKS. In some aspects, the peptides are N-terminal amides of such fragments, such as N-terminal acetic acid amides of such fragments, and/or as well as C-terminal amides of such fragments, such as C-terminal amides of ammonia. In some aspects, the peptides can inhibit or reduce the rate and/or amount of release of inflammatory mediators from inflammatory leukocytes, for example, by inhibiting the process of degranulation in inflammatory leukocytes. Such inhibition or reduction in release comprises inhibition of a MARCKS-related release of inflammatory mediators from inflammatory leukocytes.

In another aspect, the MANS peptide or fragments thereof, and amides of such fragments as described herein, can compete for membrane binding in inflammatory cells with native MARCKS protein to attenuate (lessen or reduce) MARCKS-related release of mediators of inflammation from granules or vesicles containing such mediators of inflammation in such inflammatory cells.

In some aspects, the peptides have from about 4 to about 23 contiguous amino acid residues of the MANS peptide amino acid sequence. In some aspects, the fragments may be N-terminal-myristoylated if they do not begin with the N-terminal glycine at position 1 in SEQ ID NO: 1, or may be N-terminal-acylated with C2 to C12 acyl groups, including N-terminal-acetylated, and/or C-terminal amidated with an NH2 group.

Leukocyte cell types and model cell types that secrete specific granule contents in response to phorbol ester induced activation of PKC are useful for the in vitro demonstration of efficacy of peptides disclosed herein. The attenuation of release of membrane-bound inflammatory mediators by compounds and compositions of this disclosure can be demonstrated using human leukocyte cell lines. For example, neutrophils isolated from human blood can be used to demonstrate attenuation or inhibition of release of myeloperoxidase (MPO). The human promyelocytic cell line HL-60 clone 15 can be used to demonstrate attenuation of release or inhibition of release or secretion of eosinophil peroxidase (EPO) by compounds and compositions of this disclosure. The monocytic leukemia cell line U937 can be used to demonstrate attenuation of release or inhibition of release or secretion of lysozyme by compounds and compositions of this disclosure. The lymphocyte natural killer cell line NK-92 can be used to demonstrate attenuation or inhibition of release of granzyme by compounds and compositions of this disclosure. In an in vitro method to inhibit or attenuate the release of a mediator of inflammation such as those described herein, each of the cell types is preincubated with a peptide compound or peptide composition of this disclosure over a range of concentrations followed by incubation of these cells by a stimulator of release of inflammatory mediators, such as phorbol ester. The percent of inhibition of release of a mediator of inflammation is determined as compared to the release of the mediator in the absence of the peptide compound or peptide composition, such as in a specrophotometric readout of a concentration of the mediator released.

To demonstrate the importance of the relative amino acid sequence positioning in the peptides of the disclosure, the relative ability to inhibit or reduce the amount of inflammatory mediator released by a peptide which is identical to the 24 amino acid sequence of the MARCKS protein N-terminus region (i.e., the MANS—myristoylated alpha-N-terminal sequence peptide) was compared to the ability to inhibit or reduce the amount of inflammatory mediator released by a peptide containing the same 24 amino acid residues present in MANS but which are sequenced in a random order (i.e., an RNS peptide, otherwise referred to as a "Random N-terminal sequence peptide") with respect to the sequence order in MANS. In each of the cell types examined, the MANS peptide, but not the RNS peptide, attenuated release of inflammatory mediators in a concentration-dependent manner over a time course of 0.5-3.0 hrs. These results suggest that the relative amino acid sequence positioning in the peptides of the disclosure which are in the order found in the MARCKS protein, specifically its N-terminal region, and more specifically its 24 amino acid residue N-terminal region are involved in at least one intracellular pathway dealing with the inhibition of leukocyte degranulation.

Table 1 contains a list of amino acid sequences in single letter abbreviation format together with a respectively corresponding peptide number and SEQ ID NO. The reference peptide amino acid sequence (MANS peptide) is listed as peptide 1. Amino acid sequences of peptides of the disclosure having an amino acid sequence of from 4 to 23 contiguous amino acids of the reference amino acid sequence are listed as peptides 2 to 231, together with the amino acid sequence of a random N-terminal sequence (RNS) comprising amino acids of the MANS peptide as peptide 232. Amino acid sequences of representative variants of amino acid sequences of peptides of the disclosure as described herein and are also listed as peptides 233 to 245 and 247 to 251. The variant peptides listed are not intended to be a limiting group of peptides, but are presented only to serve as representative examples of variant peptides of the disclosure. Also presented is a representative reverse amino acid sequence (peptide 246) and a representative random amino acid sequence of peptide (peptide 232) of the disclosure.

In some aspects, the peptide comprises an amino acid sequence with at least about 75%, at least about 80%, at least about 85%, at least about 90%, at least about 95%, at least about 96%, at least about 97%, at least about 98%, at least about 99%, or at least about 99.5% identity to any one of the amino acid sequences listed in Table 1. In some aspects, the peptide comprises any one of the amino acid sequences listed in Table 1. In some aspects, the peptides consist of any one of the amino acid sequences listed in Table 1.

TABLE 1

Peptides and Amino Acid Sequences

| Peptide No. | Sequence | Sequence ID No. |
|---|---|---|
| peptide 1 | GAQFSKTAAKGEAAAERPGEAAVA | SEQ ID NO. 1 |
| peptide 2 | GAQFSKTAAKGEAAAERPGEAAV | SEQ ID NO. 2 |
| peptide 3 | AQFSKTAAKGEAAAERPGEAAVA | SEQ ID NO. 3 |
| peptide 4 | GAQFSKTAAKGEAAAERPGEAA | SEQ ID NO. 4 |
| peptide 5 | AQFSKTAAKGEAAAERPGEAAV | SEQ ID NO. 5 |
| peptide 6 | QFSKTAAKGEAAAERPGEAAVA | SEQ ID NO. 6 |
| peptide 7 | GAQFSKTAAKGEAAAERPGEA | SEQ ID NO. 7 |
| peptide 8 | AQFSKTAAKGEAAAERPGEAA | SEQ ID NO. 8 |
| peptide 9 | QFSKTAAKGEAAAERPGEAAV | SEQ ID NO. 9 |
| peptide 10 | FSKTAAKGEAAAERPGEAAVA | SEQ ID NO. 10 |
| peptide 11 | GAQFSKTAAKGEAAAERPGE | SEQ ID NO. 11 |
| peptide 12 | AQFSKTAAKGEAAAERPGEA | SEQ ID NO. 12 |
| peptide 13 | QFSKTAAKGEAAAERPGEAA | SEQ ID NO. 13 |
| peptide 14 | FSKTAAKGEAAAERPGEAAV | SEQ ID NO. 14 |

TABLE 1-continued

Peptides and Amino Acid Sequences

| Peptide No. | Sequence | Sequence ID No. |
|---|---|---|
| peptide 15 | SKTAAKGEAAAERPGEAAVA | SEQ ID NO. 15 |
| peptide 16 | GAQFSKTAAKGEAAAERPG | SEQ ID NO. 16 |
| peptide 17 | AQFSKTAAKGEAAAERPGE | SEQ ID NO. 17 |
| peptide 18 | QFSKTAAKGEAAAERPGEA | SEQ ID NO. 18 |
| peptide 19 | FSKTAAKGEAAAERPGEAA | SEQ ID NO. 19 |
| peptide 20 | SKTAAKGEAAAERPGEAAV | SEQ ID NO. 20 |
| peptide 21 | KTAAKGEAAAERPGEAAVA | SEQ ID NO. 21 |
| peptide 22 | GAQFSKTAAKGEAAAERP | SEQ ID NO. 22 |
| peptide 23 | AQFSKTAAKGEAAAERPG | SEQ ID NO. 23 |
| peptide 24 | QFSKTAAKGEAAAERPGE | SEQ ID NO. 24 |
| peptide 25 | FSKTAAKGEAAAERPGEA | SEQ ID NO. 25 |
| peptide 26 | SKTAAKGEAAAERPGEAA | SEQ ID NO. 26 |
| peptide 27 | KTAAKGEAAAERPGEAAV | SEQ ID NO. 27 |
| peptide 28 | TAAKGEAAAERPGEAAVA | SEQ ID NO. 28 |
| peptide 29 | GAQFSKTAAKGEAAAER | SEQ ID NO. 29 |
| peptide 30 | AQFSKTAAKGEAAAERP | SEQ ID NO. 30 |
| peptide 31 | QFSKTAAKGEAAAERPG | SEQ ID NO. 31 |
| peptide 32 | FSKTAAKGEAAAERPGE | SEQ ID NO. 32 |
| peptide 33 | SKTAAKGEAAAERPGEA | SEQ ID NO. 33 |
| peptide 34 | KTAAKGEAAAERPGEAA | SEQ ID NO. 34 |
| peptide 35 | TAAKGEAAAERPGEAAV | SEQ ID NO. 35 |
| peptide 36 | AAKGEAAAERPGEAAVA | SEQ ID NO. 36 |
| peptide 37 | GAQFSKTAAKGEAAAE | SEQ ID NO. 37 |
| peptide 38 | AQFSKTAAKGEAAAER | SEQ ID NO. 38 |
| peptide 39 | QFSKTAAKGEAAAERP | SEQ ID NO. 39 |
| peptide 40 | FSKTAAKGEAAAERPG | SEQ ID NO. 40 |
| peptide 41 | SKTAAKGEAAAERPGE | SEQ ID NO. 41 |
| peptide 42 | KTAAKGEAAAERPGEA | SEQ ID NO. 42 |
| peptide 43 | TAAKGEAAAERPGEAA | SEQ ID NO. 43 |
| peptide 44 | AAKGEAAAERPGEAAV | SEQ ID NO. 44 |
| peptide 45 | AKGEAAAERPGEAAVA | SEQ ID NO. 45 |
| peptide 46 | GAQFSKTAAKGEAAA | SEQ ID NO. 46 |
| peptide 47 | AQFSKTAAKGEAAAE | SEQ ID NO. 47 |
| peptide 48 | QFSKTAAKGEAAAER | SEQ ID NO. 48 |
| peptide 49 | FSKTAAKGEAAAERP | SEQ ID NO. 49 |
| peptide 50 | SKTAAKGEAAAERPG | SEQ ID NO. 50 |
| peptide 51 | KTAAKGEAAAERPGE | SEQ ID NO. 51 |
| peptide 52 | TAAKGEAAAERPGEA | SEQ ID NO. 52 |
| peptide 53 | AAKGEAAAERPGEAA | SEQ ID NO. 53 |
| peptide 54 | AKGEAAAERPGEAAV | SEQ ID NO. 54 |
| peptide 55 | KGEAAAERPGEAAVA | SEQ ID NO. 55 |
| peptide 56 | GAQFSKTAAKGEAA | SEQ ID NO. 56 |
| peptide 57 | AQFSKTAAKGEAAA | SEQ ID NO. 57 |
| peptide 58 | QFSKTAAKGEAAAE | SEQ ID NO. 58 |
| peptide 59 | FSKTAAKGEAAAER | SEQ ID NO. 59 |
| peptide 60 | SKTAAKGEAAAERP | SEQ ID NO. 60 |
| peptide 61 | KTAAKGEAAAERPG | SEQ ID NO. 61 |
| peptide 62 | TAAKGEAAAERPGE | SEQ ID NO. 62 |
| peptide 63 | AAKGEAAAERPGEA | SEQ ID NO. 63 |
| peptide 64 | AKGEAAAERPGEAA | SEQ ID NO. 64 |
| peptide 65 | KGEAAAERPGEAAV | SEQ ID NO. 65 |
| peptide 66 | GEAAAERPGEAAVA | SEQ ID NO. 66 |
| peptide 67 | GAQFSKTAAKGEA | SEQ ID NO. 67 |
| peptide 68 | AQFSKTAAKGEAA | SEQ ID NO. 68 |
| peptide 69 | QFSKTAAKGEAAA | SEQ ID NO. 69 |
| peptide 70 | FSKTAAKGEAAAE | SEQ ID NO. 70 |
| peptide 71 | SKTAAKGEAAAER | SEQ ID NO. 71 |
| peptide 72 | KTAAKGEAAAERP | SEQ ID NO. 72 |
| peptide 73 | TAAKGEAAAERPG | SEQ ID NO. 73 |
| peptide 74 | AAKGEAAAERPGE | SEQ ID NO. 74 |
| peptide 75 | AKGEAAAERPGEA | SEQ ID NO. 75 |
| peptide 76 | KGEAAAERPGEAA | SEQ ID NO. 76 |
| peptide 77 | GEAAAERPGEAAV | SEQ ID NO. 77 |
| peptide 78 | EAAAERPGEAAVA | SEQ ID NO. 78 |
| peptide 79 | GAQFSKTAAKGE | SEQ ID NO. 79 |
| peptide 80 | AQFSKTAAKGEA | SEQ ID NO. 80 |
| peptide 81 | QFSKTAAKGEAA | SEQ ID NO. 81 |
| peptide 82 | FSKTAAKGEAAA | SEQ ID NO. 82 |
| peptide 83 | SKTAAKGEAAAE | SEQ ID NO. 83 |
| peptide 84 | KTAAKGEAAAER | SEQ ID NO. 84 |
| peptide 85 | TAAKGEAAAERP | SEQ ID NO. 85 |
| peptide 86 | AAKGEAAAERPG | SEQ ID NO. 86 |
| peptide 87 | AKGEAAAERPGE | SEQ ID NO. 87 |
| peptide 88 | KGEAAAERPGEA | SEQ ID NO. 88 |
| peptide 89 | GEAAAERPGEAA | SEQ ID NO. 89 |

TABLE 1-continued

Peptides and Amino Acid Sequences

| Peptide No. | Sequence | Sequence ID No. |
|---|---|---|
| peptide 90 | EAAAERPGEAAV | SEQ ID NO. 90 |
| peptide 91 | AAAERPGEAAVA | SEQ ID NO. 91 |
| peptide 92 | GAQFSKTAAKG | SEQ ID NO. 92 |
| peptide 93 | AQFSKTAAKGE | SEQ ID NO. 93 |
| peptide 94 | QFSKTAAKGEA | SEQ ID NO. 94 |
| peptide 95 | FSKTAAKGEAA | SEQ ID NO. 95 |
| peptide 96 | SKTAAKGEAAA | SEQ ID NO. 96 |
| peptide 97 | KTAAKGEAAAE | SEQ ID NO. 97 |
| peptide 98 | TAAKGEAAAER | SEQ ID NO. 98 |
| peptide 99 | AAKGEAAAERP | SEQ ID NO. 99 |
| peptide 100 | AKGEAAAERPG | SEQ ID NO. 100 |
| peptide 101 | KGEAAAERPGE | SEQ ID NO. 101 |
| peptide 102 | GEAAAERPGEA | SEQ ID NO. 102 |
| peptide 103 | EAAAERPGEAA | SEQ ID NO. 103 |
| peptide 104 | AAAERPGEAAV | SEQ ID NO. 104 |
| peptide 105 | AAERPGEAAVA | SEQ ID NO. 105 |
| peptide 106 | GAQFSKTAAK | SEQ ID NO. 106 |
| peptide 107 | AQFSKTAAKG | SEQ ID NO. 107 |
| peptide 108 | QFSKTAAKGE | SEQ ID NO. 108 |
| peptide 109 | FSKTAAKGEA | SEQ ID NO. 109 |
| peptide 110 | SKTAAKGEAA | SEQ ID NO. 110 |
| peptide 111 | KTAAKGEAAA | SEQ ID NO. 111 |
| peptide 112 | TAAKGEAAAE | SEQ ID NO. 112 |
| peptide 113 | AAKGEAAAER | SEQ ID NO. 113 |
| peptide 114 | AKGEAAAERP | SEQ ID NO. 114 |
| peptide 115 | KGEAAAERPG | SEQ ID NO. 115 |
| peptide 116 | GEAAAERPGE | SEQ ID NO. 116 |
| peptide 117 | EAAAERPGEA | SEQ ID NO. 117 |
| peptide 118 | AAAERPGEAA | SEQ ID NO. 118 |
| peptide 119 | AAERPGEAAV | SEQ ID NO. 119 |
| peptide 120 | AERPGEAAVA | SEQ ID NO. 120 |
| peptide 121 | GAQFSKTAA | SEQ ID NO. 121 |
| peptide 122 | AQFSKTAAK | SEQ ID NO. 122 |
| peptide 123 | QFSKTAAKG | SEQ ID NO. 123 |
| peptide 124 | FSKTAAKGE | SEQ ID NO. 124 |
| peptide 125 | SKTAAKGEA | SEQ ID NO. 125 |
| peptide 126 | KTAAKGEAA | SEQ ID NO. 126 |
| peptide 127 | TAAKGEAAA | SEQ ID NO. 127 |
| peptide 128 | AAKGEAAAE | SEQ ID NO. 128 |
| peptide 129 | AKGEAAAER | SEQ ID NO. 129 |
| peptide 130 | KGEAAAERP | SEQ ID NO. 130 |
| peptide 131 | GEAAAERPG | SEQ ID NO. 131 |
| peptide 132 | EAAAERPGE | SEQ ID NO. 132 |
| peptide 133 | AAAERPGEA | SEQ ID NO. 133 |
| peptide 134 | AAERPGEAA | SEQ ID NO. 134 |
| peptide 135 | AERPGEAAV | SEQ ID NO. 135 |
| peptide 136 | ERPGEAAVA | SEQ ID NO. 136 |
| peptide 137 | GAQFSKTA | SEQ ID NO. 137 |
| peptide 138 | AQFSKTAA | SEQ ID NO. 138 |
| peptide 139 | QFSKTAAK | SEQ ID NO. 139 |
| peptide 140 | FSKTAAKG | SEQ ID NO. 140 |
| peptide 141 | SKTAAKGE | SEQ ID NO. 141 |
| peptide 142 | KTAAKGEA | SEQ ID NO. 142 |
| peptide 143 | TAAKGEAA | SEQ ID NO. 143 |
| peptide 144 | AAKGEAAA | SEQ ID NO. 144 |
| peptide 145 | AKGEAAAE | SEQ ID NO. 145 |
| peptide 146 | KGEAAAER | SEQ ID NO. 146 |
| peptide 147 | GEAAAERP | SEQ ID NO. 147 |
| peptide 148 | EAAAERPG | SEQ ID NO. 148 |
| peptide 149 | AAAERPGE | SEQ ID NO. 149 |
| peptide 150 | AAERPGEA | SEQ ID NO. 150 |
| peptide 151 | AERPGEAA | SEQ ID NO. 151 |
| peptide 152 | ERPGEAAV | SEQ ID NO. 152 |
| peptide 153 | RPGEAAVA | SEQ ID NO. 153 |
| peptide 154 | GAQFSKT | SEQ ID NO. 154 |
| peptide 155 | AQFSKTA | SEQ ID NO. 155 |
| peptide 156 | QFSKTAA | SEQ ID NO. 156 |
| peptide 157 | FSKTAAK | SEQ ID NO. 157 |
| peptide 158 | SKTAAKG | SEQ ID NO. 158 |
| peptide 159 | KTAAKGE | SEQ ID NO. 159 |
| peptide 160 | TAAKGEA | SEQ ID NO. 160 |
| peptide 161 | AAKGEAA | SEQ ID NO. 161 |
| peptide 162 | AKGEAAA | SEQ ID NO. 162 |
| peptide 163 | KGEAAAE | SEQ ID NO. 163 |
| peptide 164 | GEAAAER | SEQ ID NO. 164 |

TABLE 1-continued

Peptides and Amino Acid Sequences

| Peptide No. | Sequence | Sequence ID No. |
|---|---|---|
| peptide 165 | EAAAERP | SEQ ID NO. 165 |
| peptide 166 | AAAERPG | SEQ ID NO. 166 |
| peptide 167 | AAERPGE | SEQ ID NO. 167 |
| peptide 168 | AERPGEA | SEQ ID NO. 168 |
| peptide 169 | ERPGEAA | SEQ ID NO. 169 |
| peptide 170 | RPGEAAV | SEQ ID NO. 170 |
| peptide 171 | PGEAAVA | SEQ ID NO. 171 |
| peptide 172 | GAQFSK | SEQ ID NO. 172 |
| peptide 173 | AQFSKT | SEQ ID NO. 173 |
| peptide 174 | QFSKTA | SEQ ID NO. 174 |
| peptide 175 | FSKTAA | SEQ ID NO. 175 |
| peptide 176 | SKTAAK | SEQ ID NO. 176 |
| peptide 177 | KTAAKG | SEQ ID NO. 177 |
| peptide 178 | TAAKGE | SEQ ID NO. 178 |
| peptide 179 | AAKGEA | SEQ ID NO. 179 |
| peptide 180 | AKGEAA | SEQ ID NO. 180 |
| peptide 181 | KGEAAA | SEQ ID NO. 181 |
| peptide 182 | GEAAAE | SEQ ID NO. 182 |
| peptide 183 | EAAAER | SEQ ID NO. 183 |
| peptide 184 | AAAERP | SEQ ID NO. 184 |
| peptide 185 | AAERPG | SEQ ID NO. 185 |
| peptide 186 | AERPGE | SEQ ID NO. 186 |
| peptide 187 | ERPGEA | SEQ ID NO. 187 |
| peptide 188 | RPGEAA | SEQ ID NO. 188 |
| peptide 189 | PGEAAV | SEQ ID NO. 189 |
| peptide 190 | GEAAVA | SEQ ID NO. 190 |
| peptide 191 | GAQFS | SEQ ID NO. 191 |
| peptide 192 | AQFSK | SEQ ID NO. 192 |
| peptide 193 | QFSKT | SEQ ID NO. 193 |
| peptide 194 | FSKTA | SEQ ID NO. 194 |
| peptide 195 | SKTAA | SEQ ID NO. 195 |
| peptide 196 | KTAAK | SEQ ID NO. 196 |
| peptide 197 | TAAKG | SEQ ID NO. 197 |
| peptide 198 | AAKGE | SEQ ID NO. 198 |
| peptide 199 | AKGEA | SEQ ID NO. 199 |
| peptide 200 | KGEAA | SEQ ID NO. 200 |
| peptide 201 | GEAAA | SEQ ID NO. 201 |
| peptide 202 | EAAAE | SEQ ID NO. 202 |
| peptide 203 | AAAER | SEQ ID NO. 203 |
| peptide 204 | AAERP | SEQ ID NO. 204 |
| peptide 205 | AERPG | SEQ ID NO. 205 |
| peptide 206 | ERPGE | SEQ ID NO. 206 |
| peptide 207 | RPGEA | SEQ ID NO. 207 |
| peptide 208 | PGEAA | SEQ ID NO. 208 |
| peptide 209 | GEAAV | SEQ ID NO. 209 |
| peptide 210 | EAAVA | SEQ ID NO. 210 |
| peptide 211 | GAQF | SEQ ID NO. 211 |
| peptide 212 | AQFS | SEQ ID NO. 212 |
| peptide 213 | QFSK | SEQ ID NO. 213 |
| peptide 214 | FSKT | SEQ ID NO. 214 |
| peptide 215 | SKTA | SEQ ID NO. 215 |
| peptide 216 | KTAA | SEQ ID NO. 216 |
| peptide 217 | TAAK | SEQ ID NO. 217 |
| peptide 218 | AAKG | SEQ ID NO. 218 |
| peptide 219 | AKGE | SEQ ID NO. 219 |
| peptide 220 | KGEA | SEQ ID NO. 220 |
| peptide 221 | GEAA | SEQ ID NO. 221 |
| peptide 222 | EAAA | SEQ ID NO. 222 |
| peptide 223 | AAAE | SEQ ID NO. 223 |
| peptide 224 | AAER | SEQ ID NO. 224 |
| peptide 225 | AERP | SEQ ID NO. 225 |
| peptide 226 | ERPG | SEQ ID NO. 226 |
| peptide 227 | RPGE | SEQ ID NO. 227 |
| peptide 228 | PGEA | SEQ ID NO. 228 |
| peptide 229 | GEAA | SEQ ID NO. 229 |
| peptide 230 | EAAV | SEQ ID NO. 230 |
| peptide 231 | AAVA | SEQ ID NO. 231 |
| peptide 232 | GTAPAAEGAGAEVKRASAEAKQAF | SEQ ID NO. 232 |
| peptide 233 | GKQFSKTAAKGE | SEQ ID NO. 233 |
| peptide 234 | GAQFSKTKAKGE | SEQ ID NO. 234 |
| peptide 235 | GKQFSKTKAKGE | SEQ ID NO. 235 |
| peptide 236 | GAQASKTAAK | SEQ ID NO. 236 |
| peptide 237 | GAQASKTAAKGE | SEQ ID NO. 237 |
| peptide 238 | GAEFSKTAAKGE | SEQ ID NO. 238 |
| peptide 239 | GAQFSKTAAAGE | SEQ ID NO. 239 |

TABLE 1-continued

Peptides and Amino Acid Sequences

| Peptide No. | Sequence | Sequence ID No. |
|---|---|---|
| peptide 240 | GAQFSKTAAKAE | SEQ ID NO. 240 |
| peptide 241 | GAQFSKTAAKGA | SEQ ID NO. 241 |
| peptide 242 | AAQFSKTAAK | SEQ ID NO. 242 |
| peptide 243 | GAAFSKTAAK | SEQ ID NO. 243 |
| peptide 244 | GAQFAKTAAK | SEQ ID NO. 244 |
| peptide 245 | GAQFSATAAK | SEQ ID NO. 245 |
| peptide 246 | KAATKSFQAG | SEQ ID NO. 246 |
| peptide 247 | GAQFSKAAAK | SEQ ID NO. 247 |
| peptide 248 | GAQFSKTAAA | SEQ ID NO. 248 |
| peptide 249 | GAQFSATAAA | SEQ ID NO. 249 |
| peptide 250 | GAQASKTA | SEQ ID NO. 250 |
| peptide 251 | AAGE | SEQ ID NO. 251 |
| peptide 252 | GKASQFAKTA | SEQ ID NO. 252 |

In some aspects, the peptide is any one of the peptides listed in Table 1A.

TABLE 1A

| Peptide Name | Seq ID NO. |
|---|---|
| MANS | 1 |
| Ac-MANS | 1 |
| BIO-11211 (Ac-----------NH2) | 79 |
| BIO-11000 (Ma----------OH) | 106 |
| BIO-11002 (Ma----------NH2) | 106 |
| BIO-11005 (H-----------NH2 | 106 |
| BIO-11006 (Ac---------OH) | 106 |
| BIO-11007 (cyclic) | 106 cyclic |
| BIO-11018 (pegylated) | 106 pegylated |
| BIO-11026 (Ac-----------NH2) | 106 |
| BIO-10901 (Ac-----------OH) | 121 |
| BIO-10803 (Ac--------OH) | 137 |
| BIO-91200 (Ma-AKGE-OH) | 219 |
| BIO-91201 (Ac-AKGE-OH) | 219 |
| BIO-91202 (Ac-AKGE-NH2) | 219 |

Ma = Myristoyl;
Ac = Acetyl

The disclosure provides peptides having amino acid sequences comprising less than 24 amino acids with amino acid sequences related to the amino acid sequence of MANS peptide. The peptides of the current disclosure consist of amino acid sequences containing less than 24 amino acids, and may consist of from 8 to 14, from 10 to 12, from 9 to 14, from 9 to 13, from 10 to 13, from 10 to 14, at least 9, at least 10, or the like amino acids. The peptides are typically straight chains, but may be cyclic peptides as well. Cyclic peptides are peptides that contain a circular or cyclic ring structure. The circular ring structure can be formed, for example, through connection between the amino and carboxyl ends of the peptide, or between the carboxyl or amino end and a side chain, or between a peptide backbone and the carboxyl or amino end or a side chain, or between two positions on the peptide backbone, or between two side chains. The connections may be formed via an amide bond, or other chemically stable bonds. In some embodiments, the peptide is a head-to-tail cyclic peptide. In some embodiments, the peptides are pegylated (PEGylated). PEGylating is the process of covalently attaching polyethylene glycol (PEG) chains to peptides. In some embodiments, PEGylating enhances solubility and/or half life of peptides, and/or reduces immunogenicity. Thus, in some embodiments, peptide PEGylation therapeutic efficacy and/or tolerability of peptide drugs. In some embodiments, the peptides are synthetic peptides. In some embodiments, the peptides are isolated peptides.

In some aspects, the peptide has an amino acid sequence selected from the group consisting of (a) an amino acid sequence having from 4 to 23 contiguous amino acids of the reference sequence, peptide 1; (b) a sequence with at least about 75%, at least about 80% identity, at least about 85%, at least about 90%, at least about 91%, at least about 92%, at least about 93%, at least about 94%, or at least about 95% identity to the amino acid sequence defined in (a); or (c) a variant of the amino acid sequence defined in (a), which variant is selected from the group consisting of a substitution variant, a deletion variant, an addition variant, and combinations thereof.

In some embodiments, the peptide has an amino acid sequence selected from the group consisting of: (a) an amino acid sequence having from 8 to 14 contiguous amino acids of the reference sequence, peptide 1; (b) an amino acid sequence with at least about 75%, at least about 80% identity, at least about 85%, at least about 90%, at least about 91%, at least about 92%, or at least about 93% identity to the sequence defined in (a); or (c) a variant of the amino acid sequence defined in (a), which variant is selected from the group consisting of a substitution variant, a deletion variant, an addition variant, and combinations thereof.

In yet other embodiments, the peptide has an amino acid sequence selected from the group consisting of: (a) an amino acid sequence having from 10 to 12 contiguous amino acids of the reference sequence, peptide 1; (b) an amino acid sequence with at least about 75%, at least about 80% identity, at least about 85%, at least about 90%, at least about 91%, at least about 92% or at least about 93% identity to the sequence defined in (a); or (c) a variant of the amino acid sequence defined in (a), which variant is selected from the group consisting of a substitution variant, a deletion variant, an addition variant, and combinations thereof.

In further embodiments, the peptide has an amino acid sequence having at least 9, at least 10, from 9 to 14, from 9 to 13, from 10 to 13, from 10 to 14, or the like contiguous amino acids of the reference sequence, peptide 1; an amino acid sequence with at least about 75%, at least about 80% identity, at least about 85%, at least about 90%, at least about 91%, at least about 92%, or at least about 93% identity thereto; or a variant thereof, which variant is selected from the group consisting of a substitution variant, a deletion variant, an addition variant, and combinations thereof.

In some embodiments, the amino acid sequence of the peptide begins from the N-terminal amino acid of the reference sequence peptide 1. For example, the peptides may have an amino acid sequence selected from the group consisting of (a) an amino acid sequence having from 4 to 23 contiguous amino acids of the reference sequence peptide 1, wherein the amino acid sequence begins from the N-terminal amino acid of the reference sequence (i.e., peptide 2, peptide 4, peptide 7, peptide 11, peptide 16, peptide 22, peptide 29, peptide 37, peptide 46, peptide 56, peptide 67, peptide 79, peptide 92, peptide 106, peptide 121, peptide 137, peptide 154, peptide 172, peptide 191, or peptide 211);

(b) a sequence with at least about 75%, at least about 80% identity, at least about 85%, at least about 90%, at least about 91%, at least about 92%, at least about 93%, at least about 94%, or at least about 95% identity to the amino acid sequence defined in (a); or (c) a variant of the amino acid sequence defined in (a). These peptides contain no chemical moiety or a chemical moiety on the N-terminal glycine other than a myristoyl group. Preferably, the chemical moiety is an acyl group, in the form of an amide bond, such as an acetyl group, or alkyl group.

In other embodiments, the amino acid sequence of the peptide ends at the C-terminal amino acid of the reference sequence peptide 1. For example, the peptides may have an amino acid sequence selected from the group consisting of (a) an amino acid sequence having from 4 to 23 contiguous amino acids of the reference sequence peptide 1, wherein the amino acid sequence ends at the C-terminal amino acid of the reference sequence (i.e., peptide 3, peptide 6, peptide 10, peptide 15, peptide 21, peptide 28, peptide 36, peptide 45, peptide 55, peptide 66, peptide 78, peptide 91, peptide 105, peptide 120, peptide 136, peptide 153, peptide 171, peptide 190, peptide 210, or peptide 231); (b) a sequence with at least about 75%, at least about 80% identity, at least about 85%, at least about 90%, at least about 91%, at least about 92%, at least about 93%, at least about 94%, or at least about 95% identity to the amino acid sequence defined in (a); or (c) a variant of the amino acid sequence defined in (a).

In other embodiments, the amino acid sequence of the peptide does not begin at the N-terminal amino acid of the reference sequence, peptide 1, (SEQ ID NO: 1) but rather begins at the amino acid at position 2 through the amino acid at position 21 of the reference sequence peptide 1. For example, the peptides may have an amino acid sequence selected from the group consisting of (a) an amino acid sequence having from 4 to 23 contiguous amino acids of the reference sequence peptide 1, wherein the amino acid sequence begins at any amino acid between position 2 through position 21 of the reference sequence. These peptides may be between 4 and 23 contiguous amino acids long and may represent peptides in the middle of the reference sequence, peptide 1; (b) a sequence with at least about 75%, at least 80% about identity, at least about 85%, at least about 90%, at least about 91%, at least about 92%, at least about 93%, at least about 94%, or at least about 95% identity to the amino acid sequence defined in (a); or (c) a variant of the amino acid sequence defined in (a). These peptides may contain no covalently bound chemical moiety or a chemical moiety on the N-terminal amino acid which is not the N-terminal glycine from or equivalent to the N-terminal glycine of the amino acid sequence SEQ ID NO: 1. Preferably, the chemical moiety is an acyl group, such as an acetyl group or a myristoyl group, in the form of an amide bond, or an alkyl group.

In yet other embodiments, the amino acid sequence of the peptide includes the contiguous residues A, K, G, and E as in peptide 219 of the reference sequence peptide 1. For example, the peptides may have an amino acid sequence selected from the group consisting of (a) an amino acid sequence having from 4 to 23 contiguous amino acids of the reference sequence peptide 1, wherein the amino acid sequence of the peptide includes the contiguous residues A,K,G, and E as in peptide 219 of the reference peptide 1 (e.g., peptide 219, peptide 45, peptide 79, peptide 67, peptide 80, etc.); (b) a sequence with at least about 75%, at least about 80% identity, at least about 85%, at least about 90%, at least about 91%, at least about 92%, at least about 93%, at least about 94%, or at least about 95% identity to the amino acid sequence defined in (a); or (c) a variant of the amino acid sequence defined in (a).

In another embodiment, preferred peptide sequences have an amino acid sequence selected from the group consisting of (a) an amino acid sequence having from 10 to 23 contiguous amino acids of the reference sequence, peptide 1; (b) a sequence with at least about 75%, at least about 80% identity, at least about 85%, at least about 90%, at least about 91%, at least about 92%, at least about 93%, at least about 94%, or at least about 95% identity to the amino acid sequence defined in (a); or (c) a variant of the amino acid sequence defined in (a), which variant is selected from the group consisting of a substitution variant, a deletion variant, an addition variant, and combinations thereof.

In further embodiments, the amino acid sequence of the peptide begins from the N-terminal amino acid of the reference sequence peptide 1 and includes the contiguous residues A, K, G, and E as in peptide 219 of the reference sequence peptide 1, while in other embodiments the amino acid sequence of the peptide ends at the C-terminal amino acid of the reference sequence peptide 1 and includes the contiguous residues A,K,G, and E as in peptide 219 of the reference sequence peptide 1.

In some aspects, the peptide consists of at least two to at least 12 amino acids of SEQ ID NO: 1, for example at least four, at least five, at least six, at least seven, at least eight, at least nine, or at least ten contiguous amino acid residues of SEQ ID NO: 1.

In exemplary aspects, the peptide is acetylated at the N-terminal amino acid. In exemplary aspects, the peptide comprises the amino acid sequence of SEQ ID NO: 106, and is acetylated at the N-terminal amino acid.

In some aspects, the peptide is myristoylated at the N-terminal amino acid and/or amidated with ammonia at the C-terminal amino acid.

In some aspects, the peptide comprises an amino acid sequence of (a) an amino acid sequence having from 4 to 23 contiguous amino acids of a reference sequence, GAQFSKTAAKGEAAAERPGEAAVA (SEQ ID NO. 1), wherein the N-terminal amino acid of the amino acid sequence of (a) is selected from amino acid position 2 to 21 of the reference sequence, GAQFSKTAAKGEAAAERPGEAAVA (SEQ ID NO. 1). Further, these peptides can be myristoylated at the N-terminal amino acid and also can be amidated with ammonia at the C-terminal amino acid. The more preferred peptide fragment length is from at least 6 amino acids to 23 amino acids.

In some aspects, the peptide has an amino acid sequence selected from the group consisting of:

(a) an amino acid sequence having from 4 to 23 contiguous amino acids of a reference sequence, GAQFSKTAAKGEAAAERPGEAAVA (SEQ ID NO. 1);

(b) an amino acid sequence having the sequence, GAQFSKTAAKGEAAAERPGEAAVA (SEQ ID NO. 1); or (c) an amino acid sequence with at least about 75%, at least about 80% identity, at least about 85%, at least about 90%, at least about 91%, at least about 92%, at least about 93%, at least about 94%, or at least about 95% identity to the sequence defined in (a), wherein the C-terminal amino acid of the peptide is optionally independently chemically modified, and the N-terminal amino acid of the peptide is independently chemically modified by acylation with a carboxylic acid selected from the group consisting of a C2 to C13 saturated or unsaturated aliphatic carboxylic acid, a C14 saturated or unsaturated aliphatic carboxylic acid, a C15 to C24 saturated or unsaturated aliphatic carboxylic acid, and trifluoroacetic acid, or is not chemically modified, with the proviso that said peptide is modified by acylation when its amino acid sequence begins with the sequence GAQF of the reference sequence by acylation only with a carboxylic acid selected from the group consisting of a C2 to C13 saturated or unsaturated aliphatic carboxylic acid, a C14 unsaturated aliphatic carboxylic acid, a C15 to C24 saturated or unsaturated aliphatic carboxylic acid, and trifluoroacetic acid, or is not chemically modified, wherein said peptide, optionally combined with a pharmaceutically acceptable carrier, and in a therapeutically effective inflammatory mediator release-reducing amount to reduce the release of said inflammatory mediator from at least one inflammatory cell as compared to release of said inflammatory mediator from at least one of the same type of inflammatory cell that would occur in the absence of said at least one peptide.

The peptide can further comprise an amino acid sequence of (a) described above, (a) an amino acid sequence having from 4 to 23 contiguous amino acids of a reference sequence, GAQFSKTAAKGEAAAERPGEAAVA (SEQ ID NO. 1); wherein the N-terminal amino acid of the amino acid sequence of (a) is selected from amino acid position 2 to 21 of the reference sequence, GAQFSKTAAKGEAAAERPGEAAVA (SEQ ID NO. 1). This peptide can be further myristoylated or acetylated at the N-terminal amino acid or optionally amidated with ammonia at the C-terminal amino acid.

Peptides derived from MANS, and methods of use thereof, are further described in U.S. Pat. Nos. 7,524,926, and 8,999,915, both of which are incorporated herein by reference in their entireties for all purposes.

In certain embodiments, the peptide sequence is selected from the group consisting of SEQ ID NO: 79, 106, 121, 137, and 219.

Modified Peptides Derived from N-Terminal Sequence of MARCKS

In some aspects, any one of the peptides disclosed herein may be chemically modified, for instance, any one of the peptides listed in Table 1 or Table 1A may be chemically modified.

In some aspects, any one of the peptides disclosed herein may be chemically modified, for example, by chemical modification, which chemical modification can be selected from the group consisting of (i) amide formation at the N-terminal amine group (H2N-peptide-) such as with, for example, a C1 or preferably with a C2 (acetic acid) to C22 carboxylic acid; (ii) amide formation at the C-terminal carboxylic group (-peptide-COOH) such as with, for example, ammonia or with a C1 to C22 primary or secondary amine; and (iii) a combination of thereof.

In some aspects, one or more of the amino acids of the peptides (e.g., the N-terminal and/or C-terminal amino acids) may be optionally independently chemically modified; in some embodiments, one or more amino acids of a peptide will be chemically modified while in other embodiments none of the amino acids of the peptide will be chemically modified. In one aspect, preferred modification can occur at the amine (—NH2) group of the N-terminal amino acid of the peptide or peptide segment (which amine group would form a peptide amide bond if present internally within a peptide sequence rather than at the N-terminal position). In another aspect, preferred modification can occur at the carboxy (—COOH) group of the C-terminal amino acid of the peptide or peptide segment (which carboxy group would form a peptide amide bond if present internally within a peptide sequence rather than at the C-terminal position). In another aspect, preferred modification can occur at both the N-terminal amine (—NH2) group and at the C-terminal carboxylic (—COOH) group.

The peptides may include one or more amino acid deletions, substitutions, and/or additions with respect to the reference amino acid sequence. Preferably, the substitutions may be conservative amino acid substitutions, or the substitutions may be non-conservative amino acid substitutions. Amino acid substitutions that may be made to the reference amino acid sequence in the peptides of the disclosure include, but are not limited to, the following: alanine (A) may be substituted with lysine (K), valine (V), leucine (L), or isoleucine (I); glutamic acid (E) may be substituted with aspartic acid (D); glycine (G) may be substituted with proline (P); lysine (K) may be substituted with arginine (R), glutamine (Q), or asparagine (N); phenylalanine (F) may be substituted with leucine (L), valine (V), isoleucine (I), or alanine (A); proline (P) may be substituted with glycine (G); glutamine (Q) may be substituted with glutamic acid (E) or asparagine (N); arginine (R) may be substituted with lysine (K), glutamine (Q), or asparagine (N); serine (S) may be substituted with threonine; threonine (T) may be substituted with serine (S); and valine (V) may be substituted with leucine (L), isoleucine (I), methionine (M), phenylalanine (F), alanine (A), or norleucine (Nle). For example, substitutions that could be made to the reference amino acid sequence in the peptides of the disclosure include substituting alanine (A) for phenylalanine (F) (e.g., at amino acid position 4 of the reference amino acid sequence), glutamic acid (E) for glutamine (Q) (e.g., at amino acid position 3 of the reference amino acid sequence), lysine (K) for alanine (A) (e.g., at amino acid positions 2 and/or 8 of the reference amino acid sequence), and/or serine (S) for threonine (T) (e.g., at amino acid position 7 of the reference amino acid sequence).

Examples of substitution variants of peptide 79, a 12-mer, include, for example, peptide 238, where Q at position 3 in peptide 79 has been substituted by E in sequence 238; peptide 233, where A at position 2 in peptide 79 has been substituted by K in peptide 233; peptide 234, where A at position 8 in peptide 79 has been substituted by K in peptide 234; peptide 235, where A at positions 2 and 8 in peptide 79 have been substituted by K in peptide 235; peptide 237, where F at position 4 in peptide 79 has been substituted by A in peptide 237; peptide 239, where K at position 10 in peptide 79 has been substituted by A in peptide 239; peptide 240, where G at position 11 in peptide 79 has been substituted by A in peptide 240; and peptide 241, where E at position 12 in peptide 79 has been substituted by A in peptide 241.

Examples of substitution variants of peptide 106, a 10-mer, include, for example, peptide 236, where F at position 4 in peptide 106 has been substituted by A in peptide 236; peptide 242, where G at position 1 in peptide 106 has been substituted by A in peptide 242; peptide 243, where Q at position 3 in peptide 106 has been substituted by A in peptide 243; peptide 244, where S at position 5 in peptide 106 has been substituted by A in peptide 244; peptide 245, where K at position 6 in peptide 106 has been substituted by A in peptide 245; peptide 247, where T at position 7 in peptide 106 has been substituted by A in peptide 247; peptide 248, where K at position 10 in peptide 106 has been substituted by A in peptide 248; peptide 249, where K at positions 6 and 10 in peptide 106 have both been substituted, each by A, in peptide 249.

Examples of a substitution variant of peptide 137, an 8-mer, include for example, peptide 250, where F at position 4 in peptide 137 has been substituted by A in peptide 250.

Examples of a substitution variant of peptide 219, a 4-mer, include for example, peptide 251, where K at position 2 in peptide 219 has been substituted by A in peptide 251.

A substitution variant peptide such as described herein can be in the form of an isolated peptide or in the form of a chemically modified peptide such as, for example, an N-terminal amide such as a myristoyl amide, an acetyl amide, and the like as described herein, and such as, for example, a C-terminal amide such as an amide formed with ammonia, and such as both an N-terminal amide and a C-terminal amide.

In some aspects, one or more of the amino acids of the peptide may also be chemically modified. Any amino acid modifications known in the art may be made to the amino acids of the peptides using any method known in the art.

In some embodiments, the N-terminal and/or C-terminal amino acid may be modified. For example, the N-terminal amino acid of the peptides may be alkylated, amidated, or acylated at the N-terminal (N-terminal) amino (—H2N—) group, and, for example, the C-terminal amino acid of the peptides may be amidated or esterified at the C-terminal carboxyl (—COOH) group. For example, the N-terminal amino group may be modified by acylation to include any acyl or fatty acyl group to form an amide, including an acetyl group (i.e., CH3-C(=O)— or a myristoyl group, both of which are currently preferred groups). In some embodiments, the N-terminal amino group may be modified to include an acyl group having formula —C(O)R, wherein R is a linear or branched alkyl group having from 1 to 15 carbon atoms, or may be modified to include an acyl group having formula —C(O)R1, wherein R1 is a linear alkyl group having from 1 to 15 carbon atoms. The N-amide can also be a formamide (R=H). The C-terminal amino acid of the peptides may also be chemically modified. For example, the C-terminal carboxyl group of the C-terminal amino acid may be chemically modified by conversion to a carboxamide group in place of the carboxyl group. (i.e., amidated). In some embodiments, the N-terminal and/or C-terminal amino acids are not chemically modified. In some embodiments, the N-terminal group is modified and the C-terminal group is not modified. In some embodiments, both the N-terminal and the C-terminal groups are modified.

The peptide may be acylated at the amino group of the N-terminal amino acid to form an N-terminal amide with an acid selected from the group consisting of:

(i-a) a C2 (acetyl) to C13 aliphatic (saturated or optionally unsaturated) carboxylic acid (for example, an N-terminal amide with acetic acid (which is a preferred group), with propanoic acid, with butanoic acid, with hexanoic acid, with octanoic acid, with decanoic acid, with dodecanoic acid) which may be linear, branched (greater than C3), or comprise a ring (greater than C3);

(i-b) a saturated C14 aliphatic carboxylic acid, which may be linear, branched or comprise a ring;

(i-c) an unsaturated C14 aliphatic carboxylic acid, which may be linear, branched or comprise a ring;

(i-d) C15 to C24 aliphatic (saturated or optionally unsaturated) carboxylic acid, which may be linear, branched or comprise a ring (for example, with tetradecanoic acid (myristic acid which is a preferred group), with hexadecanoic acid, with 9-hexadecenoic acid, with octadecanoic acid, with 9-octadecenoic acid, with 11-octadecenoic acid, with 9,12-octadecadienoic acid, with 9,12,15-octadecatrienoic acid, with 6,9,12-octadecatrienoic acid, with eicosanoic acid, with 9-eicosenoic acid, with 5,8,11,14-eicosatetraenoic acid, with 5,8,11,14,17-eicosapentaenoic acid, with docosanoic acid, with 13-docosenoic acid, with 4,7,10,13,16,19-docosahexaenoic acid, with tetracosanoic acid, and the like);

(ii) trifluoroacetic acid;

(iii) benzoic acid; and (iv-a) a C1 to C12 aliphatic alkyl sulfonic acid which forms an aliphatic alkyl sulfonamide, wherein the C1 to C12 aliphatic alkyl carbon chain structure of the sulfonic acid is analogous to that of the aliphatic alkyl carboxylic acid chains in the aliphatic alkyl carboxylic acids described above. For example, a peptide may be acylated using a carboxylic acid group represented as (C1-C11)-alkyl-C(O)OH through dehydrative coupling by way of activation of the carboxylic acid group to form an amide represented as (C1-C11-alkyl-C(O)—NH-peptide. Analogously, a sulfonamide may be formed by reacting a sulfonic acid species (represented as (C1-C12)-alkyl-S(O2)-X, e.g., where X is halogen or OCH3 or other compatible leaving group) with an N-terminal amino group to form a sulfonamide represented as (C1-C12)-alkyl-S(O2)-NH-peptide.

(iv-b) a C14 to C24 aliphatic alkyl sulfonic acid which forms an aliphatic alkyl sulfonamide, wherein the C14 to C24 aliphatic alkyl carbon chain structure of the sulfonic acid is analogous to that of the aliphatic alkyl carboxylic acid chains in the aliphatic alkyl carboxylic acids described above. For example, a peptide may be acylated using a carboxylic acid group represented as (C13-C23)-alkyl-C(O)OH through dehydrative coupling by way of activation of the carboxylic acid group to form an amide represented as (C13-C23)-alkyl-C(O)—NH-peptide. Analogously, a sulfonamide may be formed by reacting a sulfonic acid species (represented as (C14-C24)-alkyl-S(O2)-X, e.g., where X is halogen or OCH3 or other compatible leaving group) with an N-terminal amino group to form a sulfonamide represented as (C14-C24)-alkyl-S(O2)-NH-peptide.

In some aspects, the N-terminal amino group of the N-terminal amino acid may be alkylated with a C1 to C12 aliphatic alkyl group, the structure of which aliphatic alkyl group is as described above. Alkylation may be effected, for example, using an aliphatic alkyl halide or an aliphatic alkyl sulfonic acid ester (mesylate, tosylate, etc.), preferably using a primary alkyl halide or a primary alkyl sulfonic acid ester. The N-terminal amino acid may be also modified at the terminal amino to include any acyl or aliphatic acyl fatty acyl group as an amide, including an acetyl group (i.e., —C(O)CH3, which is a preferred group), a myristoyl group (which is a preferred group), a butanoyl group, a hexanoyl group, a octanoyl group, a decanoyl group, a dodecanoyl group, a tetradecanoyl group, a hexadecanoyl group, a 9-hexadecenoyl group, a octadecanoyl group, a 9-octadecenoyl group, a 11-octadecenoyl group, a 9,12-octadecadienoyl group, a 9,12,15-octadecatrienoyl group, a 6,9,12-octadecatrienoyl group, a eicosanoyl group, a 9-eicosenoyl group, a 5,8,11,14-eicosatetraenoyl group, a 5,8,11,14,17-eicosapentaenoyl group, a docosanoyl group, a 13-docosenoyl group, a 4,7,10,13,16,19-docosahexaenoyl group, a tetracosanoyl group, which groups are covalently attached to the terminal amino group of the peptide by an amide bond.

The C-terminal carboxylic acid group of the C-terminal amino acid of the peptides of the disclosure may also be chemically modified. For example, the C-terminal amino acid may be chemically modified by reaction of the C-terminal carboxylic acid group of the peptide with an amine to form an amide group such as an amide of ammonia which is a preferred group; an amide of a C1 to C12 aliphatic alkyl amine, preferably a linear aliphatic alkyl amine; an amide of a hydroxyl-substituted C2 to C12 aliphatic alkyl amine; an amide of a linear 2-(C1 to C12 aliphatic alkyl)oxyethylamine group; and an amide of an omega-methoxy-poly(ethyleneoxy)n-ethylamine group (also referred to as an omega-methoxy-PEG-alpha-amine group or an omega-methoxy-(polyethylene glycol)amine group), where n is from 0 to 10. The C-terminal carboxylic acid group of the C-terminal amino acid of the peptide may also be in the form of an ester selected from the group consisting of an ester of a C1 to C12 aliphatic alkyl alcohol and an ester of a 2-(omega-methoxy-poly(ethyleneoxy)n)-ethanol (MPEG) group, where n is from 0 to 10. In one aspect, a polyethylene glycol component such as in a PEG ester, an MPEG ester, a PEG amide, an MPEG amide and the like preferably has a molecular weight of from about 500 to 40,000 Daltons, more preferably from 1000 to 25,000 Daltons, and most preferably from about 1000 to about 10,000 Daltons.

The C-terminal carboxylic acid group on the peptide, which may be represented by the formula peptide-C(O)OH, may also be amidated by conversion to an activated form such as a carboxylic acid halide, carboxylic acid anhydride, N-hydroxysuccinimide ester, pentafluorophenyl (OPfp) ester, 3-hydroxy-2,3-dihydro-4-oxo-benzo-triazone (ODhbt) ester, and the like to facilitate reaction with ammonia or a primary or secondary amine, preferably ammonia or a primary amine, and preferably while any other reactive groups in the peptide are protected by synthetic chemically compatible protecting groups well known in the art of peptide synthesis, especially of peptide solid phase synthesis, such as a benzyl ester, a t-butyl ester, a phenyl ester, etc. A resulting peptide amide could be represented by the formula peptide-C(O)—NR3R4 (the amide being at the C-terminal end of the peptide) wherein R3 and R4 are independently selected from the group consisting of hydrogen; C1 to C12 alkyl such as methyl, ethyl, butyl, isobutyl, cyclopropylmethyl, hexyl, dodecyl, and optionally higher e.g., from C14 to C24 such as tetradecyl, and the like as described above.

The C-terminal carboxylic acid of the C-terminal amino acid may also be converted to an amide of a hydroxyl-substituted C2 to C12 aliphatic alkyl amine (the hydroxyl group being attached to a carbon atom rather than a nitrogen atom of the amine) such as 2-hydroxyethylamine, 4-hydroxybutylamine, and 12-hydroxydodecylamine, and the like.

The C-terminal carboxylic acid may also be converted to an amide of a hydroxyl-substituted C2 to C12 aliphatic alkyl amine, wherein the hydroxyl group can be acylated to form an ester with a C2 to C12 aliphatic carboxylic acid as described above. Preferably, in the peptide amide at the C-terminal end of the peptide represented by the formula peptide-C(O)NR5R6, R5 is hydrogen and R6 is selected from the group consisting of hydrogen, C1 to C12 alkyl, and hydroxyl-substituted C2 to C12 alkyl.

The C-terminal carboxylic acid of the C-terminal amino acid may be converted to an amide of a linear 2-(C1 to C12 aliphatic alkyl)oxyethylamine. Such an amide may be prepared, for example, by reaction of a linear C1 to C12 aliphatic alcohol with potassium hydride in diglyme with 2-chloroethanol to provide a linear C1 to C12 aliphatic alkyl ethanol, which can be converted to an amine by oxidation to an aldehyde, followed by reductive amination to an amine (for example using ammonia), or by conversion to an alkyl halide (e.g. using thionyl chloride) followed by treatment with an amine such as ammonia.

The C-terminal carboxylic acid of the C-terminal amino acid may be converted to an amide of a linear PEG-amine (e.g., omega-hydroxy-PEG-alpha-amine; omega-(C1-to-C12)-PEG-alpha-amine such as omega-methoxy-PEG-alpha-amine, i.e., MPEG-amine). In one aspect, the polyethylene glycol or PEG component preferably has a molecular weight of from about 500 to 40,000 Daltons, more preferably from 1000 to 25,000 Daltons, and most preferably from about 1000 to about 10,000 Daltons.

The C-terminal carboxylic acid of the C-terminal amino acid may also be converted to an amide of an omega-methoxy-poly(ethyleneoxy)n-ethylamine, where n is from 0 to 10, which can be prepared from the corresponding omega-methoxy-poly(ethyleneoxy)n-ethanol, for example, by conversion of the alcohol to an amine as described above.

In another embodiment, the C-terminal carboxyl may be converted to an amide represented by the formula peptide-C(O)—NR7R8, wherein R7 is hydrogen and R8 is a linear 2-(C1 to C12 aliphatic alkyl)oxyethyl group wherein the C1 to C12 aliphatic alkyl portion is as described above and includes groups such as methoxyethyl (i.e., CH3O-CH2CH2-), 2-dodecyloxyethyl, and the like; or R7 is hydrogen and R8 is an omega-methoxy-poly(ethyleneoxy)n-ethyl group where the n of the poly(ethyleneoxy) portion is from 0 to 10, such as 2-methoxyethyl (i.e., CH3O-CH2CH2-), omega-methoxyethoxyethyl (i.e., CH3O-CH2CH2O—CH2CH2-) up to CH3O-(CH2CH2O)10-CH2CH2-.

The C-terminal carboxylic acid group of the C-terminal amino acid of the peptide may also be in the form of an ester of a C1 to C12 aliphatic alkyl alcohol, the aliphatic alkyl portion of the alcohol as described above. The C-terminal carboxylic acid group of the C-terminal amino acid of the peptide may also be in the form of an ester of a 2-(omega-methoxy-poly(ethyleneoxy)n)-ethanol group where n is from 0 to 10, which can be prepared from reaction of 2-methoxyethanol as a sodium 2-methoxyethanolate with stoichiometric amounts of ethylene oxide, the stoichiometric amount dependent on the size of n.

A side chain in an amino acid of the peptides may also be chemically modified. For example, a phenyl group in phenylalanine or tyrosine may be substituted with a substituent selected from the group consisting of:

a C1 to C24 aliphatic alkyl group (i.e., linear or branched, and/or saturated or unsaturated, and/or containing a cyclic group) such as methyl (preferred), ethyl, propyl, isopropyl, butyl, isobutyl, cyclopropyl, 2-methylcyclopropyl, cyclohexyl, octyl, decyl, dodecyl, hexadecyl, octadecyl, eicosanyl, docosanyl, tetracosanyl, 9-hexadecenyl, 9-octadecenyl, 11-octadecenyl, 9,12-octadecadienyl, 9,12,15-octadecatrienyl, 6,9,12-octadecatrienyl, 9-eicosenyl, 5,8,11,14-eicosatetraenyl, 5,8,11,14,17-eicosapentaenyl, 13-docosenyl, and 4,7,10,13,16,19-docosahexaenyl;

a C1 to C12 aliphatic alkyl group substituted with a hydroxyl group at least one carbon atom away from a site of unsaturation, examples of which hydroxyalkyl group include hydroxymethyl, hydroxyethyl, hydroxydodecyl, and the like;

a C1 to C12 alkyl group substituted with a hydroxyl group that is esterified with a C2 to C25 aliphatic carboxyl group of an acid such as acetic acid, butanoic acid, hexanoic acid, octanoic acid, decanoic acid, dodecanoic acid, tetradecanoic acid, hexadecanoic acid, 9-hexadecenoic acid, octadecanoic acid, 9-octadecenoic acid, 11-octadecenoic acid, 9,12-octadecadienoic acid, 9,12,15-octadecatrienoic acid, 6,9,12-octadecatrienoic acid, eicosanoic acid, 9-eicosenoic acid, 5,8,11,14-eicosatetraenoic acid, 5,8,11,14,17-eicosapentaenoic acid, docosanoic acid, 13-docosenoic acid, 4,7,10,13,16,19-docosahexaenoic acid, tetracosanoic acid, and the like, a dicarboxylic acid such as succinic acid, or a hydroxyacid such as lactic acid, wherein the total number of carbon atoms of the ester substituent is between 3 and 25; halogen such as fluoro-, chloro-, bromo-, and iodo-; nitro-;

amino—such as NH2, methyl amino, dimethylamino; trifluoromethyl-;

carboxyl (—COOH);

a C1 to C24 alkoxy (such as can be formed by alkylation of tyrosine) such as methoxy, ethoxy, propyloxy, isopropyloxy, butyloxy, isobutyloxy, cyclopropyloxy, 2-methoxycyclopropyloxy, cyclohexyloxy, octyloxy, decyloxy, dodecyloxy, hexadecyloxy, octadecyloxy, eicosanyloxy, docosanyloxy, tetracosanyloxy, 9-hexadecenyloxy, 9-octadecenyloxy, 11-octadecenyloxy, 9,12-octadecadienyloxy, 9,12,15-octadecatrienyloxy, 6,9,12-octadecatrienyloxy, 9-eicosenyloxy, 5,8,11,14-eicosatetraenyloxy, 5,8,11,14,17-eicosapentaenyloxy, 13-docosenyloxy, and 4,7,10,13,16,19-docosahexaenyloxy; and a C2 to C12 hydroxyalkyloxy such as 2-hydroxyethyloxy and esters thereof with carboxylic acids as described above or with trifluoroacetic acid.

A serine hydroxyl group may be esterified with a substituent selected from the group consisting of:

a C2 to C12 aliphatic carboxylic acid group such as described above;

a trifluoroacetic acid group; and a benzoic acid group.

The epsilon amino group in lysine may be chemically modified, for example, by amide formation with: a C2 to C12 aliphatic carboxylic acid group (for example, by reaction of the amine with a chemically activated form of a carboxylic acid such as an acid chloride, an anhydride, an N-hydroxysuccinimide ester, a pentafluorophenyl (OPfp) ester, a 3-hydroxy-2,3-dihydro-4-oxo-benzo-triazone (ODhbt) ester, and the like) such as described above, or a benzoic acid group, or an amino acid group. Additionally, the epsilon amino group in lysine may be chemically modified by alkylation with one or two C1 to C4 aliphatic alkyl groups.

The carboxylic acid group in glutamic acid may be modified by formation of an amide with an amine such as: ammonia; a C1 to C12 primary aliphatic alkyl amine (the alkyl portion of which is as described above) including with methylamine; or an amino group of an amino acid.

The carboxylic acid group in glutamic acid may be modified by formation of an ester with a C1 to C12 aliphatic hydroxyalkyl group as described above, preferably an ester with a primary alcohol of a C1 to C12 aliphatic alkyl such as methanol, ethanol, propan-1-ol, n-dodecanol, and the like as described above.

In some embodiments, the present disclosure provides composition comprising the peptides provided herein and salts thereof. For example, in some embodiments, the disclosure encompasses the peptides provided herein and pharmaceutically acceptable salts thereof. Pharmaceutically acceptable salts of the peptides of this disclosure include, for example, peptides modified by making acid or base salts thereof. Examples of acid addition salts include acetate, adipate, alginate, aspartate, benzoate, benzenesulfonate, bisulfate, butyrate, citrate, camphorate, camphorsulfonate, cyclopentanepropionate, digluconate, dodecylsulfate, ethanesulfonate, fumarate, glucoheptanoate, glycerophosphate, hemisulfate, heptanoate, hexanoate, hydrochloride, hydrobromide, hydroiodide, 2-hydroxyethanesulfonate, lactate, maleate, malonate, methanesulfonate, 2-naphthalenesulfonate, nicotinate, oxalate, palmoate, pectinate, persulfate, 3-phenylpropionate, picrate, pivalate, propionate, succinate, tartrate, thiocyanate, tosylate, and undecanoate. Base salts include ammonium salts, alkali metal salts such as sodium and potassium salts, alkaline earth metal salts such as calcium and magnesium salts, salts with organic bases such as dicyclohexylamine salts, N-methyl-D-glutamine, and salts with amino acids such as arginine, lysine, and so forth. Also, the basic nitrogen-containing groups may be quaternized with such agents as lower alkyl halides, such as methyl, ethyl, propyl, and butyl chloride, bromides and iodides; dialkyl sulfates like dimethyl, diethyl, dibutyl; and diamyl sulfates, long chain halides such as decyl, lauryl, myristyl and stearyl chlorides, bromides and iodides, aralkyl halides like benzyl and phenethyl bromides and others.

In certain embodiments, the modified peptide is selected from the group consisting of BIO-11211, BIO-11000, BIO-11002, BIO-11005, BIO-11007, BIO-110018, BIO-11026, BIO-10901, BIO-10803, BIO-91200, BIO-91201, and BIO-91202.

Pharmaceutical Compositions

In some aspects, any one of the peptides disclosed herein is contained in a pharmaceutical composition which is useful to block progression of uveitis. The present disclosure also includes methods for inhibiting a cellular secretory process in a subject comprising the administration of a therapeutically effective amount of any one of the peptides disclosed herein.

The disclosure also encompasses a composition comprising a peptide as described in the paragraphs above and described herein and an excipient. The disclosure also encompasses a pharmaceutical composition comprising a peptide as described in the paragraphs above and described herein and a pharmaceutically acceptable carrier. The pharmaceutical composition can further preferably be sterile, sterilizable or sterilized. These peptides can be contained in a kit with reagents useful for administration.

In one aspect, the disclosure relates to a method of administering a pharmaceutical composition. The pharmaceutical composition comprises a therapeutically effective amount of a known compound and a pharmaceutically acceptable carrier. Pharmaceutically acceptable carriers are preferably liquid dosage forms. Liquid preparations may be used and may be prepared in the form of solutions or suspensions, e.g., solutions containing an active ingredient, and a mixture of water, glycerol, and propylene glycol. If desired, such liquid preparations may include one or more of following: thickening agents such as carboxymethylcellulose also may be used as well as other acceptable carriers, the selection of which is known in the art.

In certain embodiments, the drug product is present in a solid pharmaceutical composition. A solid composition of matter according to the present disclosure may be formed and may be mixed with and/or diluted by an excipient. The solid composition of matter also may be enclosed within a carrier, which may be, for example, in the form of a capsule, sachet, tablet, paper, or other container. When the excipient serves as a diluent, it may be a solid, semi-solid, a gel, or liquid material that acts as a vehicle, carrier, or medium for the composition of matter. For ophthalmic administration, the pharmaceutical formulation with any one of the peptides disclosed herein can be prepared in the form of an eye drop, eye gel, ointment, ointment, implant, microspheres, or liposomal formulation, or microemulsion.

Various suitable excipients will be understood by those skilled in the art and may be found in the *National Formulary*, 19: 2404-2406 (2000), the disclosure of pages 2404 to 2406 being incorporated herein in their entirety. Examples of suitable excipients include, but are not limited to, starches, gum arabic, calcium silicate, microcrystalline cellulose, methacrylates, shellac, polyvinylpyrrolidone, cellulose, water, and methylcellulose. The drug product formulations additionally can include lubricating agents such as, for example, talc, magnesium stearate and mineral oil; wetting agents; emulsifying and suspending agents; preserving agents such as methyl- and propyl hydroxybenzoates. Polyols, buffers, and inert fillers also may be used. Examples of polyols include, but are not limited to, mannitol, sorbitol, xylitol, sucrose, maltose, glucose, lactose, dextrose, and the like. Suitable buffers include, but are not limited to, phosphate, citrate, tartrate, succinate, and the like. Other inert fillers that may be used include those that are known in the art and are useful in the manufacture of various dosage forms. If desired, the solid formulations may include other components such as bulking agents and/or granulating agents, and the like. The drug products of the disclosure may be formulated so as to provide quick, sustained, or delayed release of the active ingredient after administration to the patient by employing procedures well known in the art.

In the event that the above pharmaceuticals are to be used for parenteral or intra-ocular administration, such a formulation may comprise sterile aqueous injection solutions, non-aqueous injection solutions, or both, comprising the composition of matter of the present disclosure. When aqueous injection solutions are prepared, the composition of matter may be present as a water soluble pharmaceutically acceptable salt. Parenteral or intra-ocular preparations may contain anti-oxidants, buffers, bacteriostats, and solutes which render the formulation isotonic with the blood of the intended recipient. Aqueous and non-aqueous sterile suspensions may comprise suspending agents and thickening agents. The formulations may be presented in unit-dose or multi-dose containers, for example sealed ampules and vials. Extemporaneous injection solutions and suspensions may be prepared from sterile powders, granules and tablets of the kind previously described. The parenteral or intra-ocular formulation can also be as liposomal composition.

The composition of matter also may be formulated such that it may be suitable for topical administration (e.g., ophthalmic drop or gel, or cream). These formulations may contain various excipients known to those skilled in the art. Suitable excipients may include, but are not limited to, cetyl esters wax, cetyl alcohol, white wax, glyceryl monostearate, propylene glycol, monostearate, methyl stearate, benzyl alcohol, sodium lauryl sulfate, glycerin, mineral oil, water, carbomer, ethyl alcohol, acrylate adhesives, polyisobutylene adhesives, and silicone adhesives.

Methods of Treating Uveitis

The disclosure provides methods of treating uveitis in a subject by administering to the subject any one of the peptides disclosed herein. In some aspects, the method comprising administering to the subject any one of the peptides listed in Table 1 or Table 1A. The disclosure further provides methods of treating uveitis in a subject by administering to the subject a composition comprising any one of the peptides disclosed herein.

The disclosure provides methods for blocking MARCKS-related cellular migratory processes in the eye, especially of those cells, such as leukocytes, that involve the MARCKS-related release of inflammatory mediators from inflammatory cells.

The disclosure also provides methods of inhibiting the exocytotic release of at least one inflammatory mediator from at least one inflammatory cell comprising contacting the at least one inflammatory cell in the eye, which cell comprises at least one inflammatory mediator contained within a vesicle inside the cell, with the peptide disclosed herein in an effective amount to reduce the release of the inflammatory mediator from the inflammatory cell as compared to the release of the inflammatory mediator from the same type of inflammatory cell that would occur in the absence of the at least one peptide.

In some aspects, the inflammatory cell is a leukocyte, a granulocyte, a basophil, an eosinophil, monocyte, macrophage or a combination thereof. In some aspects, the inflammatory mediator released from at least one granule of at least one inflammatory cell is selected from the group consisting of myeloperoxidase (MPO), eosinophil peroxidase (EPO), major basic protein [MBP], lysozyme, granzyme, histamine, proteoglycan, protease, a chemotactic factor, cytokine, a metabolite of arachidonic acid, defensin, bactericidal permeability-increasing protein (BPI), elastase, cathepsin G, cathepsin B, cathepsin D, beta-D-glucuronidase, alpha-mannosidase, phospholipase $A_2$, chondroitin-4-sulphate, proteinase 3, lactoferrin, collagenase, complement activator, complement receptor, N-formylmethionyl-leucyl-phenylalanine (FMLP) receptor, laminin receptor, cytochrome $b_{558}$, monocyte-chemotactic factor, histaminase, vitamin B12 binding protein, gelatinase, plasminogen activator, beta-D-glucuronidase, and a combination thereof. Preferably the inflammatory mediator is selected from the group consisting of myeloperoxidase (MPO), eosinophil peroxidase (EPO), major basic protein (MBP), lysozyme, granzyme, interleukins, cytokines, and a combination thereof.

The present disclosure further provides methods of inhibiting the release of at least one inflammatory mediator from at least one inflammatory cell in an eye tissue or an eye fluid of a subject comprising the administration to the subject's tissue and/or fluid, which comprises at least one inflammatory cell comprising at least one inflammatory mediator contained within a vesicle inside the cell, a therapeutically effective amount of a pharmaceutical composition comprising any one of the peptides disclosed herein to reduce the release of the inflammatory mediator from the inflammatory cell as compared to release of the inflammatory mediator from at least the same type of inflammatory cell that would occur in the absence of the peptide. More specifically, inhibiting the release of an inflammatory mediator comprises blocking or reducing the release of an inflammatory mediator from the inflammatory cell.

More particularly, the present disclosure provides methods of reducing inflammation in the eye of a subject comprising the administration of a therapeutically effective amount of a pharmaceutical composition comprising a MANS peptide (i.e., N-myristoyl-GAQFSK-TAAKGEAAAERPGEAAVA (SEQ ID NO: 1)) or a peptide fragment thereof. In some aspects, the peptide is GAQFSK-TAAKGEAAAERPGEAAV (SEQ ID NO: 2); GAQFSK-TAAKGEAAAERPGEAA (SEQ ID NO: 4); GAQFSK-TAAKGEAAAERPGEA (SEQ ID NO: 7); GAQFSKTAAKGEAAAERPGE (SEQ ID NO: 11); GAQFSKTAAKGEAAAERPG (SEQ ID NO: 16); GAQFSKTAAKGEAAAERP (SEQ ID NO: 22); GAQFSK-TAAKGEAAAER (SEQ ID NO: 29); GAQFSK-TAAKGEAAAE (SEQ ID NO: 37); GAQFSK-TAAKGEAAA (SEQ ID NO: 46); GAQFSKTAAKGEAA (SEQ ID NO: 56); GAQFSKTAAKGEA (SEQ ID NO: 67); GAQFSKTAAKGE (SEQ ID NO: 79); GAQFSKTAAKG (SEQ ID NO: 92); GAQFSKTAAK (SEQ ID NO: 106); GAQFSKTAA (SEQ ID NO: 121); GAQFSKTA (SEQ ID NO: 137); GAQFSKT (SEQ ID NO: 154); GAQFSK (SEQ ID NO: 172); GAQFS (SEQ ID NO: 191) and GAQF (SEQ ID NO: 211). These peptides, instead of containing a myristoyl moiety at the N-terminal amino acid, either contain no chemical moiety or a non-myristoyl chemical moiety at the N-terminal amino acid and/or a chemical moiety at the C-terminal amino acid, such as an N-terminal acetyl group and/or a C-terminal amide group as described herein. The presence of the hydrophobic N-terminal myristoyl moiety in the MANS peptides and N-terminal myristoylated fragments thereof can enhance their compatibility with and presumably their permeability to plasma membranes, and potentially enable the peptides to be taken up by cells. The hydrophobic insertion of a myristoyl group into a membrane lipid bilayer can provide a partition coefficient or apparent association constant with lipids of up to $10^4$ $M^{-1}$ or a unitary Gibbs free binding energy of about 8 kcal/mol which is sufficient, at least in part, to permit a partitioning of the MANS peptide and of myristoylated MANS peptide fragments into the plasma membrane of a cell while additional functional groups and their interactions within the MANS peptide (which is myristoylated) and within myristoylated MANS peptide fragments can potentiate their relative membrane permeabilities. The fragments can each exhibit partition coefficients and membrane affinities that are representative of their respective structure. The fragments can be prepared by methods of peptide synthesis known in the art, such as by solid phase peptide synthesis and purified by methods known in the art, such as by high pressure liquid chromatography. Molecular weight of each peptide can be confirmed by mass spectroscopy with each showing a peak with an appropriate molecular mass. Efficacy of the individual peptides and of combinations of individual peptides (for example, combinations of 2 of the peptides, combinations of 3 of the peptides, combinations of 4 of the peptides) in the methods of this disclosure can be readily determined without undue experimentation using the procedures described in the examples disclosed herein. When a combination of peptides is used, a preferred combination will comprise two of the peptides; a preferred molar ratio of the peptides can be from 50:50 (i.e., 1:1) to 99.99 to 0.01, which ratio can be readily determined using the procedures described in the examples disclosed herein.

Administration of a composition comprising a therapeutically effective amount of any one of the peptides disclosed herein, such as a pharmaceutical composition of any one of the peptides disclosed herein, for human or animal use provides peptide to the site in or on a tissue or to a fluid-containing layer in contact with the surface of a tissue where an inflammatory granulocytic cell resides or into which an inflammatory granulocytic cell will invade, thus enabling the peptide to contact the inflammatory granulocytic cell. In one aspect, administration of such a composition can be made at the first onset or first detection of inflammation or first perception of inflammation by the human or animal or at the first perceptible change in the level of inflammation in a human or animal to reduce the amount of inflammation that would otherwise occur in the absence of the peptide. In another aspect, administration can be made during an ongoing inflammation of a tissue in the human or animal to reduce the amount of additional inflammation that would otherwise occur in the absence of the peptide. While the amount and frequency of dose can be determined by clinical evaluation and be a function of the disease or source of inflammation and the extent of tissue involved and the age and size of the patient, it is anticipated that dosing of a pharmaceutical composition can be repeated after 2 to 8 hours, preferably after 6 to 12 hours after the first administration of the pharmaceutical composition.

The method of the present disclosure also is useful for reducing inflammation in a subject by the administration of the peptides of the present disclosure as described herein for also reducing inflammatory mediators secretion from at least one inflammatory mediator secreting cell or tissue in the subject, whereby inflammatory mediator secretion in the subject is reduced compared to that which would occur in the absence of said administration of said peptide.

In some aspects, the subject is a mammal, such as humans, canines, equines and felines.

The method of administration of the peptides and compositions disclosed herein may be by topical administration, intravitreal injection (IVT), subconjuctival injection, sub-tenon injection (SBT), retrobulbar injection, periocular injection, subretinal injection, intrascleral, transscleral, intrastromal, intravenous injection, intra-ocular administration or any combination thereof. The ophthalmic administration generally includes an eye drop, eye gel, ointment, ointment, implant, microspheres, or liposomal formulation. In some embodiments, the method of administration of the peptides and compositions disclosed herein is by a combination of IVT injection and topical administration. For example, in some embodiments, the compositions are administered by IVT injection followed by topical administration; or by topical administration followed by IVT injection. In some embodiments, the compositions are administered in a first dosing session comprising IVT injection. The first dosing session comprising IVT injection may be followed by one or more dosing sessions comprising additional IVT injections. The IVT injections may be daily, every other day, every three, four, five, or six days, or weekly. In some embodiments, a first or subsequent IVT injection dosing session is followed by one or more dosing sessions comprising topical administration of the peptide or composition. For example, the one or more dosing sessions comprising topical administration of the peptides or compositions may be daily, every other day, every three, four, five, or six days, or weekly. Topical administration may be once daily, twice daily, three times daily, or four times daily. In some embodiments, topical administration following IVT injection provides an enhanced therapeutic effect, such as reduction in uveitis. In some embodiments, the dosing regimen comprises an initial IVT injection followed by daily topical administrations, for example for 2, 3, 4, 5, 6, 7, or more days. In some embodiments, the daily topical administrations each comprise one, two, three, or four times daily administrations. For example, in some embodiments, the compositions are administered once every approximately 8 hours topically. In some embodiments, the dosing regimen comprises an initial IVT injection followed by topical administration, three times daily for 4 days. In other embodiments, the administration of the peptides and compositions provided herein is by topical administration only. In some embodiments, topical administration provides an enhanced therapeutic effect. In some embodiments, topical administration is safer and/or more effective relative to other methods of administration to the eye, such as IVT.

Additionally, the administration to the subject can further include the administration of a second molecule selected from the group consisting of an antibiotic, an antiviral compound, an antiparasitic compound, an anti-inflammatory compound, and an immunomodulator. As used herein, an immunomodulator or immunomodulatory compound is an agent that can affect the functioning of the immune system. In some aspects, the immunomodulatory compound helps normalize or regulate the immune system. Non limiting examples of immunomodulators include azathioprine, methotrexate, cyclosporine, tacrolimus, sirolimus, and everolimus.

MARCKS is an actin-binding protein and is critical for cytoskeleton orientation and function and cell migration. In some embodiments, the administration of N-terminal MARCKS peptides disclosed herein inhibit directed migration of inflammatory cells, such as human neutrophils, to the areas of injury or infection associated with inflammatory disease states in patients suffering from such diseases.

The present disclosure includes the contact and/or administration of the peptide described above and throughout the specification with any known inflammatory cell that may be contained in the tissue or fluid of a subject which contains at least one inflammatory mediator contained within a vesicle inside the cell. The inflammatory cell is preferably a leukocyte, more preferably a granulocyte, which can be further classified as a neutrophil, a basophil, an eosinophil or a combination thereof. The inflammatory cells contacted in the present method may also be a monocyte/macrophage.

More specifically, the present disclosure includes targeting inflammatory cells that contain the inflammatory mediators in one or more granules or vesicles within the cells' cytoplasm with any one of the peptides disclosed herein. In some aspects, the cells are contacted with any one of the peptides disclosed herein. Preferably the contact of the peptide with the inflammatory cell is via administration to a subject afflicted by or suffering from uveitis in which these inflammatory cells are present in eye tissue or eye fluid. Upon administration or contact of the peptide with the cell, the peptide competitively competes for and competitively inhibits the binding of the native MARCKS protein to the membrane of the intracellular granules or vesicles which contain the inflammatory mediators. As a result of blocking the binding of the MARCKS protein to the vesicles in the inflammatory cells, these vesicles in these cells do not move to the plasma membrane of the cells as they would normally do when stimulated to exocytotically release their contents of inflammatory mediators out of the cells. Thus, the method of the present disclosure inhibits the movement of the vesicles to the cells' plasma membrane, which in turn, reduces the release of the inflammatory mediators from the inflammatory cells. The amount of inflammatory mediators released from the cells over time is reduced because both the rate of release and the amount of release of the mediators from the inflammatory cells is dependent upon the concentration of the peptide administered and duration of contact of the peptide with the inflammatory cells.

In some aspects, administration of a therapeutically effective amount of MANS peptide or a fragment thereof as described herein to inflamed eye of a subject, which site of inflammation has resulted from the onset of entry of a disease, a condition, a trauma, a foreign body, or a combination thereof at the site of inflammation in the subject, can reduce the amount of a mediator of inflammation released from infiltrating leukocytes at the site of inflammation, where the leukocytes are preferably granulocytes. In some aspects, the administration of any one of the peptides disclosed herein can reduce the amount of a mediator of inflammation released from leukocytes such as granulocytes infiltrating into the site of inflammation. In some aspects, the administering produces a reduction of a mediator of inflammation released from a granulocyte, at the site of inflammation, in the range of about 1% to about 99%, for example, about 5%, about 10%, about 20%, about 30%, about 40%, about 50%, about 60%, about 70%, about 80%, or about 90%, compared to the amount of said mediator of inflammation released from said granulocyte in the absence of the peptide tested under the same conditions.

In some aspects, administration of a therapeutically effective amount of any one of the peptides disclosed herein to a site of inflammatory stimulation in an animal, which site of inflammatory stimulation has been created by administration of an inflammation-stimulating amount of an inflammatory stimulant to said site, can reduce the amount of a mediator of inflammation released from a granulocyte, which granulocyte is stimulated by said inflammatory stimulant at said site of inflammatory stimulation, from about 1% to about 100%, for example, about 5%, about 10%, about 20%, about 30%, about 40%, about 50%, about 60%, about 70%, about 80%, about 90%, or about 99%, as compared to the amount of said mediator of inflammation released from said granulocyte in the absence of the peptide in the presence of the identical inflammation-stimulating amount of said inflammatory stimulant.

An example of an inflammatory stimulant used in in vitro examples herein is phorbol 12-myristate 13-acetate (PMA). Monocyte chemoattractant protein (MCP-1) is nearly as effective as C5a, and much more potent than IL-8, in the degranulation of basophils, resulting in histamine release. Histamine release can occur after stimulation with chemokines (i.e., chemoattractant cytokines), RANTES and MIP-1.

In some aspects, the peptide is administered at a concentration from about 1 µM to about 10 mM, such as, for example, about 10 µM, about 20 µM, about 30 µM, about 40 µM, about 50 µM, about 60 µM, about 70 µM, about 80 µM, about 90 µM, about 100 µM, about 150 µM, about 200 µM, about 250 µM, about 300 µM, about 350 µM, about 400 µM, about 450 µM, about 500 µM, about 550 µM, about 600 µM, about 650 µM, about 700 µM, about 750 µM, about 800 µM, about 850 µM, about 900 µM, about 950 µM, about 1 mM, about 2 mM, about 3 mM, about 4 mM, about 5 mM, about 6 mM, about 7 mM, about 8 mM, about 9 mM, or about 10 mM, including all subranges and values that lie therebetween.

In some aspects, the peptide is administered in an amount of about 1 µg to about 5 mg, such as for example, about 10 µg, about 20 µg, about 30 µg, about 40 µg, about 50 µg, about 60 µg, about 70 µg, about 80 µg, about 90 µg, about 100 µg, about 150 µg, about 200 µg, about 250 µg, about 300 µg, about 350 µg, about 400 µg, about 450 µg, about 500 µg, about 550 µg, about 600 µg, about 650 µg, about 700 µg, about 750 µg, about 800 µg, about 850 µg, about 900 µg, about 950 µg, about 1 mg, about 2 mg, about 3 mg, about 4 mg, or about 5 mg, including all subranges and values that lie therebetween.

In some embodiments, the peptide may be administered in a volume of about 0.01 mL to about 1 mL, such as for example, about 0.01 mL, about 0.05 mL, about 0.1 mL, about 0.5 mL, about 0.75 mL, or about 1 mL, including all subranges and values that lie therebetween.

In another embodiment, the granulocyte resides on or in the ophthalmic tissues of an animal, preferably a human, the peptide is administered with a pharmaceutical composition comprising the peptide, for example a pharmaceutical composition comprising the peptide in an aqueous solution, which composition is administered by topical application or by intra-ocular injection, or a pharmaceutical composition comprising the peptide in the form, for example, of a gel, ointment, ointment, implant, microspheres, microemulsion, or liposomal formulation can be useful.

In some aspects, the reduction of release of inflammatory mediators by the peptides disclosed herein can range from at least about 5% to at least about 99% reduction, as compared to the amount released from the inflammatory cell in the absence of the peptide. In some aspects, the peptide can reduce the amount of an inflammatory mediator released from at least one inflammatory cell from about 1% to about 99%, for example, about 5%, about 10%, about 20%, about 30%, about 40%, about 50%, about 60%, about 70%, about 80%, or about 90%, as compared to the amount released from the inflammatory cell in the absence of the peptide.

Further, the disclosure provides a composition comprising any one of the peptides disclosed herein for use in a method of treating uveitis in a subject, the method comprising administering the composition to the subject The disclosure also provides a composition comprising at least one peptide having an amino acid sequence selected from the group consisting of: (a) an amino acid sequence having from 4 to 24 contiguous amino acids of a reference sequence, GAQFSKTAAKGEAAAERPGEAAVA (SEQ ID NO. 1); (b) an amino acid sequence having the sequence, GAQFSKTAAKGEAAAERPGEAAVA (SEQ ID NO. 1); and (c) an amino acid sequence with at least about 75% identity to the amino acid sequence defined in (a) or (b), for use in a method of treating uveitis in a subject, the method comprising administering the composition to the subject.

Having now described the disclosure, the same will be illustrated with reference to certain examples, which are included herein for illustration purposes only, and which are not intended to be limiting of the disclosure.

EXAMPLES

Example 1: Generation of LPS-Induced Acute Uveitis Model in Rabbits 10 male New Zealand White rabbits (*Oryctolagus cuniculus*), 3-4 months old and weighing ~2-3 kg, were purchased from Covance, Denver, Pa. Rabbits were housed in stainless steel cages under environmental conditions of 12 hrs light/12 hrs darkness, at 30% humidity at room temperature (68±2° F.). They were fed and watered ad libitum. Rabbits were acclimated to the study environment for 1 week, physically examined by a veterinarian for determination of suitability for study participation, and accepted rabbits randomly assigned to study groups.

Rabbits were tranquilized prior to injections with ketamine (35 mg/kg, IM) and dexmedetomidine (0.05 mg/kg, IM), and the eyes aseptically prepared using topical 5% betadine solution, followed by rinsing with sterile saline, and application of one drop of 0.5% proparacaine HCL. A wire lid speculum was placed, the conjunctiva gently grasped with colibri forceps, and the injection (27-30 G needle) made 2 mm posterior to the superior limbus (through the pars plana), with the needle directed slightly posteriorly to avoid contact with the lens. After injection, the needle was slowly withdrawn, and a cellulose sponge used to apply pressure to the injection site for 1 min to prevent fluid reflux. One drop of antibiotic ophthalmic solution then was applied topically to the ocular surface.

As indicated in FIG. 1, 24 hrs after LPS injection into the eye tissue swelling and inflammatory cell infiltrate was apparent (FIG. 1, right panel), as compared to the control eye tissue injected with saline (FIG. 1, left panel). Thus, this model of acute uveitis was established in the laboratory.

Example 2—Acetylated Peptide 106 Ameliorates LPS-Induced Acute Uveitis in Rabbits Experimental Protocol: Rabbits were divided into groups of 3 each as shown below. Rabbits in all groups were analyzed at 24 hrs after the start of the study.

Group A (LPS): 2 rabbits were injected intravitreally into the right eye with 10 ng LPS in 50 µl PBS as described above. This procedure generates acute uveitis within a few hours, peaking at ~24 hrs post injection.

Group B: (LPS+BIO-11006): 3 rabbits were injected intravitreally into the right eye with 10 ng LPS in 50 µl PBS as described above. After 2 hrs, the rabbits then were injected intravitreally into the right eye with 50 µl BIO-11006 ("acetylated peptide 106" or "ac-peptide 106"), which is peptide 106 that is acetylated at the N-terminal amino acid (100 µM).

Group C: (BIO-11006+LPS). 3 rabbits were injected intravitreally into the right eye with acetylated peptide 106 (100 µM). Two hrs later, the rabbits were intravitreally into the right eye with 10 ng LPS in 50 µl PBS.

Group D: (BIO-11006 only): 3 rabbits were injected intravitreally into the right eye with BIO-11006 (acetylated peptide 106) (100 µM) only.

All rabbits were euthanized 24 hrs after the start of the experiment via an overdose of pentobarbital sodium IV (Euthasol) and eyes and ocular fluid analyzed for measures of inflammation as described below.

Ocular Examination, Irritation and histopathology: Ocular irritation (Table 2) and inflammation and histopathology were assessed by a blinded, independent veterinary pathologist. Complete ocular examinations using a slit lamp biomicroscope and indirect ophthalmoscope to evaluate ocular surface morphology and anterior and posterior segment inflammation were conducted 24 hrs after the start of the experiment. For ocular histopathology, post-euthanasia and collection of aqueous humor, eyes were removed and immediately transferred to 4% phosphate-buffered glutaraldehyde for 1 hr and then 10% phosphate-buffered formaldehyde overnight. Eyes were paraffin-embedded, sectioned (5 m thick), stained with hematoxylin and eosin (H&E) and examined using light microscopy.

TABLE 2

| Grade[a] | Criteria |
|---|---|
| 0 | No disease; eye is translucent and reflects light (red reflex) |
| 0.5 (trace) | Dilated blood vessels in the iris |

TABLE 2-continued

| Grade[a] | Criteria |
|---|---|
| 1 | Engorged blood vessels in the iris; abnormal pupil contraction |
| 2 | Hazy anterior chamber; decreased red reflux |
| 3 | Moderately opaque anterior chamber, but pupil still visible; dull red reflex |
| 4 | Opaque anterior chamber and obscured pupil; red reflex absent; proptosis |

[a]Each higher grade includes the criteria of the preceding one.

Figure 2:
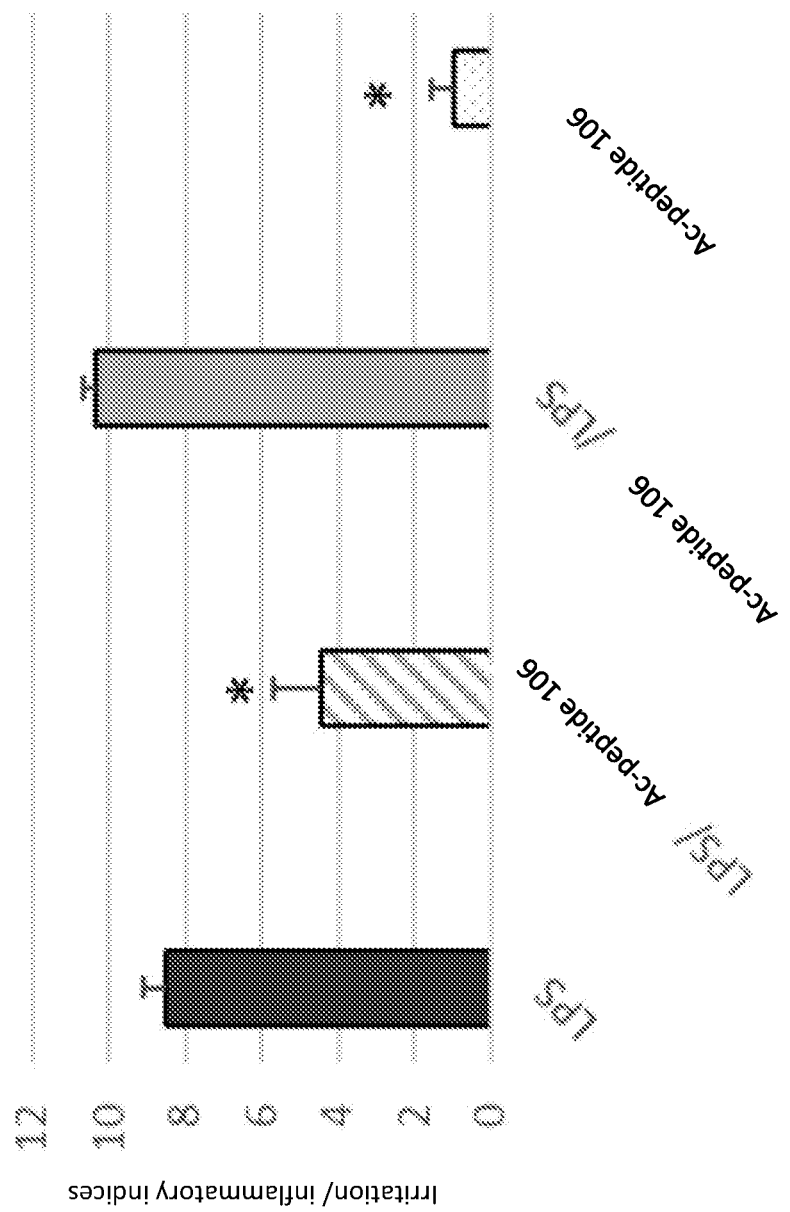
FIG. 2 shows a comparison of a measure of irritation/inflammatory indices in rabbits treated with either Group A: LPS alone (i.e. 10 ng in 50 μL PBS); Group B: LPS followed by BIO-11006 also called "acetylated peptide 106", which is peptide 106 that is acetylated at the N-terminal amino acid (100 μM of acetylated peptide 106 was injected intravitreally 2 hrs post LPS injection); Group C: Ac-peptide 106/LPS: Acetylated peptide 106 injected intravitreally prior to LPS injection; or Group D: intravitreal injection of acetylated peptide 106 alone into the eye. All values are Mean±1 SEM. N=2 or 3 for each treatment. P≤0.05=*compared to LPS.

As shown in FIG. 2, treatment of rabbits with BIO-11006 (acetylated peptide 106), 2 hours post LPS, caused a marked decrease in irritation/inflammatory indices, as compared to the LPS treated negative control rabbits. Pretreatment of rabbits with BIO-11006 (acetylated peptide 106) prior to LPS had no effect on irritation/inflammatory indices. Also, the treatment of rabbits with BIO-11006 alone did not provoke any significant response.

Aqueous humor assessment of inflammation: Immediately following euthanasia, aqueous humor was aspirated using a 30 gauge needle through a clear corneal approach to avoid blood contamination. Samples were placed on ice and cell counts performed on the same day as aspiration.

Figure 3:
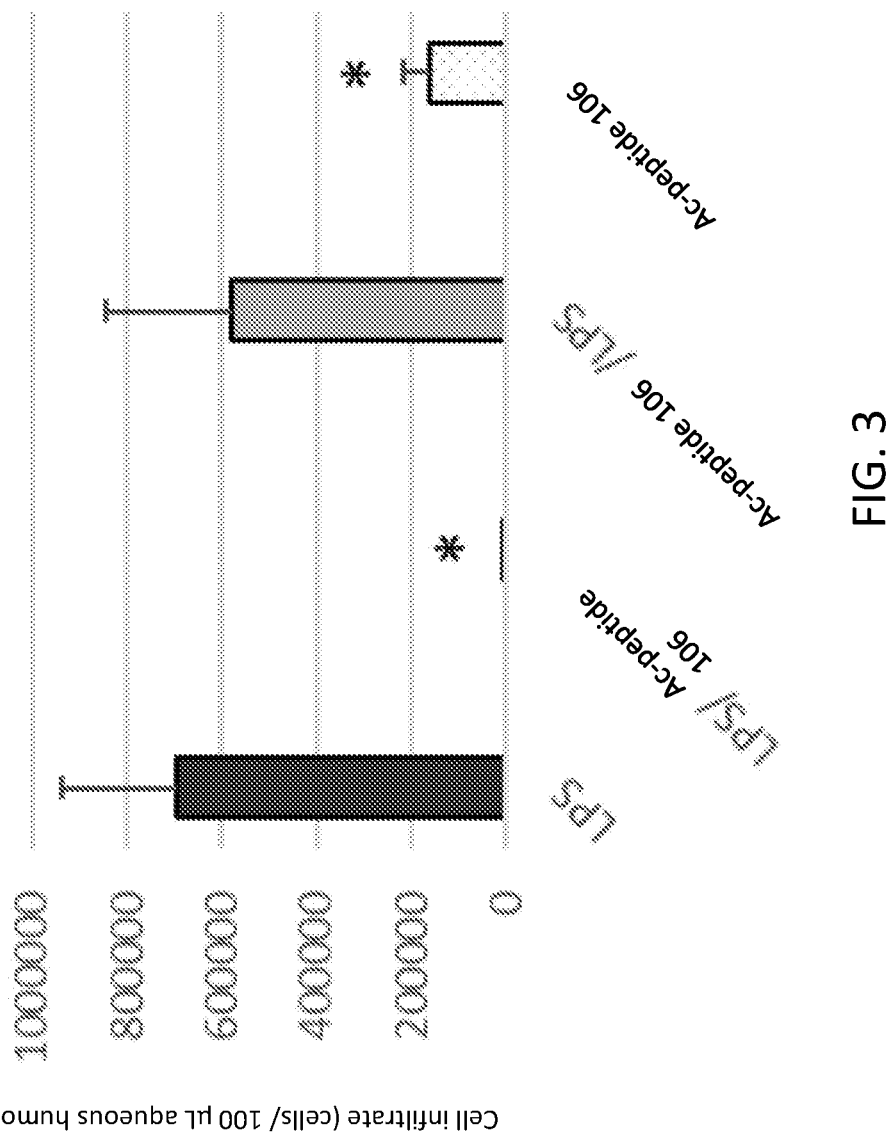
FIG. 3 shows a comparison of cell infiltrate in the aqueous humor of rabbits treated with either Group A: LPS alone (i.e. 10 ng in 50 μL PBS); Group B: LPS followed by BIO-11006 also called "acetylated peptide 106" (100 μM of acetylated peptide 106 was injected intravitreally 2 hrs post LPS injection); Group C: acetylated peptide 106 was injected intravitreally 2 hrs prior to LPS injection; or Group D: intravitreal injection of acetylated peptide 106 alone into the eye. All values are Mean±1 SEM. N=2 or 3 for each treatment. P≤0.05=*compared to LPS.

As shown in FIG. 3, treatment of rabbits with BIO-11006 (acetylated peptide 106), 2 hours post LPS caused a complete amelioration of inflammatory cell infiltrate in the aqueous humor, as compared to the LPS treated negative control rabbits. Pretreatment of rabbits with BIO-11006 (acetylated peptide 106) prior to LPS had no effect on inflammatory cell infiltrate. Also, the treatment of rabbits with BIO-11006 (acetylated peptide 106) alone did not provoke any significant response.

Figure 4:
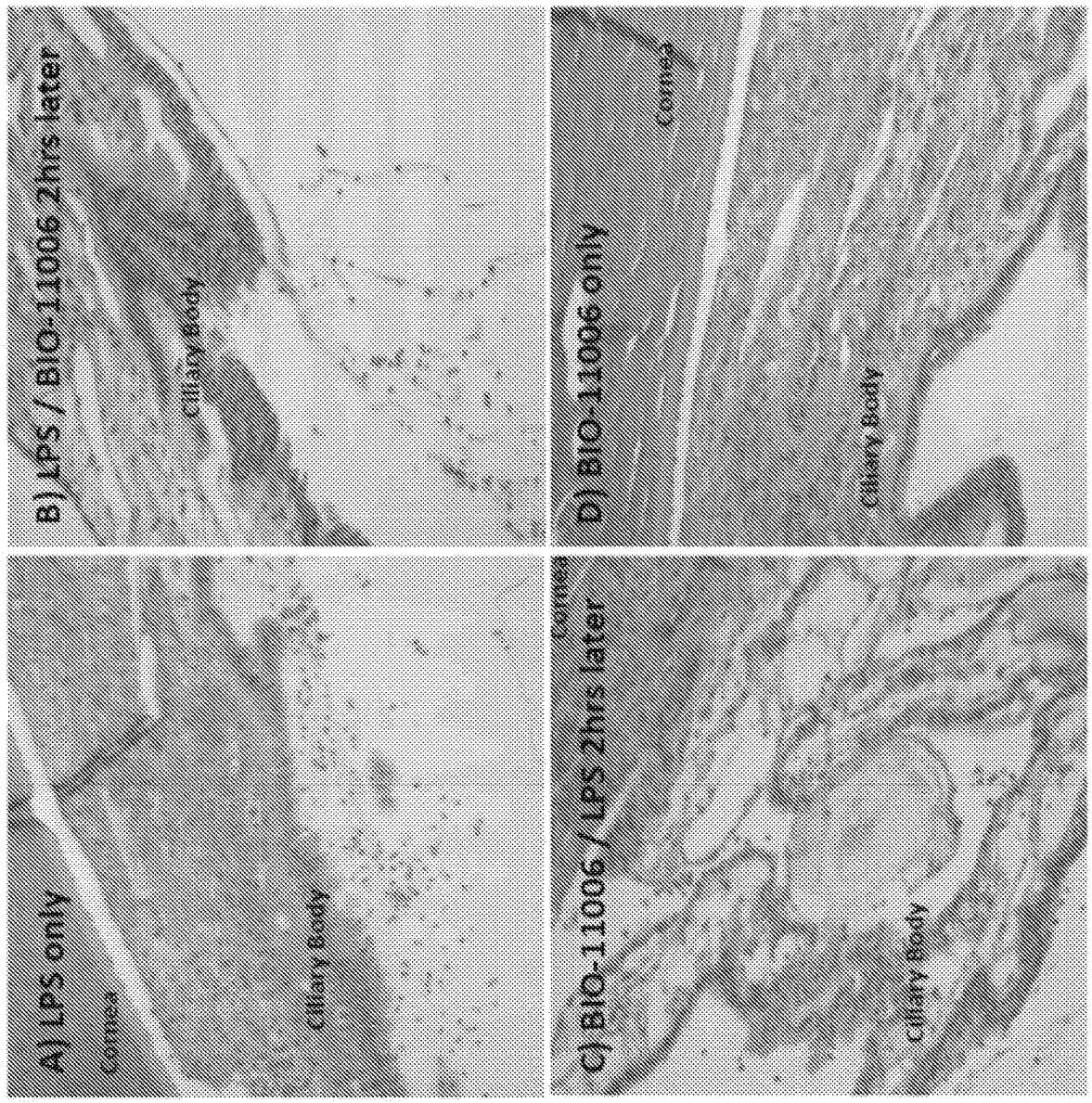
FIG. 4 shows representative images for histopathological analysis of rabbit eyes 24 hrs after treatment with either Group A: only LPS (top left); Group B: LPS followed by acetylated peptide 106 (BIO-11006) intravitreally administered 2 hrs post LPS (top right); Group C: acetylated peptide 106 was injected intravitreally 2 hrs prior to LPS administered (bottom left); or Group D: acetylated peptide 106 only injected intravitreally (bottom right). All magnifications are 400×.

Leukocyte Counts: The cell pellet was resuspended in 1 ml of PBS and cytospin preparations performed. Slides were stained with H&E for differential counts for quantification of total leukocytes. Representative images from this experiment are shown in FIG. 4. In rabbits treated with LPS, moderate to severe PMN infiltration was seen in the eyes (top left panel). In contrast, in rabbits that were treated with LPS followed by BIO-11006 (acetylated peptide 106), only mild PMN infiltration was seen (top right panel). Thus, administration of BIO-11006 following LPS treatment has a therapeutic effect on the LPS-induced PMN infiltration. Two additional control groups were also assessed. Rabbits treated with BIO-11006 followed by LPS did not show reduction of PMN infiltration (bottom left panel), while treatment with only BIO-11006 (no LPS) did not affect PMN infiltration into the eyes (bottom right panel). Taken together, the results presented in FIGS. 2-4 demonstrate that BIO-11006 (acetylated peptide 106) has a therapeutic effect on uveitis, ameliorating inflammation and irritation in the eye by inhibiting infiltration of PMN into the eye.

Example 3: Treatment of Experimental Autoimmune Chronic Uveitis with BIO-11006 in a Rat Model Uveitis can also be characterized as an autoimmune disorder whereby a patient's immune system responds to retinal antigens or proteins. Autoimmune uveitis accounts for approximately 10% of severe vision loss in the US. The rodent autoimmune uveitis model is well-characterized and commonly-used for evaluating therapeutic approaches to treat uveitis. In this model the rat is immunized with a highly conserved retinal peptide in Freund's Complete Adjuvant (FCA). Between days 9 and 11 the disease manifests with host immune cells reacting with the retina and uvea; this pathology mimics main characteristics of autoimmune uveitis seen in humans (Gilger B C, Immune relevant models for ocular inflammatory diseases, ILAR J. 2018, Feb. 21.doi: 10. 1093/ilar/ily002 (Epub).

Rat Model of Immune-mediated chronic uveitis: Lewis rats of both sexes about 6-8 weeks of age and 125-175 g body weights were purchased from Charles River, Kingston, N.Y. Rats of the same sex were housed 2 per cage, fed and allowed to drink water ad libitum, and let acclimatize for one week under a photoperiod of 12 hrs light/12 hrs darkness, at 30% humidity and 68-79° F. Rats were then randomly assigned to study groups as described below. Rats were divided into three groups of 4 each (2 males and 2 females).

For both in-life and post-mortem analyses, all veterinary ophthalmologist and pathologist involved were blinded to the treatments administered. All rats were monitored daily for inflammatory/irritation scores. The animals were divided into the following groups of four rats each: Group A: No immunization; treatment with saline (Control); Group B: Immunized and challenged with human IRBP and Freund's Complete Adjuvant (FCA); and Group C: Immunized and challenged with IRBP and FCA, treatment with intravitreal (IVT) injection and topical treatment of BIO-11006 at 100 µM.

Generation of immune-mediated uveitis: Rats were anesthetized with exposure to 3% isoflurane in oxygen and then injected at the base of the tail (100 µl) and in each thigh (50 µl ea.) with human IRBP peptide (30 µg) emulsified with FCA. The onset of uveitis occurs between 9 and 11 days post immunization in this model (Gilger B C, cited above).

Treatments: BIO-11006 at 100 µM concentration or saline control was administered by IVT injection (5 µl) using the injection protocol described above under Example 1 (as modified for rats) at 10 days post-immunization (time when uveitis has begun in this model), a group of rats was treated by IVT injection with 100 µM BIO-11006 or with saline (Group 1; Control). After BIG-11006 injection, one group of rats was treated for an additional 4 days with IVT injection of BIG-11006 (Group 2, IVT only), while a third group received 100 µM BIO-11006 applied topically, 3× per day, for 4 day period (Group 3, IVT+Topical). At Day 14 all rats were euthanized by exposure to C02.

Aqueous humor measurements of inflammation: Immediately following euthanasia, aqueous humor was aspirated using a 30 gauge needle through a corneal approach to avoid blood contamination. The aqueous humor was then separated into two aliquots, one for cytokine analysis and the other for cell counts. Cell count samples were placed on ice and counts performed on the same day as aspiration. Cytokine samples were placed on dry ice and stored at −80 C.

Figure 6:
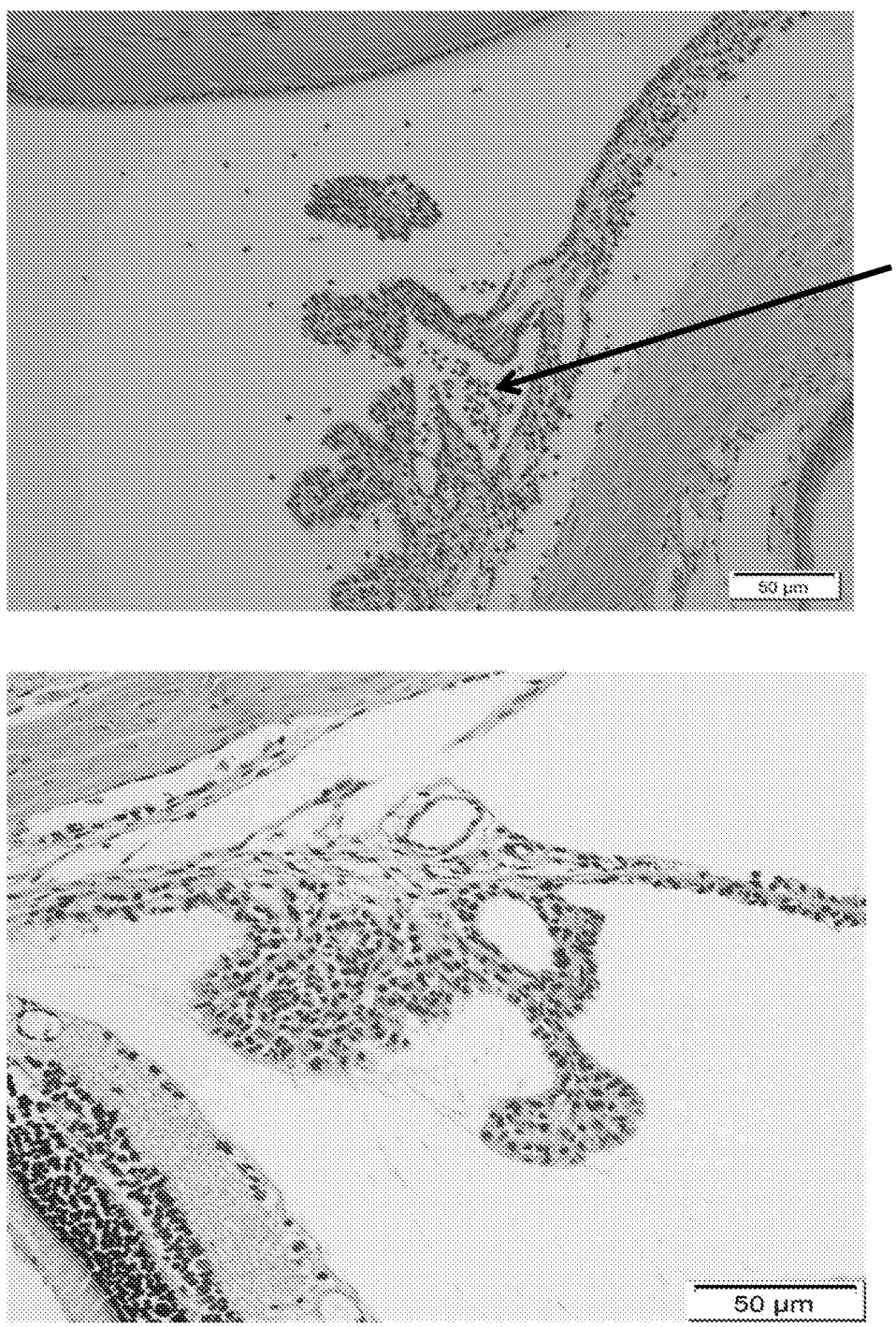
FIG. 6: Top panel shows an image of H & E stained anterior uvea of experimental autoimmune uveitis (EAU) rat 4 days after dosing with intravitreal saline starting on day 10 after immunization (rats in Group A). Iris and ciliary body tissue swelling and cellular infiltrate (primarily mononuclear cells; arrow) is present; Grade 3 based on Table 4. Bottom panel shows an image of H & E stained anterior uvea of EAU rat 4 days after intravitreal injection starting on day 10 followed by daily topical dosing for 4 days of BIO-11006 (rats in Group C). There is less tissue swelling and near complete inhibition of cellular infiltrate compared to saline-treated EAU rats. Grade 0-0.5 based on Table 4.

For ocular histopathology, post-euthanasia and after collection of aqueous humor, eyes were removed and immediately transferred to 4% phosphate-buffered glutaraldehyde for 1 hour and then 10% phosphate-buffered formaldehyde overnight or until processing. Eyes were then paraffin-embedded, sectioned (5 µm), stained with H&E, and examined using light microscopy. The results are shown in FIG. 6.

Ocular Examination, Irritation and histopathology Scores: Ocular inflammatory (Table 3) and histopathology (Table 4) grades were assigned by a blinded, independent veterinary ophthalmologist and pathologist, respectively. Complete ocular examinations using a slit lamp biomicroscope and indirect ophthalmoscope to evaluate ocular surface morphology, and anterior and posterior segment inflammation was conducted daily post-immunization.

Figure 5:
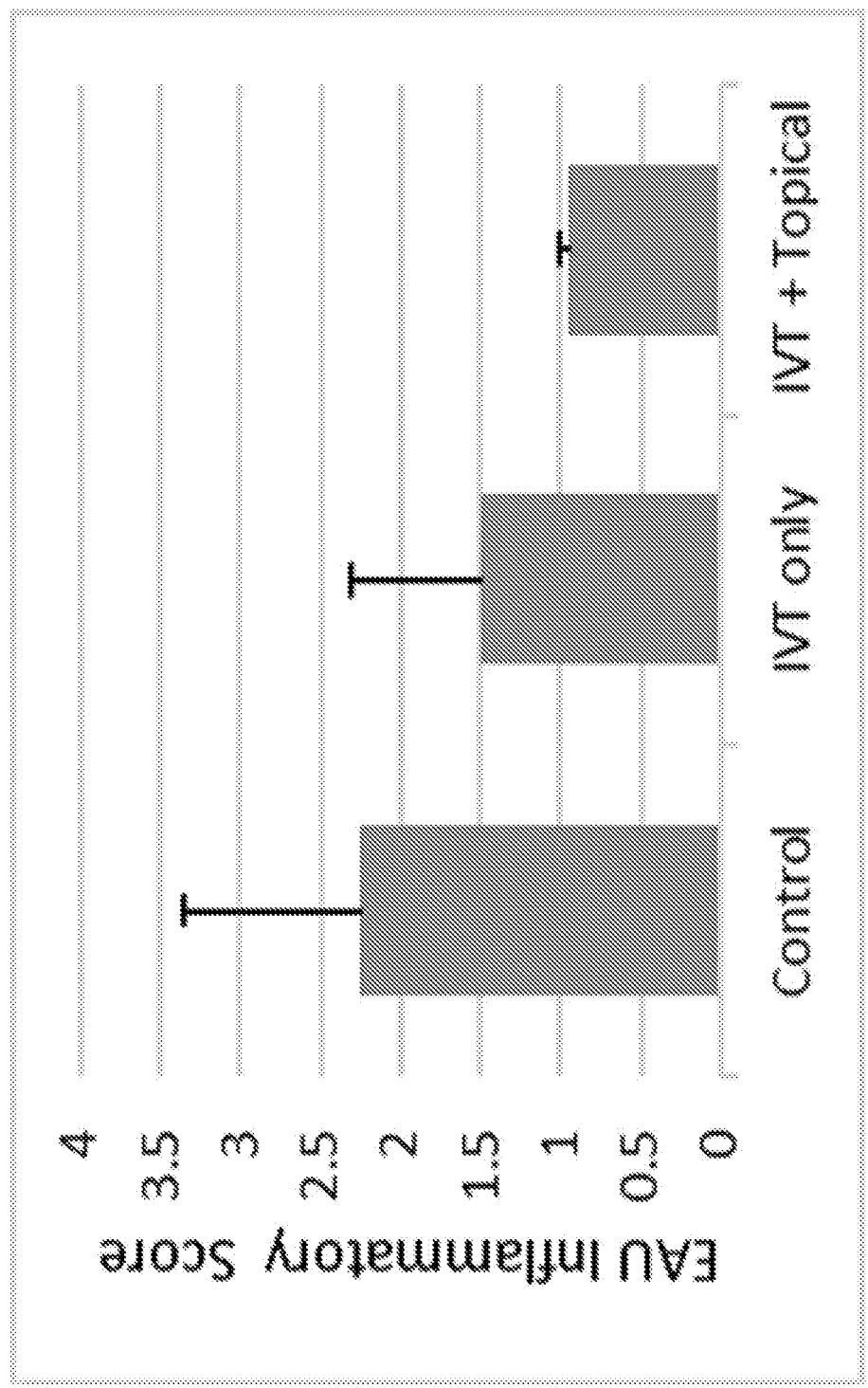
FIG. 5: Rats were immunized by injection of IRBP peptide At day 10 post-immunization, a group of rats was treated IVT injection with 100 μM BIO-11006 or with saline (Group A, Control). After BIO-11006 IVT injection, one group of rats was treated for an additional 4 days (Group B, IVT only), while a second group received 100 μM BIO-11006 applied topically, 3× per day, for 4 day period (Group C, IVT+Topical). At day 14 post immunization, all rats underwent ocular examination (graders were blinded), then euthanized and eyes removed for histopathological examination.

The autoimmune model of chronic anterior ocular uveitis is characterized by leukocyte influx and pro-inflammatory cytokine production in the eye. The results from this experiment indicate the peptide is well-tolerated and has healing effect on uveitis. For instance, as shown in FIG. 5, BIO-11006 ameliorates inflammation in the experimental autoimmune uveitis in rat by IVT injection starting at Day 10 (bar 2); and the effect is further increased with topical application of 100 µM BIO-11006 for 4 days following IVT (bar 3). Further, as shown in FIG. 6, iris and ciliary body tissue swelling, and infiltration of primarily mononuclear cells is dramatically reduced in the anterior uvea of rats with experimental autoimmune uveitis, which were treated with BIO-11006.

TABLE 4

Ocular Histopathology Scoring

| Grade | Area affected | Criteria |
|---|---|---|
| 0 | None | No disease; normal retinal architecture |
| 0.5 (trace) | <1/4 | Mild inflammatory cell infiltration of the retina with or without photoreceptor damage |
| 1 | ≥1/4 | Mild inflammation and/or photoreceptor outer segment damage |
| 2 | ≥1/4 | Mild-to-moderate inflammation and/or lesion extending to the outer nuclear layer |
| 3 | ≥1/4 | Moderate-to-marked inflammation and/or lesion extending to the inner nuclear layer |
| 4 | ≥1/4 | Severe inflammation and/or full-thickness retinal damage |

Example 4: Characterization of the Clinical Effects of Peptides

The following peptides listed in Table 5 are tested for their ability to treat or ameliorate at least one symptom of uveitis, such as autoimmune chronic uveitis (described in Example 3) and LPS-induced acute uveitis (described in Examples 1 and 2) in rabbits and rats.

TABLE 5

| Peptide Name | Seq ID NO. | Solubility in HNS (mg/mL) | T/2 (human plasma) | Mol Wt |
|---|---|---|---|---|
| 1 MANS | 1 | <5 | 12 min | |
| 2 Ac-MANS | 1 | 125 | | 2,330.9 |
| 3 BIO-11211 (Ac-----------NH2) | 79 | 60 | >2.6 hrs | 1,235.4 |
| 4 BIO-11000 (Ma---------OH) | 106 | 15 | 1.2 hrs | 1,218.9 |
| 5 BIO-11002 (Ma---------NH2) | 106 | <10 | stable | 1,217.9 |
| 6 BIO-11005 (H-----------NH2) | 106 | 100 | 20 min | 1,007.2 |
| 7 BIO-11006 (Ac---------OH) | 106 | 150 | 2-3 min | 1,052.2 |
| 8 BIO-11007(cyclic) | 106 cyclic | 150 | | 990.1 |
| 9 BIO-11018 (pegylated) | 106 pegylated | >100 | | ~3,000 |
| 10 BIO-11026 (Ac-----------NH2) | 106 | | | 1,042.2 |
| 11 BIO-10901 (Ac-----------OH) | 121 | >60 | 5 min | 922 |
| 12 BIO-10803 (Ac--------OH) | 137 | 200 | | 850.9 |
| 13 BIO-91200 (Ma-AKGE-OH) | 219 | ~1 | | 613.8 |
| 14 BIO-91201 (Ac-AKGE-OH) | 219 | 200 | | 445.5 |
| 15 BIO-91202 (Ac-AKGE-NH2) | 219 | 200 | | 444.4 |

Ma = myristoyl-;
Ac = Acetyl-

TABLE 3

Ocular Inflammation/Irritation Scoring

| Grade[a] | Criteria |
|---|---|
| 0 | No disease; eye is translucent and reflects light (red reflex) |
| 0.5 (trace) | Dilated blood vessels in the iris |
| 1 | Engorged blood vessels in the iris; abnormal pupil contraction |
| 2 | Hazy anterior chamber; decreased red reflux |
| 3 | Moderately opaque anterior chamber, but pupil still visible; dull red reflex |
| 4 | Opaque anterior chamber and obscured pupil; red reflex absent; proptosis |

[a]Each higher grade includes the criteria of the preceding one.

The foregoing examples are illustrative of the present disclosure and are not to be construed as limiting thereof. The disclosure is defined by the following claims, with equivalents of the claims to be included therein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All references, including publications, patent applications, and patents, cited herein are hereby incorporated by reference to the same extent as if each reference were individually and specifically indicated to be incorporated by reference and were set forth in its entirety herein.

The invention claimed is:

1. A method of treating uveitis in a subject in need thereof comprising:
    administering to an eye of said subject a therapeutically effective amount of a composition comprising at least one peptide having an amino acid sequence GAQFSKTAAK (SEQ ID NO: 106).

2. The method of claim 1, wherein the peptide is myristoylated or acetylated at the N-terminal amino acid.

3. The method of claim 1, wherein the peptide is acetylated at the N-terminal amino acid.

4. The method of claim 1, wherein the peptide is myristoylated at the N-terminal amino acid and amidated at the C-terminal amino acid.

5. The method according to claim 4, wherein said peptide is amidated with ammonia at the C-terminal amino acid.

6. The method of claim 1, wherein the composition comprises a pharmaceutically acceptable carrier.

7. The method of claim 1, wherein said subject is a mammal.

8. The method according to claim 1, wherein the administering to the eye is by topical administration, intravitreal injection (IVT), subconjuctival injection, subtenon injection (SBT), retrobulbar injection, periocular injection, subretinal injection, intrascleral, transscleral, intrastromal, intravenous injection, intra-ocular administration, or any combination thereof.

9. The method according to claim 1, wherein the administering to the eye is by intravitreal injection.

10. The method according to claim 1, wherein the administering to the eye is by topical injection.

11. The method according to claim 1, wherein the administering to the eye is by intravitreal injection in a first dosing session, and administered by topical administration in one or more subsequent dosing sessions.

12. The method according to claim 1, wherein the composition comprises a topical formulation, intra-ocular formulation, an eye implant, an eye drop, eye gel, ointment, microspheres, microemulsion, liposomal formulation or any combination thereof.

13. The method according to claim 1, wherein the uveitis is selected from the group consisting of anterior uveitis, intermediate uveitis, posterior uveitis, and panuveitis.

14. The method according to claim 1, wherein the uveitis is inflammatory.

15. The method of claim 1, wherein the peptide is administered at a concentration from about 1 μM to about 10 mM.

16. The method of claim 1, wherein the peptide is administered in an amount of about 1 μg to about 5 mg.

17. The method of claim 1, wherein the peptide is administered in a volume of about 0.01 mL to about 1 mL.

* * * * *